(12) United States Patent
Nijsen et al.

(10) Patent No.: US 11,576,518 B2
(45) Date of Patent: Feb. 14, 2023

(54) CENTRIFUGAL COFFEE BREWER AND METHOD OF USING SAME

(71) Applicant: SPINN HOLDING B.V., Amsterdam (NL)

(72) Inventors: Andreas Jacobus Louis Nijsen, Enschede (NL); Sybren Yme Leijenaar, Sint Nicolaasga (NL); Hedzer Michiel Adriaan Van Der Kamp, Zutphen (NL); Hans Constant Dikhoff, Eindhoven (NL); Roderick De Rode, Amsterdam (NL); Serge Alfred Johan De Warrimont, Amsterdam (NL); Frank Jacob Paul De Vries, Koedijk (NL); Willem Otto De Jong, Abcoude (NL); Willem Verburg, Nieuwerbrug (NL); Daniel Constantijn Van Der Prijt, Nieuw Vennep (NL)

(73) Assignee: SPINN HOLDING B.V., Amsterdam (NL)

( * ) Notice: Subject to any disclaimer, the term of this patent is extended or adjusted under 35 U.S.C. 154(b) by 375 days.

(21) Appl. No.: 16/636,841

(22) PCT Filed: Aug. 3, 2018

(86) PCT No.: PCT/NL2018/050536
§ 371 (c)(1),
(2) Date: Feb. 5, 2020

(87) PCT Pub. No.: WO2019/031964
PCT Pub. Date: Feb. 14, 2019

(65) Prior Publication Data
US 2020/0375389 A1 Dec. 3, 2020

(30) Foreign Application Priority Data
Aug. 7, 2017 (NL) .................................... 2019398

(51) Int. Cl.
*A47J 31/22* (2006.01)
*A23F 5/26* (2006.01)
*A47J 31/44* (2006.01)

(52) U.S. Cl.
CPC .............. *A47J 31/22* (2013.01); *A23F 5/265* (2013.01); *A47J 31/4403* (2013.01)

(58) Field of Classification Search
CPC ........ A47J 31/22; A47J 31/4403; A23F 5/265
See application file for complete search history.

(56) References Cited

U.S. PATENT DOCUMENTS 3,590,723 A * 7/1971 Dokos ..................... A47J 31/22
  99/289 R
5,901,634 A   5/1999 Vancamp et al.
(Continued)

FOREIGN PATENT DOCUMENTS

BE        823309 A     4/1975
CN     201182506 Y     1/2009
(Continued)

OTHER PUBLICATIONS

International Search Report and Written Opinion dated Jan. 15, 2019 for Application No. PCT/NL2018/050536.
(Continued)

*Primary Examiner* — Anthony J Weier
(74) *Attorney, Agent, or Firm* — Patterson + Sheridan, LLP

(57) ABSTRACT

The present invention relates to a centrifugal coffee brewing device, having: a spinning assembly which is rotatable about a main axis, the spinning assembly having: a chamber element comprising a bottom wall, a cylinder element having a filter, wherein the chamber element and the cylinder element form a brewing chamber, a main drive for rotating the spinning assembly about the main axis for centrifuging
(Continued)

the coffee, wherein the cylinder element including the filter is movable between a first, lower position in which the filter forms the circumference of the brewing chamber and in which the spinning assembly has a brewing configuration, and a second, upper position in which the circumference of the brewing chamber is open, and in which second position coffee residue can be ejected by spinning the chamber element.

20 Claims, 38 Drawing Sheets

(56) References Cited

U.S. PATENT DOCUMENTS

| | | | | |
|---|---|---|---|---|
| 2004/0200357 | A1* | 10/2004 | Wang .................. | A47J 31/3609 99/279 |
| 2017/0188747 | A1* | 7/2017 | Leung .................. | A47J 31/42 |

FOREIGN PATENT DOCUMENTS

| | | |
|---|---|---|
| CN | 101675861 A | 3/2010 |
| CN | 202312871 U | 7/2012 |
| CN | 103228559 A | 7/2013 |
| CN | 103569198 A | 2/2014 |
| CN | 103860020 A | 6/2014 |
| CN | 105395069 A | 3/2016 |
| CN | 106264143 A | 1/2017 |
| CN | 206390768 U | 8/2017 |
| CN | 108272345 A | 7/2018 |
| DE | 4240429 A1 | 6/1994 |
| EP | 2087818 * | 8/2009 |
| FR | 2236456 A1 | 2/1975 |
| GB | 952276 A | 3/1964 |
| JP | 2004258769 A | 9/2004 |
| RU | 2535461 C2 | 12/2014 |
| WO | 2012/069986 A1 | 5/2012 |
| WO | 2014069994 A1 | 5/2014 |
| WO | 2017/010878 A1 | 1/2017 |

OTHER PUBLICATIONS

Search Report dated Apr. 24, 2018 for Application No. NL 2019398.
Chinese Office Action dated Aug. 27, 2021, for Chinese Patent Application No. 2018800637425.
Russian Office Action dated Oct. 21, 2021, for Russian Patent Application No. 2020109550.
Chinese Search Report dated May 9, 2022 for Application No. 2018800637425.

* cited by examiner

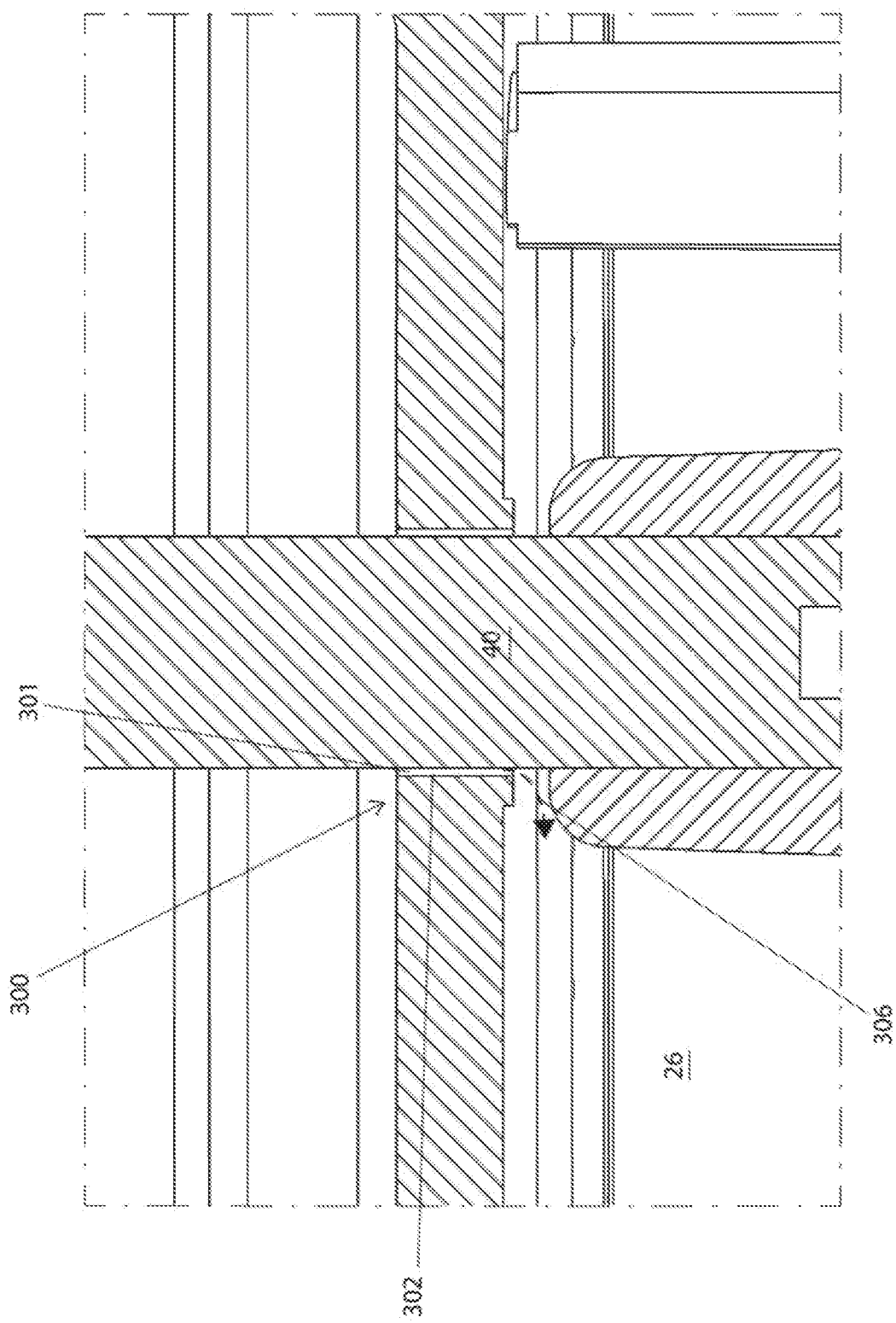

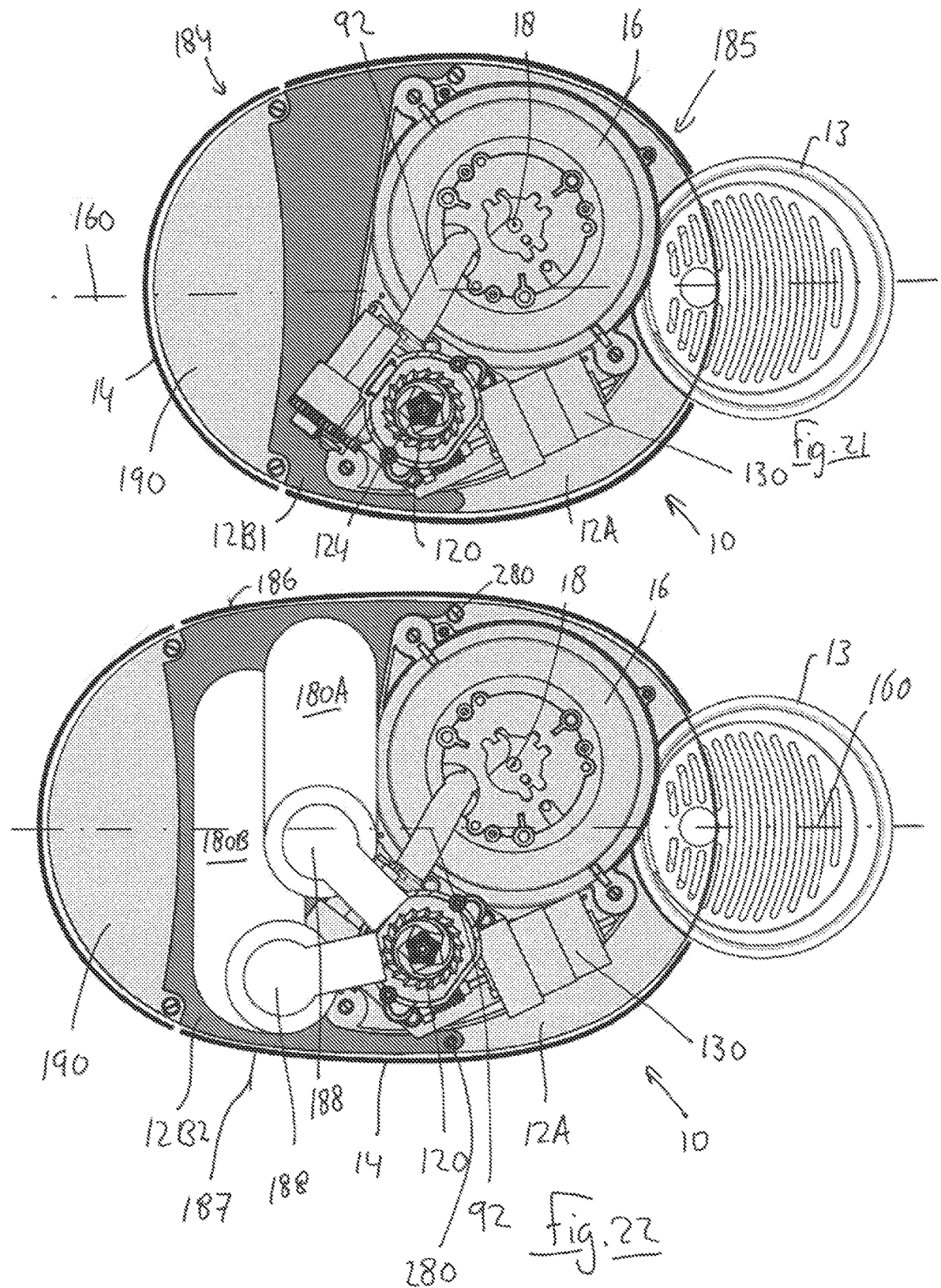

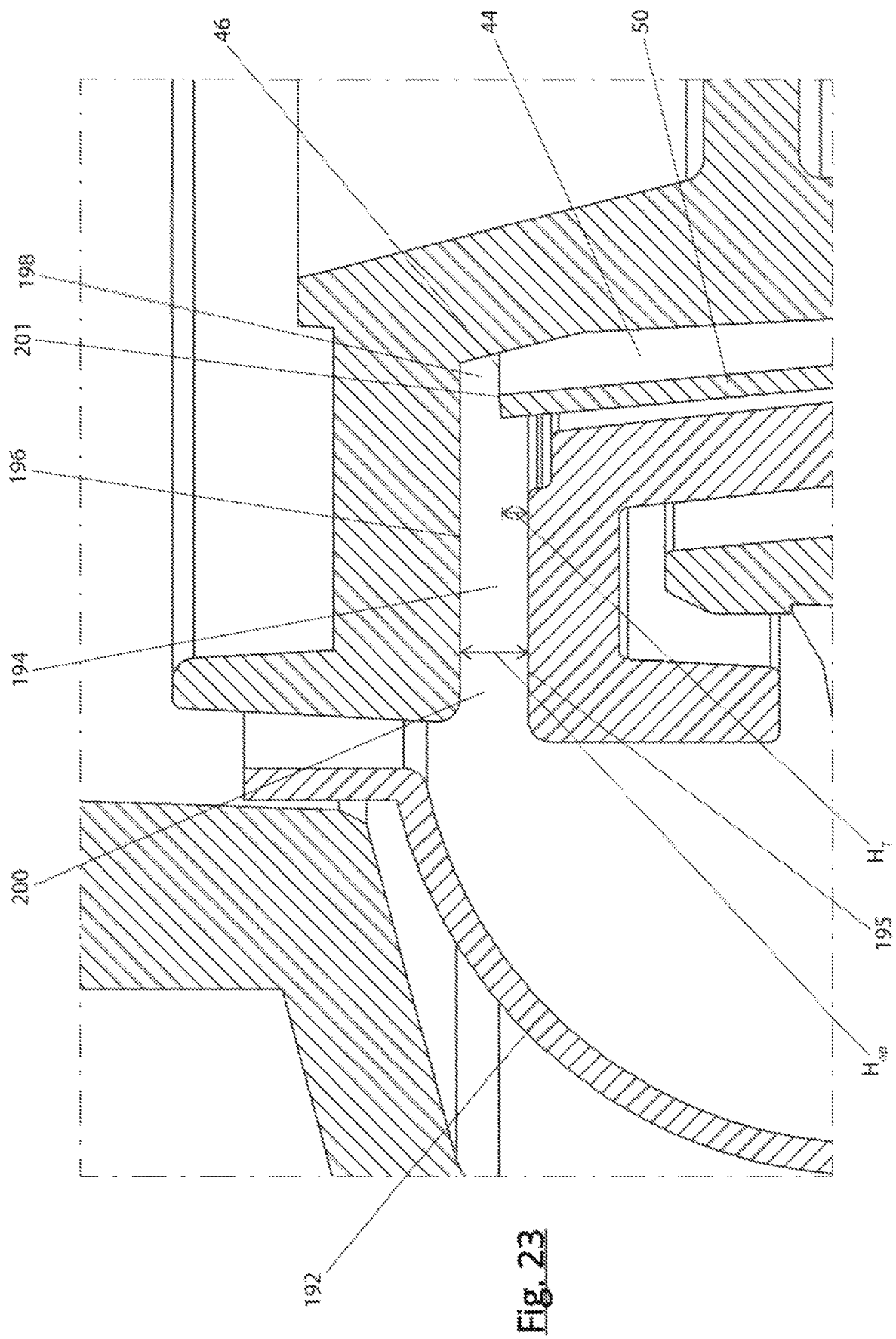

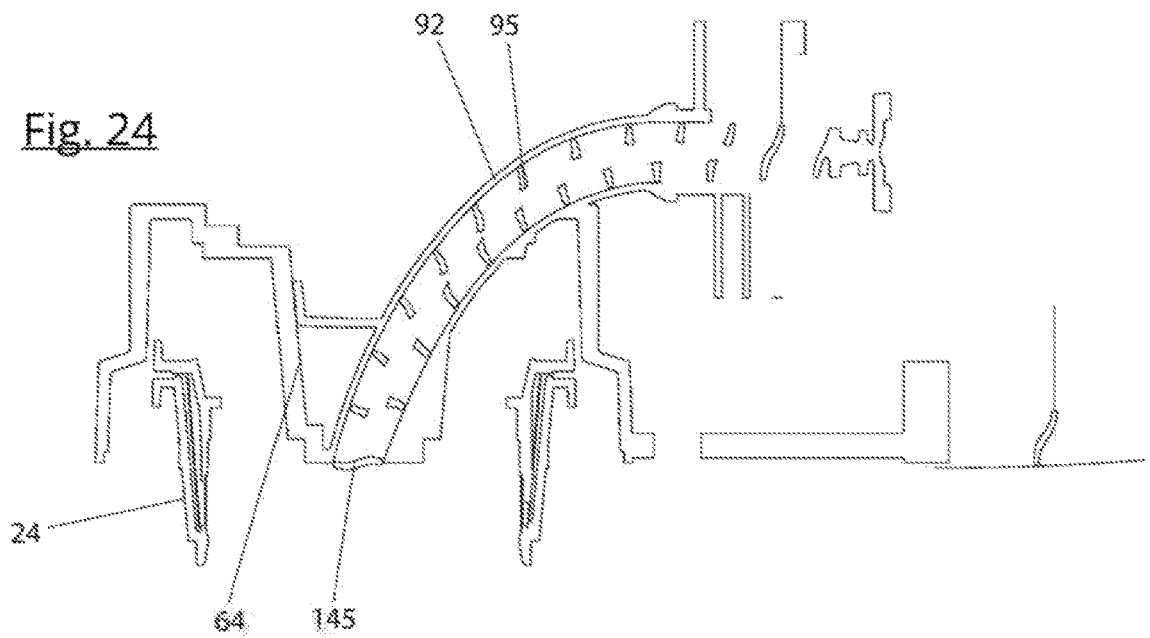
Fig. 24
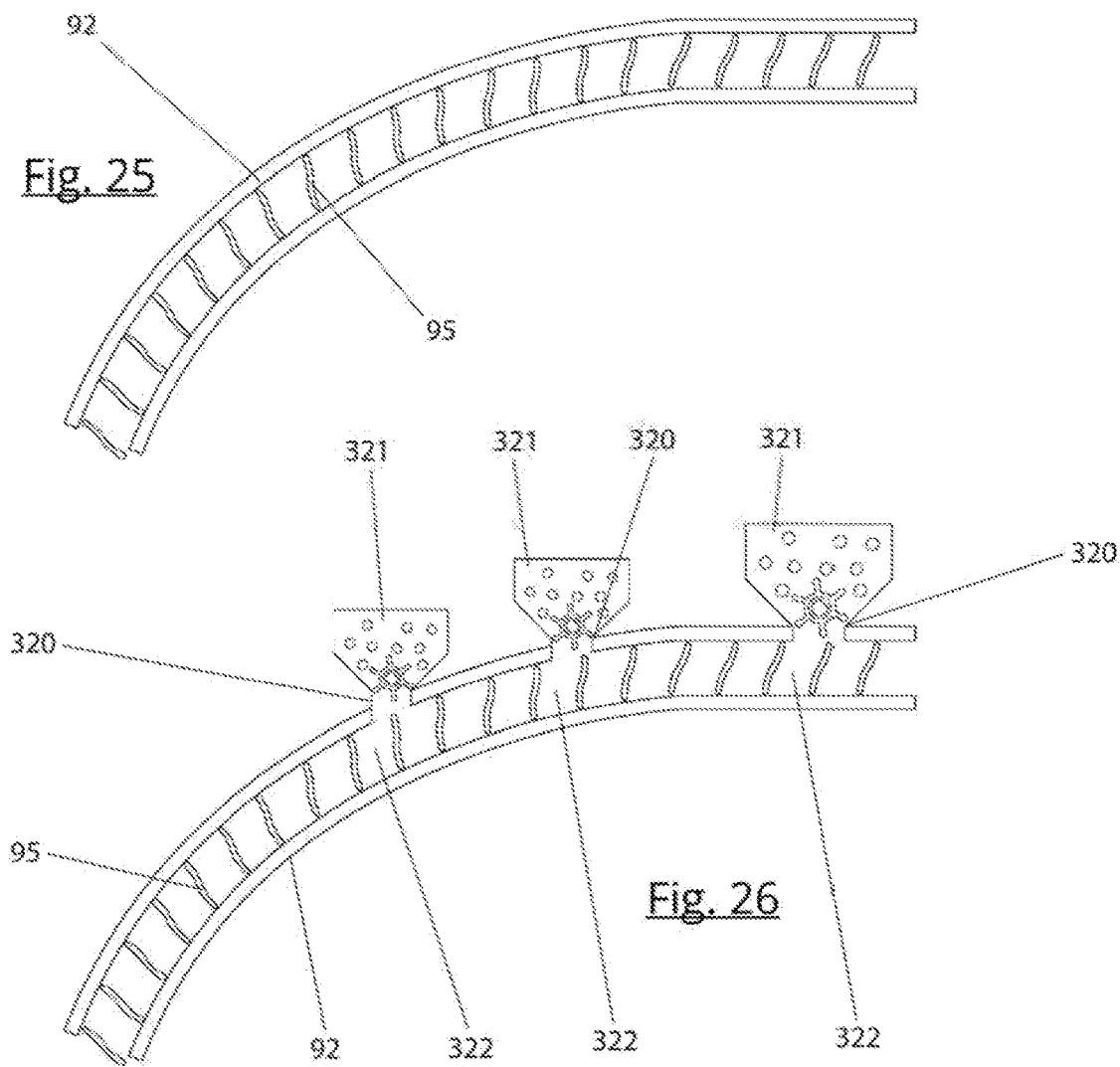
Fig. 25
Fig. 26

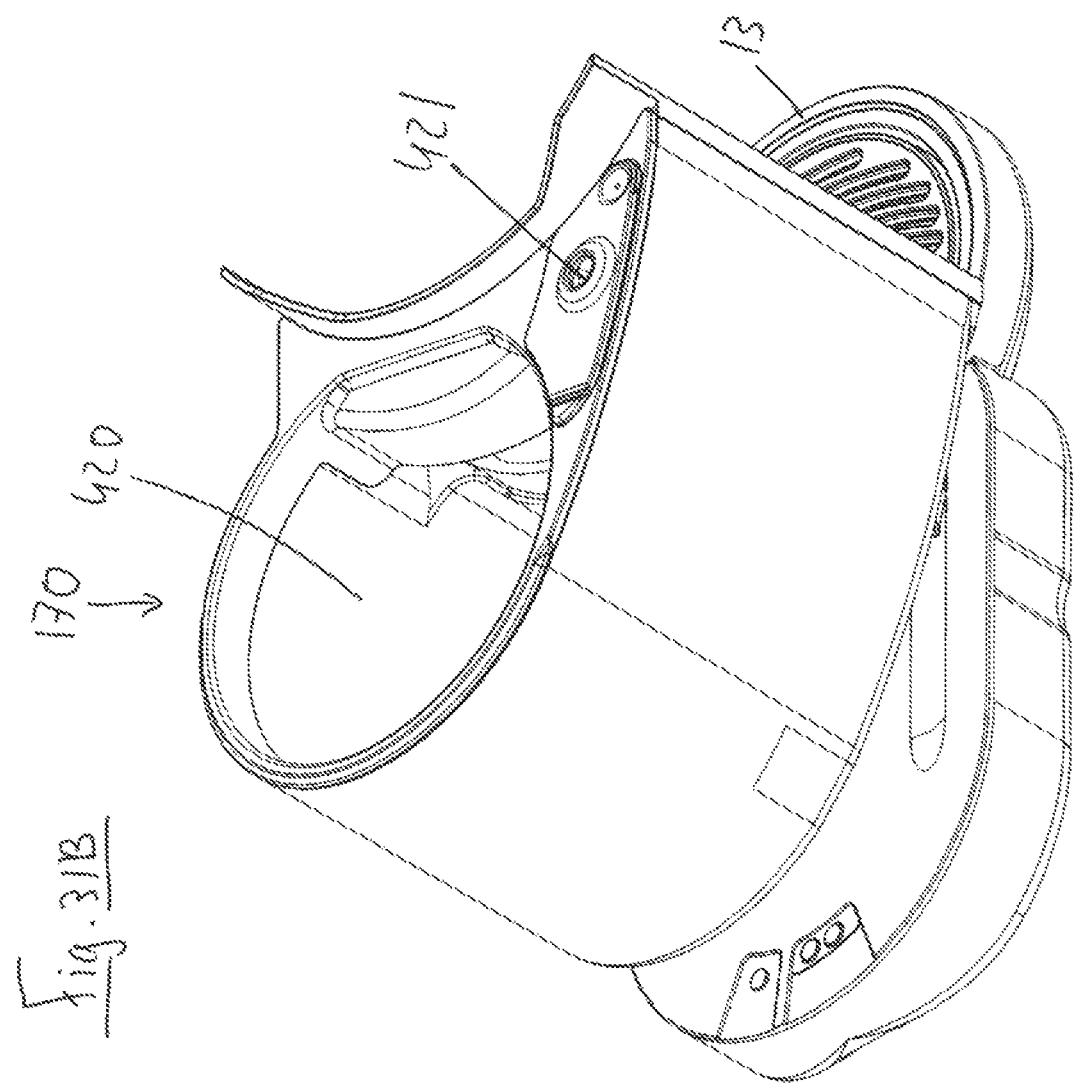

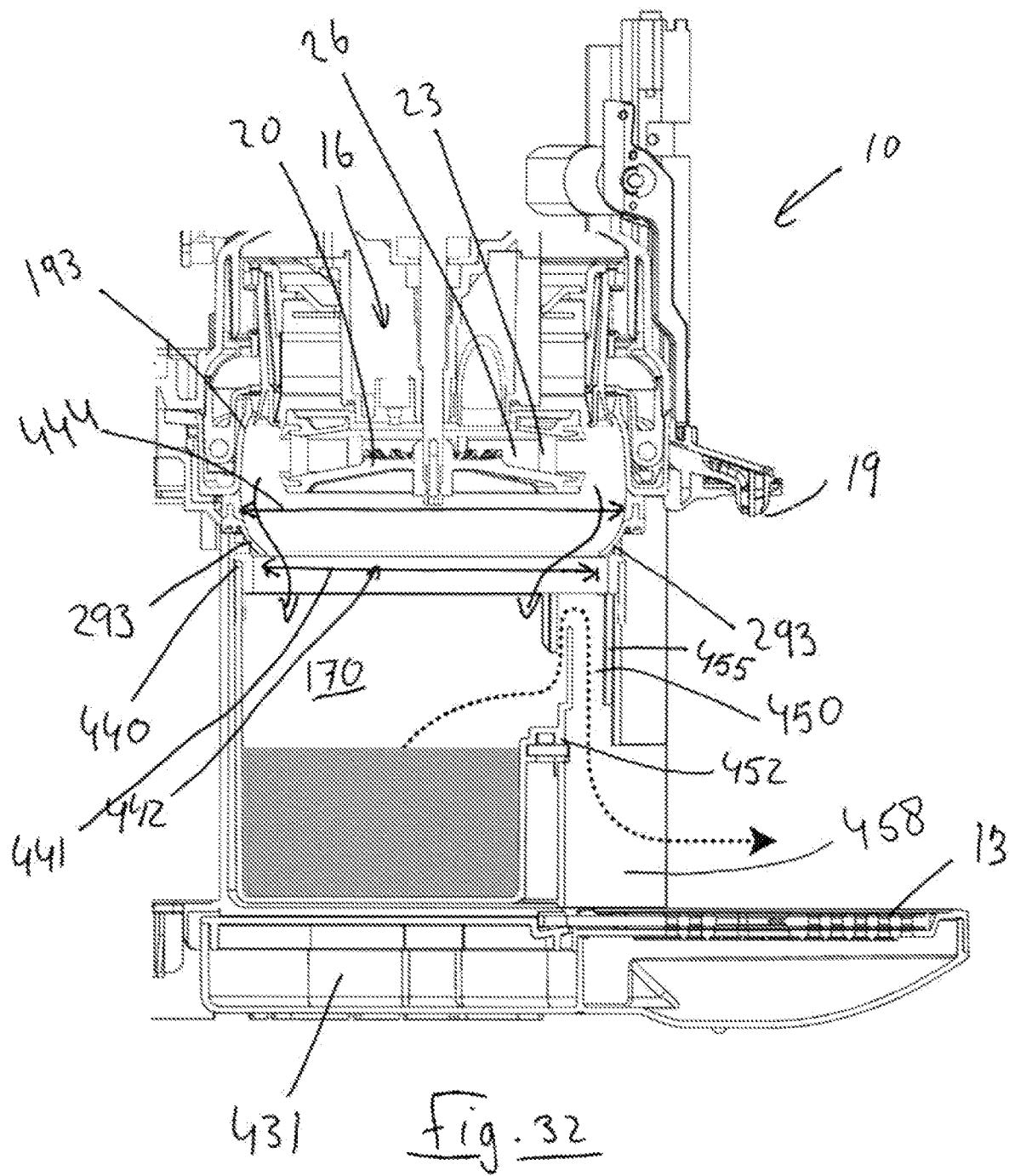

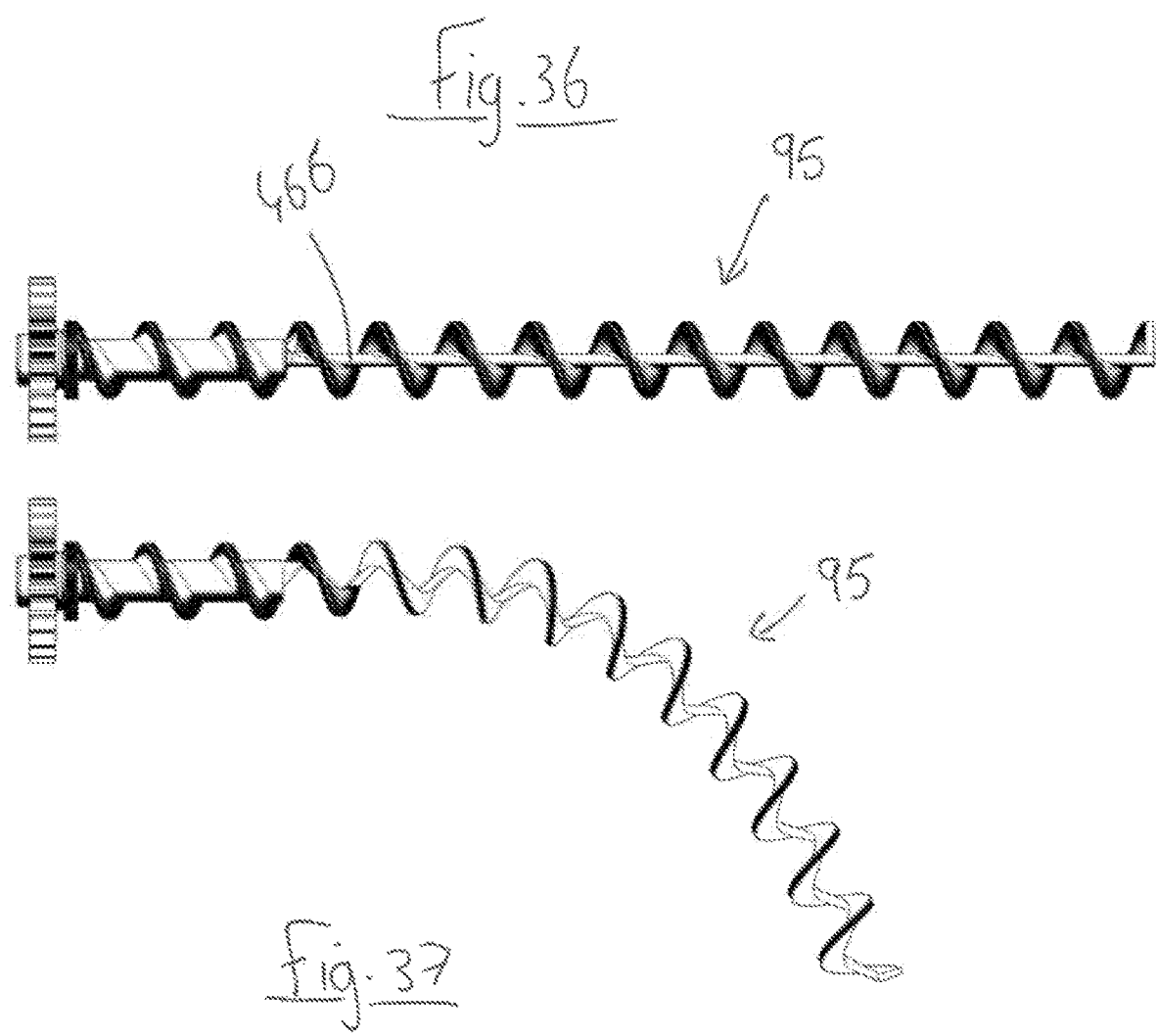

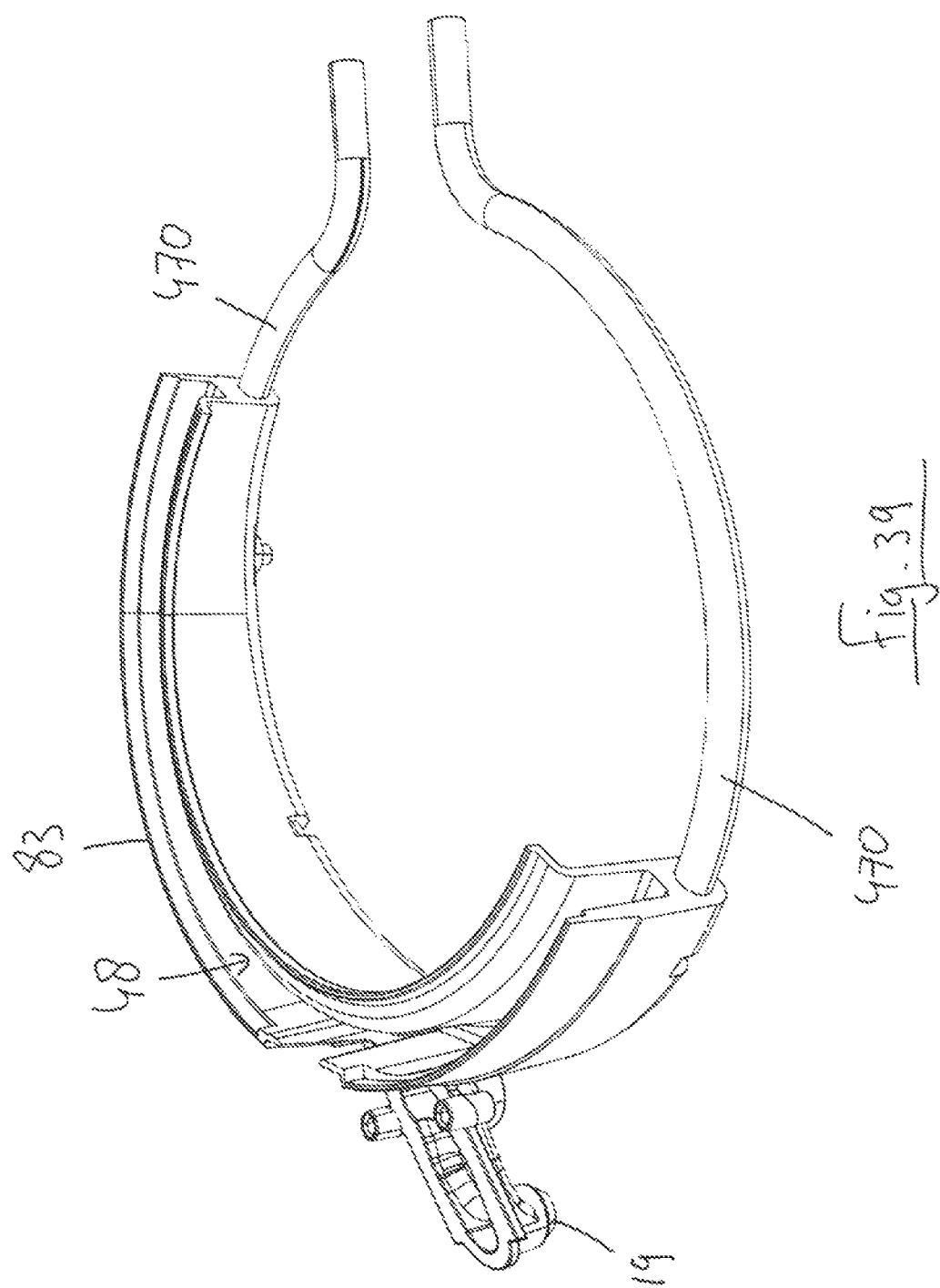

CENTRIFUGAL COFFEE BREWER AND METHOD OF USING SAME

FIELD OF THE INVENTION

The present invention relates to a centrifugal coffee brewer. Centrifugal coffee brewers are known.

BACKGROUND OF THE INVENTION

WO2017/010878A1 (herein: D1) discloses a centrifugal coffee brewer. It was found that this device has a number of drawbacks. One drawback is that the device experiences leakage. It was found to be very difficult to provide seals which prevent the coffee from leaking from the coffee brewer. It was recognized that this problem is associated with coffee residue not being expelled completely after the brewing of a cup of coffee. Some of the coffee residue stays behind on the seals and prevents the seals from adequately closing the brewing chamber in a next cup of coffee. This problem was found to increase with each cup of coffee which is made, because coffee residue which stays behind on the seals tends to attract further coffee residue and is 'squished' together after each closing of the brewer, thereby gradually increasing the amount of coffee residue on the seals and further increasing leakage.

Another drawback of the device is that the overall height of the device is considerable. The device is too high for placement in an average household kitchen. This is due to the fact that several parts are placed above one another.

Another problem with this device is the foaming of the coffee which is brewed. The brewing assembly comprises constricted outlets which create back pressure for the filter during centrifuging. However, the velocity with which the coffee is expelled from the outlets is quite high, resulting in turbulence and splashing, which in turn causes excessive foam to form. Some foam may be acceptable and in fact beneficial, because it improves the visual appearance and taste of the coffee in the cup. However, excessive formation of foam is undesirable.

Another problem associated with the device of D1 is the formation of mist and the spreading of mist throughout the device. It was found that this causes corrosion of metal parts, electronic parts and disfunction of the Printed Circuit Boards PCB's. Furthermore, the mist causes another problem which is clogging of the coffee supply channel. The mist condenses on the inner wall of the coffee supply channel, and coffee particles become attached to the wall of the coffee supply channel. Over time, this may become a problem.

Another problem associated with the device of D1 is that the temperature of the coffee in the cup is too low. It was recognized in the present invention that this is due to the loss of heat in various parts of the device. The hot water has to travel over a considerable distance and large surface area through the device and comes into contact with several parts. During each contact, heat from the hot water or hot coffee is transferred to the parts, and as a result the temperature of the coffee is too low. The too low temperature already occurs in the brewing chamber. A negative consequential effect of the too low temperature inside the brew chamber is under extraction of the coffee brewing. Hence, the result is not only a too low temperature of the coffee in the cup, but also bad taste.

Another problem associated with the device of D1 is that the brewer drive and control is custom made and therefore for a contract manufacturer quite complicated to manufacture and expensive at lower production quantities.

Another problem associated with the device of D1 is that the size of the coffee particles was difficult to control. The device can be used to make different styles of coffee, ranging from a ristretto (20 ml) to a lungo (100 ml). For the different coffee styles, different particle sizes are used. For an espresso, fine coffee particles with an average size of 240µ (microns) should be used and for a large cup, coarser particle sizes with an average size of 1150µ (microns) should be used. It was found that when a cup of one size is followed by a cup of another size, some particles which were intended for the first cup end up in the batch of ground coffee which is used for the second cup. This is undesirable because it results in a less accurate desired particle size distribution with lower quality of coffee as a result. It was recognized that this problem is associated with the grinder. Some coffee particles for the first cup remain are not expelled from the grinder by it impeller but stay behind in the grinder and are only expelled from the grinder with a subsequent batch of coffee particles.

A further problem associated with the device of D1 and other bean2cup full automatic coffee makers on the market is that the aroma and pleasant coffee scent which is released by the ground beans during grinding stays largely within the device. For high quality coffee experience by the consumer it is considered beneficial that aroma and scent exits the device via the spout at the front of the machine in the direction of the consumer during grinding and brewing of the coffee. This adds to the overall sensation of drinking a high quality coffee from fresh ground whole beans. The device of D1 is quite limited in this aspect.

A further problem of the device of D1 is that in practice, users of the device may have different wishes in terms of future options, the volume of the bean reservoir, water reservoir and the options for making different coffee styles coffee. In particular, small households with a small kitchen may prefer a small device with a small water tank and small bean reservoir whereas professional users may require a large device having a large water and bean reservoir. Professional users may also desire two different coffee bean reservoirs configured to hold two different kinds of coffee beans to brew with a mixture of different beans. The D1 design lacks the modularity to make these future options possible without a significant redesign of the device. This results in high tooling investment per each new model.

FR2236456 (D2) discloses a centrifugal coffee brewing device. FIG. 2 shows the device in the brewing configuration. FIG. 3 shows the device in the ejecting configuration. As disclosed in FIGS. 2 and 3, the brewing chamber is positioned in an upper position during the brewing of coffee (see FIG. 2) and positioned in a lower position during ejecting of the coffee residue (see FIG. 3). This is also explained in D1 on page 4, line 39-page 5, line 3.

BE823309 (D3) discloses a centrifugal coffee brewing device. FIGS. 4 and 6 show the device in the brewing configuration. FIGS. 5 and 7 show the device in the residue ejecting configuration. D3 is very similar to D2, and just like the one in D2 the brewing position is the upper position and the ejecting position is the lower position.

WO2012/069986A1 (D4) discloses two different variants of a centrifugal coffee brewing device, the variant according to FIGS. 1-8 and the variant according to FIGS. 9-11. Both variants work on the basis of the same principle. In the brewing position, a rotor 14 is located in a lower position as shown in FIG. 10. The coffee bed 230 is pressed against a wall of the sleeve portion during the centrifugal action. The coffee can flow outward through the slits 168. See paragraph 59 of D4.

After the brewing of the coffee, coffee residue is ejected. In order to do this, the rotor 14 is moved in a vertical direction upwards to an ejecting position. See FIG. 11. As is clear from FIG. 11, the holder 16 and the sleeve portion 42 are stationary in the vertical direction and are not moved in a vertical direction.

OBJECTS OF THE INVENTION

It is an object of the invention to provide a device which suffers less from at least one of the drawbacks mentioned above.

It is a further object of the invention to provide an alternative centrifugal coffee brewing device.

SUMMARY OF THE INVENTION

The centrifugal coffee brewing device as disclosed herein provides several independent improvements over the prior art.

Moving Filter

In a first aspect, the present invention relates to a centrifugal coffee brewing device, comprising:
 a spinning assembly which is rotatable about a main axis, the spinning assembly comprising:
 a chamber element comprising a bottom wall,
 a cylinder element comprising a filter,
 wherein the chamber element and the cylinder element form a brewing chamber,
 a main drive for rotating the spinning assembly about the main axis for centrifuging the coffee,
 wherein the cylinder element including the filter is movable between a first, lower position in which the filter forms the circumference of the brewing chamber and the spinning assembly has a brewing configuration, and a second, upper position in which the circumference of the brewing chamber is open, and in which second position coffee residue can be ejected by spinning the chamber element.

It was found that this construction is robust and reliable, cost efficient and reduces the chance of leakage, due to the self-cleaning effect on the seals by the vertical movement after every serving.

The chamber element may comprise a roof portion. Alternatively or additionally, the cylinder element may have a roof portion. The device may further comprise a core element having a core bottom wall which forms a further, central roof portion of the brewing chamber. The central roof portion may be stationary, whereas the roof portion of the chamber element or the roof portion of the cylindrical element is rotatable.

The chamber element may be stationary in the vertical direction and configured to only rotate about the main axis. This is a simple construction and results in a reliable device.

The chamber element may be stationary in the vertical direction and configured to only rotate about the main axis.

The cylinder element may be movable in an axial direction. This may be a vertical direction.

The device may comprise a cylinder drive assembly for moving the cylinder element from the first position to the second position and vice versa, wherein the cylinder drive assembly is separate from the main drive, and wherein the cylinder drive assembly comprises a cylinder actuator, in particular an electromotor.

The cylinder drive assembly may comprise:
 a ring gear which is driven by the cylinder actuator, wherein the ring gear is rotatable about the main axis,
 one or more cylinder spindles which are engaged by the ring gear and which are rotatable about respective cylinder spindle axes.

The cylinder element may comprise a cylinder cam, wherein the cylinder drive assembly comprises a cylinder drive cam which is configured to move up and down and is configured to engage the cylinder cam in order to move the cylinder element up and down via the cylinder cam.

The cylinder drive cam may comprise a top portion positioned above the cylinder cam and configured to move the cylinder element downwards by pushing the cylinder cam downward and a lower portion positioned below the cylinder cam and configured to move the cylinder element upward by pushing the cylinder cam upward.

The cylinder cam may extend inwardly and wherein the top portion and bottom portion extend outwardly.

The cylinder element may comprise one or more cylinder alignment cams, in particular located at an upper region of the cylinder element, wherein the cylinder alignment cams are configured to abut the chamber element for alignment of the cylinder element with the chamber element in the first position of the cylinder element.

The cylinder drive cam may be part of a ring shaped member connected to the at least one cylinder spindle, wherein the ring shaped member is configured to move up and down along the at least one cylinder spindle upon rotation of the at least one cylinder spindle.

The cylinder actuator and the main drive may be positioned above the spinning assembly, and wherein the cylinder actuator is in particular positioned adjacent the main drive.

The cylinder drive assembly may be configured to disengage the cylinder drive cam from the cylinder cam after the moving of the cylinder element from the second position to the first position and to create a gap between the cylinder cam and the cylinder drive cam, in order to allow the spinning assembly including the cylinder element to spin about the main axis without contacting the cylinder drive cam.

In the second position, the cylinder element may be disengaged from the chamber element, wherein the chamber element is in particular spun without the cylinder element in order to eject coffee residue.

The device may comprise a lower stop against which the cylinder element abuts when reaching the lower position, and wherein the device comprises a control unit, wherein the control unit is configured to measure a current flowing through the cylinder actuator, wherein the control unit compares the current with a current threshold value, and wherein when the current exceeds the current threshold value, the control unit assumes that the cylinder element has reached the first position and abuts the lower stop, after which the cylinder actuator reverses direction and moves the cylinder drive cam in the opposite direction over a limited distance in order to disengage the cylinder drive cam from the cylinder cam, wherein during said opposite movement the cylinder element is not substantially moved and remains in the lower position.

The device may be configured to stop the spinning of the spinning assembly prior to moving the cylinder element from the first position to the second position or vice versa.

The device may be configured to limit an acceleration and a deceleration of the spinning assembly to less than 400 rad/s2 in order to prevent slip between the cylinder element and the chamber element during acceleration or deceleration.

The main drive may comprise an axle which extends downward from the main drive and is directly connected to the chamber element, without a disengageable coupling or a helical cam track between the main drive and the cylinder element, and wherein the device comprises in particular a separate ground coffee channel and a hot water supply tube which are eccentric to the main axis.

The cylinder element may comprises at least one channel for guiding coffee which has passed the filter through the cylinder element to the outside thereof, wherein the channel comprises an entrance located downstream of the filter and a channel exit located downstream of the entrance, wherein the channel extends in an upward direction at an angle of at least 75 degrees to the horizontal, and in particular at least 80 degrees, between the entrance and the channel exit.

The main drive and the cylinder actuator may each rotate about a respective vertical axis.

The cylinder element may comprise flexible O-rings which support the filter.

The invention further relates to a method of brewing coffee, the method comprising:
  providing the device according to the invention,
  supplying ground coffee and hot water into the brewing chamber when the cylinder element is in the first position,
  spinning the spinning assembly in order to brew coffee,
  moving the cylinder element from the first position to the second position,
  spinning the chamber element in order to eject coffee residue,
  moving the cylinder element from the second position to the first position.

The method provides the same advantages as the device.

In an embodiment of the method, the chamber element is held stationary in the vertical direction during the movement of the cylinder element between the first and second position.

Upwardly Extending Channel

In another independent aspect, the centrifugal coffee brewing device comprises:
  a spinning assembly which is rotatable about a main axis, the spinning assembly comprising:
    a chamber element comprising a bottom wall,
    a cylinder element comprising a filter,
  wherein the chamber element and the cylinder element form a brewing chamber,
  a main drive for rotating the spinning assembly about the main axis for centrifuging the coffee,
wherein the cylinder element comprises at least one channel for guiding coffee which has passed the filter through the cylinder element to the outside thereof, wherein the channel comprises an entrance located downstream of the filter and a channel exit located downstream of the entrance, wherein the channel extends in an upward direction at an angle of at least 75 degrees to the horizontal, and in particular at least 80 degrees, between the entrance and the channel exit.

The channel exit may be located above a roof portion of the spinning assembly, in particular of the chamber element, when the cylinder element is in the first, lower position.

This provides an advantage in that water may be supplied to the brew chamber without a risk that the water leaves the brew chamber prematurely. This improves the steeping of the coffee for instance for a French press coffee. It also reduces mist formation.

The channel may extend at an angle of 85-89.9 degrees to the horizontal.

This configuration further reduces the overall height of the device. This is considered advantageous because one disadvantage of centrifugal coffee brewers is that they are quite high.

In an embodiment, the cylinder element including the filter is movable between a first, lower position in which the filter forms the circumference of the brewing chamber and in which the spinning assembly has a brewing configuration, and a second, upper position in which the circumference of the brewing chamber is open, and in which second position coffee residue can be ejected by spinning the chamber element, and wherein the channel exit is located above a roof portion of the chamber element when the cylinder element is in the first, lower position.

The channel may extend at an angle of 85-89.5 degrees to the horizontal.

The channel may extend over at least 30 percent of the circumference of the cylinder element, more in particular at least 50 percent, even more in particular at least 80 percent.

The channel may be annular and extend around the full circumference of the cylinder element and is conical.

The chamber element may be stationary in the vertical direction, wherein the device comprises a gutter via which the brewed coffee which is expelled from the spinning assembly travels to a coffee outlet, and wherein a lowest point of the gutter is located above a bottom wall of the chamber element.

At least a part of the gutter may be located above a roof portion of the spinning assembly, in particular of the chamber element.

The chamber element may be stationary in the vertical direction and only configured to rotate about the main axis.

The at least one channel may be free of any constricted outlets, in particular at the channel exit.

This aspect further relates to a method of brewing coffee, the method comprising:
  providing ground coffee in the brewing chamber of the device according to the invention,
  supplying hot water in the brewing chamber,
  spinning the spinning assembly in order to urge the hot water through the ground coffee bed and the filter,
  wherein the brewed coffee flows upward and outward through the channel over an angle of at least 75 degrees to the horizontal, and in particular at least 80 degrees, and is expelled from the channel exit of the channel.

The method provides the same advantages as the device.

Channel with Thin Plate

In one another aspect, the centrifugal coffee brewing device, comprises:
  a spinning assembly which is rotatable about a main axis, the spinning assembly comprising:
    a chamber element comprising a bottom wall,
    a cylinder element comprising a filter,
  wherein the chamber element and the cylinder element form a brewing chamber,
  a main drive or belt drive for rotating the spinning assembly about the main axis for centrifuging the coffee,
  wherein the cylinder element comprises at least one channel for the coffee, wherein the channel comprises an entrance located downstream of the filter and a channel exit located downstream of the entrance, wherein the channel comprises a plate, wherein the plate has a thickness of less than 0.4 mm, in particular less than 0.3 mm, and wherein an inner side of the plate is constructed as a flow surface along which the coffee flows through the channel, and wherein at an outer, opposite side of the plate an air pocket or insulation material is provided.

The plate reduces heat loss of the coffee in the device, resulting in coffee with a higher temperature. This is in particular an advantage with small amount of high concentrated coffees like ristretto and espresso cups.

In an embodiment, the cylinder element including the filter may be movable between a first, lower position in which the filter forms the circumference of the brewing chamber and in which the spinning assembly has a brewing configuration, and a second, upper position in which the circumference of the brewing chamber is open, and in which second position coffee residue can be ejected by spinning the chamber element, and wherein the channel exit is located above a roof portion of the chamber element when the cylinder element is in the first, lower position.

The channel may extend at an angle of 85-89.5 degrees to the horizontal.

The channel may extend over at least 30 percent of the circumference of the cylinder element, more in particular at least 50 percent, even more in particular at least 80 percent. This reduces formation of foam.

The channel may be annular and extends around the full circumference of the cylinder element and is conical.

The chamber element may be stationary in the vertical direction.

The device may comprises a gutter via which the brewed coffee which is expelled from the spinning assembly travels to a coffee outlet, wherein a lowest point of the gutter is located above a bottom wall of the chamber element.

At least a part of the gutter may be located above a roof portion of the spinning assembly, in particular of the chamber element.

The chamber element may be stationary in the vertical direction and only configured to rotate about the main axis.

The at least one channel may be free of any constricted outlets, in particular at the channel exit.

In this aspect, the invention further relates to a method of brewing coffee, the method comprising:
  providing ground coffee in the brewing chamber of the device according to the invention,
  supplying hot water in the brewing chamber,
  spinning the spinning assembly in order to urge the hot water through the ground coffee bed and the filter,
wherein the brewed coffee flows upward and outward through the channel over an angle of at least 75 degrees to the horizontal, and in particular at least 80 degrees, and is expelled from the channel exit of the channel.

The method provides the same advantages as the device.

Pre-Heating with Steam

In another aspect, the present invention relates to a centrifugal coffee brewing device, comprising:
  a spinning assembly which is rotatable about a main axis, the spinning assembly comprising:
    a chamber element comprising a bottom wall,
    a cylinder element comprising a filter,
    wherein the chamber element and the cylinder element form a brewing chamber,
  a main drive for rotating the spinning assembly about the main axis for centrifuging the coffee,
  a hot fluid supply configured for supplying hot water to the brewing chamber, the hot fluid supply comprising a heating element,
  a control unit for controlling at least the main drive and the hot fluid supply,
wherein the control unit is configured to cause the hot fluid supply to eject a quantity of steam for heating at least the brewing chamber and the catcher/gutter prior to the brewing of coffee.

This results in a reduced heat loss, better extraction of coffee and a higher temperature of the coffee leaving the machine via its spout.

In an embodiment, wherein the control unit may be configured to cause the hot fluid supply to eject the quantity of steam prior to supplying hot water to the brewing chamber.

In an embodiment, the device may be configured to spin the spinning assembly during the injection of at least a part of the quantity of steam.

The device may be configured to inject at least a part of the quantity of steam after the ground coffee is supplied into the brewing chamber and/or during the supply of the ground coffee into the brewing chamber and prior to the brewing of the coffee for heating the ground coffee prior to the brewing of the coffee.

The hot fluid supply may comprise a hot water supply tube which extends from the heating element and which opens into the brewing chamber at a water opening, wherein the water opening is in particular provided in a stationary core element, wherein the device is configured to eject the steam via the hot water supply tube into the brewing chamber.

The quantity of steam—when condensed to water—may be less than 10 ml, more in particular less than 5 ml, even more in particular less than 2 ml and preferably is at least 1 ml.

The steam may be injected in a time period of 1-15 seconds, in particular 1-7 seconds, and wherein the injection of steam is in particular carried intermittently.

The cylinder element may comprise a channel via which the coffee leaves the spinning assembly, wherein the device comprises a gutter via which the brewed coffee travels to the coffee outlet, and wherein the control unit is configured to let the hot fluid supply eject a quantity of steam for heating the brewing chamber, the filter, the channel and the gutter.

The different parts which are heated prior to the brewing of the coffee may be heated by condensation of the steam onto the parts.

The device may comprise at least one roof airflow device or an axle airflow device configured to cause an airflow through the device when the spinning assembly is spinning, in particular from the outside into the brewing chamber, from the brewing chamber through the channel in the cylinder element and into the gutter, wherein said airflow causes at least a part of the quantity of steam to be conveyed through the channel and into the gutter for heating the channel and the gutter prior to the brewing of coffee.

The centrifugal coffee brewing device may comprise a core part, in particular a stationary core part, and
  wherein the chamber element comprises a roof portion having a central opening defined by an inner rim, wherein the inner rim extends around the core part, wherein a roof gap is defined between the inner rim and the core part, and wherein the inner rim tapers outwardly in a downward direction, thereby defining a roof airflow device, and/or
  wherein an axle gap is defined between an axle which extends from the main drive to the bottom wall of the chamber element and a core bottom wall of the core part, the axle gap being defined by an inwardly facing core surface and the axle, wherein the inwardly facing core surface tapers outwardly in a downward direction, thereby defining an axle airflow device, wherein the roof airflow device and/or the axle airflow device cause the airflow during spinning of the spinning assembly, conveying the steam from the outside through the brewing chamber, through the filter, through the channel and into the gutter.

The airflow devices reduce rising of mist to the vulnerable electronic parts of the device and to parts which are sensitive to corrosion and may improve the sensation of coffee aroma for the users.

The device may be configured to spin the spinning assembly at a first, relatively high rotational speed to heat the channel and the gutter and to spin the spinning assembly at a second, relatively low rotational speed for heating the brewing chamber, wherein the spinning at the second, relatively low rotational speed preferably takes place after the spinning at the first, relatively high rotational speed.

The steam may have a temperature of 100-107 degrees Celsius.

In this aspect, a method of brewing coffee is provided, the method comprising:
    providing ground coffee in brewing chamber of the device according to the invention,
    supplying hot water in the brewing chamber,
    spinning the spinning assembly with the main drive in order to brew coffee, wherein prior to the brewing of coffee, a quantity of steam is supplied to the brewing chamber for heating at least the brewing chamber of the device.

The method provides the same advantages as the device.

In an embodiment of the method, the quantity of steam—when condensed to water—may be less than 10 ml, more in particular less than 5 ml, even more in particular less than 2 ml and preferably is at least 1 ml.

In an embodiment of the method the steam may be supplied in a time period of at most 15 seconds.

In an embodiment of the method, the cylinder element may comprise a channel for the coffee, wherein the device comprises a gutter via which the brewed coffee which is expelled from the cylinder element travels to the coffee outlet, and wherein the quantity of steam heats the chamber, the filter, the channel and the gutter.

In an embodiment of the method, the different parts which are heated prior to the brewing of the coffee may be heated by condensation of the steam onto the parts.

In an embodiment of the method, the spinning assembly may be spun during the injection of at least a part of the quantity of steam.

In an embodiment of the method, the centrifugal coffee brewing device may comprise a core part, in particular a stationary core part, and
    wherein the chamber element comprises a roof portion having a central opening defined by an inner rim, wherein the inner rim extends around the core part, wherein a roof gap is defined between the inner rim and the core part, and wherein the inner rim tapers outwardly in a downward direction, thereby defining a roof airflow device, and/or
    wherein an axle gap is defined between an axle which extends from the main drive to the bottom wall of the chamber element and a core bottom wall of the core part, the axle gap being defined by an inwardly facing core surface and the axle, wherein the inwardly facing core surface tapers outwardly in a downward direction, thereby defining an axle airflow device,
    wherein the roof airflow device and/or the axle airflow device cause the airflow during spinning of the spinning assembly, conveying the steam from the outside through the brewing chamber, through the filter, through the channel and into the gutter In an embodiment of the method, during the injection of steam the spinning assembly may be spun at a first, relatively high rotational speed for heating the channel and the gutter and wherein the spinning assembly is spun at a second, relatively low rotational speed for heating the brewing chamber.

In an embodiment of the method, at least a part of the quantity of steam may be injected after the ground coffee is supplied into the brewing chamber and/or during the supply of the ground coffee into the brewing chamber for heating the ground coffee prior to the brewing of the coffee.

The steam may have a temperature of 100-107 degrees Celsius.

Airflow

In another independent aspect, the present invention relates to a centrifugal coffee brewing device, comprising:
    a spinning assembly which is rotatable about a main axis, the spinning assembly comprising:
        a chamber element comprising a bottom wall,
        a cylinder element comprising a filter,
    wherein the cylinder element and the chamber element form a brewing chamber,
    a main drive for rotating the spinning assembly about the main axis for centrifuging the coffee,
    a gutter via which the brewed coffee which is expelled from the spinning assembly travels to a coffee outlet,
    a circumferential airflow device comprising:
        an inwardly facing wall which extends around the cylinder element when the cylinder element is in the first, lower position, and which is located above an outflow passage in the cylinder element,
        a circumferential gap which is defined between the inwardly facing wall and the outer circumference of the cylinder element, wherein the circumferential air flow generated by the circumferential airflow device flows downward through the circumferential gap when the spinning element spins.

In this way, the risk that mist created inside the brewer and gutter reaches mechanical and electronic parts of the device is reduced.

The device may comprise a ground coffee channel airflow device formed by a conveyor, wherein the conveyor comprises a:
    a supply tube extending from a coffee bean grinder to the brewing chamber,
    a transport screw extending through the supply tube and mounted for rotation,
    a screw drive configured for rotating the transport screw,
    wherein the transport screw is configured to convey air into the brewing chamber together with the ground coffee.

An advantage of this embodiment is a better sensation of aroma and scent exposed by the fresh ground coffee for the user, because more coffee aroma and scent exits the coffee outlet during the grinding and brewing process.

In an embodiment, the inwardly facing wall may taper outward in a downward direction at the circumferential gap, wherein the circumferential airflow in the circumferential gap is helical as a result of the tapering inner rim.

In an embodiment, the device may further comprise a ground coffee channel airflow device formed by a conveyor, wherein the conveyor comprises a:

a supply tube extending from a coffee bean grinder to the brewing chamber, a transport screw extending through the supply tube and mounted for rotation, a screw drive configured for rotating the transport screw, wherein the transport screw is configured to convey air into the brewing chamber together with the ground coffee.

In an embodiment, the device may comprise a roof airflow device and/or an axle airflow device configured for creating a roof airflow from the outside into the brewing chamber, through the brewing chamber, through the filter, through a channel in the cylinder element and into the gutter.

In an embodiment, the centrifugal coffee brewing device may comprise a core part, in particular a stationary core part, wherein the chamber element or the cylinder element comprises a roof portion having a central opening defined by an inner rim, wherein the inner rim extends around the core part, wherein the roof airflow device comprises a roof gap which is defined between the inner rim and the core part, wherein the inner rim tapers outwardly in a downward direction, wherein the roof airflow in the roof gap is helical as a result of the tapering inner rim, wherein the roof air flow generated by the roof airflow device flows downward through the roof gap when the spinning element spins.

In an embodiment, the device may comprise an axle which extends downward from the main drive and is connected to the bottom wall, wherein an axle gap is provided between the axle and a core bottom wall of the core part, the axle gap being defined by an inwardly facing core surface and the axle, wherein the inwardly facing core surface tapers outwardly in a downward direction, thereby defining an axle airflow device.

In an embodiment, the core part may comprise at least one air duct, in particular provided in a side wall of the core part, wherein the core part is open at an upper side and is in communication with the outside via the upper side, and wherein the first air duct provides communication between an inner volume of the core art and a space within said housing and extending around the core part.

In an embodiment, the device comprises a lower airflow device comprising a lower gap, the lower gap being located below an outflow passage of the cylinder element and located between the cylinder element and an upstanding wall part, wherein the lower airflow device is configured for creating a lower airflow through the lower gap into the gutter.

The cylinder element may form an inverted U-shape over the upstanding wall part, the lower gap also having an inverted U-shape.

At least one inwardly facing wall of the lower gap may taper in order to create the lower airflow during spinning of the spinning assembly.

In an embodiment, the lower airflow device may comprise a skirt extending downward from a lower cylindrical support member of the cylinder element and extending around the upstanding part.

In an embodiment, wherein the roof airflow device, axle airflow device, circumferential air flow device and/or lower airflow device may comprise an air pump, in particular a ventilator, wherein:

the ventilator is formed by blades connected to the spinning assembly, or a separate air pump which is separate from the spinning assembly, in particular having a separate air pump drive.

In an embodiment, the ground coffee channel airflow, the roof airflow and/or the axle airflow may flow through the brewing chamber, through the filter and via the channel into the gutter where they merge with the circumferential airflow and/or with the lower airflow, and wherein the combined airflows flow to the outside via the coffee outlet.

In this aspect a method of brewing coffee is provided, the method comprising:

supplying ground coffee into the brewing chamber of the device according to the invention, supplying hot water in the brewing chamber, spinning the spinning assembly with the main drive in order to brew coffee, wherein during the spinning of the spinning assembly a ground coffee channel airflow, an axle air flow, a roof airflow, a circumferential air flow and/or a lower airflow is created.

Seals

In another aspect, the present invention relates to a centrifugal coffee brewing device, comprising:

a spinning assembly which is rotatable about a main axis, the spinning assembly comprising:
a chamber element comprising a bottom wall,
a cylinder element comprising a filter,
wherein the chamber element and the cylinder element form a brewing chamber, a main drive for rotating the spinning assembly about the main axis for centrifuging the coffee, wherein the cylinder element including the filter is movable relative to the chamber element and relative to the main drive between a first position in which the filter forms the circumference of the brewing chamber and in which the spinning assembly has a brewing configuration, and a second position in which the circumference of the brewing chamber is open and in which coffee residue can be ejected by rotating the spinning assembly, wherein the chamber element comprises a lower seal which in the first position engages the cylinder element, wherein the lower seal is a radial seal, wherein the lower seal engages a lower inwardly facing surface of the cylinder element.

The seal provides a reliable sealing function during spinning of the spinning assembly. The seal is designed in a way that no coffee residue is left within the seals after each serving.

In an embodiment, the device may comprise an upper seal, wherein the upper seal engages an upper inwardly facing surface of the cylinder element.

In an embodiment, the upper inwardly facing surface may be conical and taper outwardly in a downward direction.

In an embodiment, the lower inwardly facing surface may comprise an inwardly protruding bulge having a top, wherein the lower seal engages the lower inwardly facing surface above the top of the bulge.

In an embodiment, the upper seal may extend in an outward and downward direction away from a roof portion of the chamber element, and extends in particular at an angle of 25-45 degrees to the horizontal, and/or wherein the lower seal extends in an outward and upward direction away from a bottom wall of the chamber element, and extends in particular at an angle of 25-45 degrees to the horizontal.

In an embodiment, the cylinder element and the chamber element may be configured to translate relative to one another in the axial direction without a relative rotation about the main axis.

In an embodiment, the lower seal and the lower inwardly facing surface may have a smaller diameter than the upper seal respectively the upper inwardly facing surface.

In an embodiment, the lower seal may comprise a base part which forms part of a bottom wall of the chamber element, and/or wherein the upper seal comprises a base part which forms part of a roof portion of the chamber element, and wherein in particular the base part of the lower seal has a height of less than 5 mm, preferably less than 3 mm, and wherein in particular a chamber filled with air or thermal insulation is located below the base part of the lower seal.

In an embodiment, the bottom wall comprises a bottom support element, and wherein the base part is supported by protrusions extending between the bottom support element and a lower side of the base part.

Coffee Bean Grinder with Cleaning Function

In another independent aspect the present invention relates to a coffee bean grinder comprising:
 a housing,
 an outer burr,
 an inner burr positioned within the outer burr,
 wherein the inner and outer burr are rotatable relative to one another about a main grinder axis,
 an impeller comprising impeller blades for expelling the ground coffee from the coffee bean grinder, the impeller being positioned below the inner and outer burr, the impeller being coupled to the inner burr,
 a grinder drive configured for rotating the inner and outer burr relative to one another and configured for rotating the impeller:
  in a first rotational direction for grinding coffee beans with the inner and outer burr and expelling the ground coffee from the coffee bean grinder with the impeller, and
  in a second, opposite rotational direction for expelling the ground coffee from the coffee bean grinder with the impeller, wherein in the second rotational direction the coffee bean grinder does not grind.

The coffee bean grinder has a cleaning function in the second rotational direction, in, which it empties itself. This ensures that ground coffee does not stay behind. Hence, for each cup of coffee fresh coffee is used of the right size of coffee particles. At the end of each cleaning cycle the inner bur may rotate and move towards it's upper or lower extreme position helping to expel out all the remaining coffee from the grinder chamber.

The outer burr may be stationary and the inner burr may be rotatable and coupled to the grinder drive, and the impeller may be coupled to the inner burr.

The position of the inner bur may be adjustable in the direction of the main grinder axis and the position of the outer burr may be fixed in the direction of the main grinder axis.

The coffee bean grinder may comprise:
 an adjustment drive for adjusting a relative position of the inner and outer burr by displacing the inner and outer burr relative to one another in an axial direction,
 an adjustment transmission arranged between the adjustment drive and the inner or outer burr,
 wherein the impeller is connected to the adjustment transmission and is displaced in the axial direction when adjusting the relative position of the inner and outer burr.

In an embodiment, the adjustment transmission may comprise a rotatable adjustment gear which is coaxially arranged with the main grinder axis and connected to the inner bur or outer burr, in particular to the inner burr, wherein the rotatable adjustment gear comprises thread, wherein the grinder housing comprises mating thread, wherein a rotation of the rotatable adjustment gear causes an axial displacement of the rotatable adjustment gear and the inner burr and the impeller.

In an embodiment, the inner burr may be rotatable and adjustable in the direction of the grinder axis, wherein the coffee bean grinder comprises:
 a grinder axle which connects the grinder drive to the inner burr,
 a grinder bearing which provides radial and axial support for the grinder axle, wherein the grinder bearing and the grinder axle are connected to or abut the rotatable adjustment gear and move up and down with the rotatable adjustment gear during adjustment of the inner burr in the axial direction.

In an embodiment, the grinder axle may comprise a first axle part connected to the grinder drive and a second axle part connected to the inner burr, wherein the first axle part and second axle part are interconnected by an axle coupling and are configured for making a telescoping movement relative to one another during adjustment of the inner burr in the axial direction, wherein the second axle part moves in the axial direction and the first axle part remains stationary in the axial direction during the adjustment.

In an embodiment, the grinder axle may extend through a bore in the rotatable adjustment gear.

In an embodiment, the impeller is located below the inner bur, wherein the grinder bearing is located below the impeller and wherein the rotatable adjustment gear is located below the grinder bearing.

In an embodiment, the coffee bean grinder may be configured to move the inner or outer burr to an extreme upper position or extreme lower position after each grinding operation.

In an embodiment, the coffee bean grinder may be configured to adjust the relative position of the inner and outer burr in the direction of the main grinder axis during rotation in the second rotational direction.

In an embodiment, the impeller blades may have sharp lower edges for cutting through coffee particles located below the impeller blades when moving downward in an adjusting step.

In an embodiment, the impeller blades may be symmetric in the rotational direction, and expel ground coffee in both the first rotational direction and the second rotational direction.

This aspect further relates to a method of grinding coffee beans, the method comprising:
 providing coffee beans to the coffee bean grinder according to the invention,
 rotating the inner and outer burr relative to one another in a first rotational direction, thereby grinding the coffee beans and expelling the ground coffee with the impeller via the grinder exit opening,
 after the grinding, reversing the rotational direction and rotating the inner and outer burr relative to one another in the second, opposite rotational direction and cleaning the coffee grinder by expelling remaining ground coffee particles from the coffee bean grinder by the impeller without grinding coffee beans.

In an embodiment of the method, after or during the cleaning action, the axial position of the inner relative to the outer burr may be adjusted.

In an embodiment of the method, in the adjustment step the inner and outer burr are moved relative to one another in the direction of the main grinder axis from a first grinder position to a second grinder position or vice versa for adjusting the coffee bean grinder, wherein the adjustment takes place without moving the inner or outer burr to a separate home position.

Conveyor for a Beverage Preparation Device

In another aspect, the present disclosure relates to a beverage preparation device comprising a conveyor for conveying powder or granulate from a first location to a beverage preparation location for the preparation of the beverage, the conveyor comprising:
- a supply tube extending from the first location to the beverage preparation location, the supply tube comprising an entry opening and an exit opening,
- a transport screw extending through the supply tube and mounted for rotation,
- a screw drive configured for rotating the transport screw, wherein the supply tube is curved and wherein the transport screw is flexible.

Although the present conveyor was developed for the centrifugal coffee device disclosed herein, it was recognized that the same conveyor may be used in other beverage preparation devices for instance for coffee, hot chocolate, soup, or a different beverage which is based on powder or granulate. The powder may also be milk powder.

The beverage preparation device may in particular be a centrifugal coffee brewing device, comprising:
- a spinning assembly comprising a chamber element and a cylinder element which form a brewing chamber and are configured to rotate about a main axis,
- a coffee bean grinder for grinding coffee beans into ground coffee,
- wherein the supply tube extends from the coffee bean grinder to the brewing chamber, wherein the conveyor is configured for transporting ground coffee from the coffee bean grinder to the brewing chamber.

In an embodiment, the transport screw may be manufactured from a flexible synthetic material.

In an embodiment, the supply tube may comprise a horizontal tube part at the entry opening, wherein the horizontal tube part extends at an angle of less than 5 degrees to the horizontal.

In an embodiment, the supply tube may be curved in two independent planes of curvature, having a first curvature when seen in side view and a second curvature when seen in top view. In this way the brewing chamber can be reached better.

In an embodiment, the supply tube extends through a roof opening of the brewing chamber and opens into the brewing chamber, and extends in particular through a core bottom wall of a core element, which is in particular stationary, wherein the roof opening is in particular positioned eccentrically from the main axis. This provides room for the axle to extend through the centre.

In an embodiment, the centrifugal coffee brewing device may comprise at least one separate merge tube extending from a hopper or from a separate inlet opening toward the supply tube where it merges with the supply tube at a merge location.

In an embodiment, the centrifugal coffee brewing device may comprise a separate hot water supply tube for supplying hot water into the brewing chamber, wherein the hot water supply tube enters the brewing chamber via a separate water opening in the brewing chamber, in particular a separate water opening in a core bottom wall of the core element, wherein said water opening is located eccentrically from the main axis.

In an embodiment, the conveyor may be configured to pump both powder or granulate and air into the brewing chamber.

In an embodiment, the supply tube may be oriented at an angle of 50-90 degrees to the horizontal at the roof portion of the chamber element.

In an embodiment, the curved supply tube may have a varying curvature along the length of the tube.

In an embodiment:
- the transport screw may be segmented, and/or
- the transport screw may have a variable pitch, and/or
- the transport screw may have a variable diameter.

In an embodiment, at least a part of the supply tube extends downwards.

In an embodiment, the conveyor may convey the ground coffee at a velocity which is at least twice as high as the velocity with which the ground coffee exits the coffee bean grinder, measured in meter per second, and in particular three times as high, even more in particular four times as high.

In this aspect of the invention a method for conveying powder or granulate in a beverage preparation device comprising conveying ground coffee by rotating the transport screw, wherein the screw rotates and deforms during rotation.

In an embodiment, the centrifugal coffee brewing may not have a hopper for beans and also not have a grinder. In this embodiment, the conveyor may conveys pre-ground coffee. This embodiment provides an advantage that the pre-ground coffee is more evenly distributed in comparison with a coffee channel which has no transport screw and which ends directly in the brew chamber.

This ground coffee conveyor has an advantage or reliable and more equal coffee supply into the brewing chamber, with a reduced risk of clogging. It also prevents rising of mist and may function as an air pump which enhances the aroma sensation of the user during the grinding process and prevents the flow of steam and mist between the brewer and the grinder and thus protect the grinder and coffee beans within the hopper from 'damage'

The transport screw may be removable via an opening in the upstream end of the supply tube. The opening may be closed with a removable cap.

Offset Position of Spinning Assembly

In another aspect, the invention provides a centrifugal coffee brewing device, comprising:
- a spinning assembly which is rotatable about a main axis, the spinning assembly comprising:
  - a chamber element comprising a bottom wall,
  - a cylinder element comprising a filter,
  - wherein the chamber element and the cylinder element form a brewing chamber,
- a main drive for rotating the spinning assembly about the main axis for centrifuging the coffee,
- a housing extending around the spinning assembly and the main drive,
- a coffee bean grinder for grinding coffee beans into ground coffee,
- wherein in top view the main axis of the brewer device is positioned at a distance from a vertical midplane extending from a front side of the housing to a rear side of the housing, the midplane dividing the housing in a left part and a right part which are equal in size, wherein the main axis is positioned at one side of the midplane and the coffee bean grinder is positioned at an opposite side of the midplane, at a distance from said midplane.

In top view the main grinder axis may be positioned to the rear of the main axis of the brewer device.

This configuration results in a better use of the internal volume in the housing and a more compact device.

In top view the main grinder axis may be positioned to the rear of the main axis.

The device may comprise:
- a residue tray for holding coffee residue, the residue tray being positioned below the spinning assembly,
- a tray support position in which the residue tray is positioned below the spinning assembly, the tray position being positioned eccentrically from the vertical midplane,
- a front opening positioned in the front side of the housing, in particular centrally in the front housing,
- a tray trajectory extending from the front opening to the residue tray position, and along which the residue tray can be inserted into the device and positioned in the tray support position and can be taken out of the device when it is filled with coffee residue, wherein in top view the tray trajectory extends at a sharp angle α to the midplane.

In top view the tray trajectory may be curved.

In front view the spinning assembly may be positioned on a right side of the midplane and the coffee bean grinder is positioned on a left side of the midplane.

Modular Arrangement

In another independent aspect, a method is provided of producing centrifugal coffee brewing devices in a first, small configuration and a second, large configuration, the method comprising assembling the devices with a front part which is the same for the small and large configuration and with at least two versions of a rear part, wherein the front part comprises:
- a spinning assembly which is rotatable about a main axis, the spinning assembly comprising:
  - a chamber element comprising a bottom wall and a roof portion,
  - a cylinder element comprising a filter,
  wherein the chamber element and the cylinder element form a brewing chamber,
- a main drive for rotating the spinning assembly about the main axis for centrifuging the coffee,
- a coffee bean grinder for grinding coffee beans into ground coffee, the coffee bean grinder having an inner and outer burr which are rotatable relative to one another about a main grinder axis, and wherein a first, small version of the rear part comprises:
- a water tank for holding water,
- no coffee bean hopper for storing coffee beans,
and wherein a second, large version of the rear part comprises:
- a water tank for holding water, and
- at least one coffee bean hopper for storing coffee beans, wherein the method comprises producing:
  - a number of devices having the small configuration, and
  - a number of devices having the large configuration.

This method of production allows a cost-effective production of both small and large versions of the device, with minimal tooling requirements.

The front part which stays the same may additionally comprise the residue tray, the coffee outlet and the drip tray.

In an embodiment of the method the device comprises a frame, wherein the frame comprises at least a front frame part and a rear frame part, wherein the front frame part and the rear frame part are separate parts which are interconnected via connectors or via adhesive, wherein the front frame part supports the spinning assembly and the coffee bean grinder, and wherein the rear frame part supports at least the water tank, and wherein the method comprises providing both a small rear frame part for the small configuration and a large rear frame part for the large configuration and connecting to each front frame part a small rear frame part or a large rear frame part.

In an embodiment of the method, the at least one coffee bean hopper is positioned to the rear of the spinning assembly and to the rear of the coffee bean grinder and is supported by the large rear frame part.

In an embodiment of the method, the large rear part comprises a first coffee bean hopper and a second coffee bean hopper which are positioned to the rear of the spinning assembly and to the rear of the coffee bean grinder.

In an embodiment of the method, in top view the main axis is positioned eccentrically from a vertical midplane extending from a front side of the housing to a rear side of the housing, the midplane dividing the housing in a left part and a right part which are equal in size, wherein the main axis is positioned on one side of the midplane and the coffee bean grinder is positioned on an opposite side of the midplane.

In an embodiment of the method, the grinder axis is positioned to the rear of the main axis, wherein the housing has a housing length (Lh), and wherein the grinder axis is positioned at a distance (Dg) of 40-60 percent of the housing length (Lh) from a front side of the housing.

This configuration enables a modular production of the device. The forward part of the device can stay the same for different sizes of the rear part of the device. Both the size of the water tank and the size and number of the coffee bean hoppers can be varied while keeping the forward part including the front frame part and the spinning assembly and the grinder substantially the same.

When seen in top view the spinning assembly may have a rearmost part, and wherein the grinder axis is positioned at a distance (Df) forward of the rearmost part. In this way, the parts which can stay the same for each version of the device are positioned relative to the front of the device, thereby reserving the rear part of the device for parts which need to change in size or configuration dependent on the desired version.

Shape of Outflow Passages

In another aspect, the present invention relates to a centrifugal coffee brewing device, comprising:
- a spinning assembly which is rotatable about a main axis, the spinning assembly comprising:
  - a chamber element comprising a bottom wall,
  - a cylinder element comprising a filter,
- a main drive for rotating the spinning assembly about the main axis for centrifuging the coffee,
- a gutter for collecting coffee expelled from the spinning assembly, wherein the gutter extends around the spinning assembly,
- a deflection member positioned above the gutter and configured to deflect coffee which is expelled from the cylinder element in a downward direction into the gutter,
wherein the cylinder element comprises a channel via which the coffee travels from the filter and leaves the cylinder element, wherein the channel comprises an entrance downstream of the filter and a channel exit, wherein the channel extends at an angle of at least 75, more in particular at least 80 degrees to the horizontal, wherein the cylinder element comprises an outflow passage positioned downstream of the channel, the outflow passage being oriented horizontally and being defined between a passage floor and a passage ceiling of the outflow passage, wherein the cylinder element comprises a turn at the channel exit where the coffee which flows from the exit turns from travelling upward to travelling in a substantially horizontal direction, and wherein at least an outer part of the outflow passage has a height between the passage floor and the passage ceiling of at least 1 mm, in particular at least 2 mm, more in particular at least 3 mm, and wherein the turn comprises a threshold over which the coffee travels and which defines the exit of the channel, wherein the threshold is located at a level of 20-80 percent, in particular 30-70 percent, more in particular 40-60 percent, of the height of said outer part of the outflow passage This configuration prevents or minimizes direct contact between the coffee and the floor and ceiling of the outflow passage, thereby reducing heat loss and resulting in a higher temperature of the coffee.

In an embodiment, the coffee which flows over the threshold makes no contact with the passage floor and the passage ceiling of the outflow passage.

The outflow passage may comprise an inner part having a smaller height than the outer part.

The outflow passage may be directed at the deflection member, wherein the deflection member is oriented inwardly and downwardly.

The passage floor and the passage ceiling may extend about the main axis over a circumferential angle of at least 300 degrees.

The passage floor and the passage ceiling may be horizontal or taper outwardly.

The outflow passage may comprise a transition between the inner part and the outer part, at which the height of the outflow passage increases, wherein the transition is in particular sharp, i.e. the height of the outflow passage exit increases from a first height to the second height over a distance which is smaller than the first height.

This aspect further relates to a method of brewing coffee, the method comprising:
  providing the device according to the invention,
  brewing coffee by supplying ground coffee and hot water and spinning the spinning assembly,
  wherein the coffee flows upward and outward through the channel, makes a turn at the turn and flows horizontally through the outflow passage, wherein the coffee does not contact the passage floor and channel ceiling in the outer part of the outflow passage.

Parts in Foam Material

In another aspect, the present invention relates to a centrifugal coffee brewing device, comprising:
  a spinning assembly which is rotatable about a main axis, the spinning assembly comprising:
    a chamber element comprising a bottom wall,
    a cylinder element comprising a filter
  a main drive for rotating the spinning assembly about the main axis for centrifuging the coffee,
  a gutter element which defines a gutter for collecting coffee expelled from the spinning assembly, wherein the gutter extends around the spinning assembly,
  a deflection member positioned above the gutter and configured to deflect coffee which is expelled from the cylinder element in a downward direction into the gutter, wherein at least the gutter element is manufactured from a foam material.

This reduces heat loss of the coffee when travelling through the gutter and results in a higher temperature of the coffee.

The foam material may be expanded polypropylene (EPP).

In an embodiment, the deflection member is made from a foam material, in particular EPP.

The foam material may comprise a smooth skin.

Bypass

In a further aspect, the centrifugal coffee brewing device comprises:
  a spinning assembly which is rotatable about a main axis, the spinning assembly comprising:
    a chamber element comprising a bottom wall and a roof portion,
    a cylinder element comprising a filter,
  wherein the chamber element and the cylinder element form a brewing chamber,
  a main drive for rotating the spinning assembly about the main axis for centrifuging the coffee,
  a coffee outlet out of which the brewed coffee flows,
  a removable residue tray positioned below the spinning assembly,
  a removable drip tray positioned at a lower side of the centrifugal coffee brewing device and forming a support for a coffee cup below the coffee outlet,
  wherein the residue tray comprises:
  a first compartment for holding the coffee residue,
  a second compartment for catching water or coffee, the centrifugal coffee brewing device further comprising:
  a bypass switch positioned just upstream of the coffee outlet,
  a controllable bypass actuator configured to switch the bypass switch from regular flow mode to bypass flow mode,
  a bypass channel extending from the bypass switch to the second compartment,
  wherein in regular flow mode the coffee flows through the coffee outlet and wherein in bypass flow mode the hot water or coffee does not flow through the coffee outlet but flows through the bypass channel into the second compartment of the residue tray.

The bypass channel prevents condensed steam from ending up in the coffee cup and improves the temperature and taste of the coffee. The centrifugal coffee brewing device may also be configured to perform a cleaning cycle for cleaning the brewing chamber and other parts from time to time. The bypass switch may also be configured to divert water which is used in the cleaning cycle into the second compartment, and if present, into the drip tray.

In an embodiment, the second compartment comprises a lower outlet which opens into the drip tray, the lower outlet comprising a valve configured to be closed when the drip tray is not present and configured to open when the drip tray is present. This allows the user to empty the drip tray which comprises the condensed steam.

In an embodiment, the centrifugal coffee brewing device is configured to heat the brewing chamber and the gutter with steam prior to the brewing of coffee and configured to switch the bypass switch to the bypass flow mode in order to divert condensed steam through the bypass channel into the second compartment.

Constricted Residue Flow

In a further aspect, the centrifugal coffee brewing device, comprises:
- a spinning assembly which is rotatable about a main axis, the spinning assembly comprising:
  - a chamber element comprising a bottom wall and a roof portion,
  - a cylinder element comprising a filter,
  - wherein the chamber element and the cylinder element form a brewing chamber,
- a main drive for rotating the spinning assembly about the main axis for centrifuging the coffee,
- a removable residue tray positioned below the spinning assembly,
- a residue deflection member for guiding the coffee residue which is ejected from the spinning assembly downward into the residue tray,
- a ring-shaped residue constricting skirt positioned below the residue deflection member and above the removable residue tray or at an upper end of the removable residue tray, wherein the ring-shaped residue constricting skirt has an inner diameter which defines a through opening, wherein the inner diameter is smaller than a maximum inner diameter of the residue deflection member, the ring-shaped residue constricting skirt being configured for deflecting the coffee residue which travels downward from the residue deflection member inward.

This advantageously allows a smaller residue tray and in some embodiments a smaller overall size of the centrifugal coffee brewing device In an embodiment, the residue constricting skirt may be flexible. This makes the removal and repositioning of the residue tray easier.

Distributor Element

In a further aspect, the centrifugal coffee brewing device comprises a spinning assembly which is rotatable about a main axis, the spinning assembly comprising:
- a chamber element comprising a bottom wall and a roof portion,
- a cylinder element comprising a filter,
- wherein a distributor element is positioned on the bottom wall, the distributor element extending around an axle of the spinning assembly, wherein the distributor element comprises one or more distributor parts having a first height above the bottom wall and one or more distributor parts having a second, different height above the bottom wall.

The distributor element improves the formation of the coffee bed and the distribution of the hot water over the formed coffee bed.

In one embodiment the distributor element comprises a receiving area configured for receiving water and/or ground coffee particles, and wherein the distributor parts form projections which are arranged at least at the circumference of the receiving area, the projections having different heights above the receiving area in order to distribute the ground coffee particles over the height of the filter to form a coffee bed and to distribute the hot water over the height of the coffee bed.

It was found in practice that this embodiment results in a very equal formation of the coffee bed and in an equal distribution of the hot water over the coffee bed.

In one embodiment, the distributor parts form stepped surfaces which face upwardly, comprising inner surfaces which are located higher than outer surfaces. This embodiment also was found to provide very good (equal) distribution of the ground coffee and the hot water.

Air Vent

In another aspect of the present invention the centrifugal coffee brewing device comprises:
- a spinning assembly which is rotatable about a main axis, the spinning assembly comprising:
  - a chamber element comprising a bottom wall and a roof portion,
  - a cylinder element comprising a filter,
  - wherein the chamber element and the cylinder element form a brewing chamber,
- a main drive for rotating the spinning assembly about the main axis for centrifuging the coffee,
- a removable residue tray positioned below the spinning assembly,
wherein the removable residue tray comprises a vent channel configured to allow drying of the coffee residue inside the residue tray.

This reduces the dampness of the coffee residue and prevent growth of fungus and other undesired organisms in the coffee residue.

In an embodiment, the vent channel is formed in a front wall of the residue tray and opens into a front cavity of the centrifugal coffee brewing device. It was found that this configuration allows a short vent channel.

In an embodiment, the vent channel has an inverted U-shape. This makes the vent channel invisible for a user, improving the appearance of the centrifugal coffee brewing device.

Gutter with Heating Element

In another aspect, the present invention relates to a centrifugal coffee brewing device, comprising:
- a spinning assembly which is rotatable about a main axis, the spinning assembly comprising:
  - a chamber element comprising a bottom wall,
  - a cylinder element comprising a filter
- a main drive for rotating the spinning assembly about the main axis for centrifuging the coffee,
- a gutter element which defines a gutter for collecting coffee expelled from the spinning assembly, wherein the gutter extends around the spinning assembly, wherein the gutter element comprises a gutter heating element for heating the gutter.

In an embodiment the gutter is heated before and/or during the supplying of ground coffee into the brewing chamber and the formation of the coffee bed. During the formation of the coffee bed, the spinning assembly rotates at a relatively high speed. This causes an air flow through the spinning assembly, through the gutter and through the coffee outlet. Because the gutter is heated, the air flow will become heated in the gutter and heat the coffee cup below the outlet. This heating action may take place before heating with steam.

The gutter heating element may be ring shaped.

This aspect also relates to a method of brewing coffee, the method comprising:
- supplying ground coffee into the centrifugal coffee brewing device and spinning the spinning assembly to form a coffee bed in the brewing chamber,
- heating the gutter with the gutter heating element prior to and/or during the forming of the coffee bed,
wherein an airflow is created with the spinning assembly as a result of the rotation thereof, wherein said air flow travels through the gutter and is heated by the heated gutter, wherein the heated airflow travels through the coffee outlet and heats a coffee cup below the coffee outlet.

These and other aspects of the invention will be more readily appreciated as the same becomes better understood by reference to the following detailed description and considered in connection with the accompanying drawings in which like reference symbols designate like parts.

BRIEF DESCRIPTION OF THE FIGURES

FIG. 11C shows a sectional view of details of the axle airflow device.

FIG. 21 shows yet another sectional top view of the device.

FIG. 22 shows a sectional top view of a large variant of the device.

FIG. 23 shows a sectional side view of the outflow passage.

FIG. 24 shows a schematic sectional side view of the conveyor and the cylinder element.

FIG. 25 shows a schematic sectional side view of supply tube of the conveyor.

FIG. 26 shows a schematic sectional side view another embodiment of the conveyor.

FIG. 31B shows an isometric view of the residue tray and drip residue tray of FIG. 31A.

FIG. 31D shows a sectional/isometric view of the residue tray and drip residue tray of FIG. 31A.

FIG. 32 shows a sectional view of a lower portion of the centrifugal coffee brewing device.

FIGS. 36 and 37 show embodiments of a transport screw.

FIGS. 38 and 39 show a further embodiment of a gutter element, wherein FIG. 39 shows the gutter element partially cut away.

DETAILED DESCRIPTION OF THE FIGURES

1. Overall Configuration and Movable Filter

Figure 1:
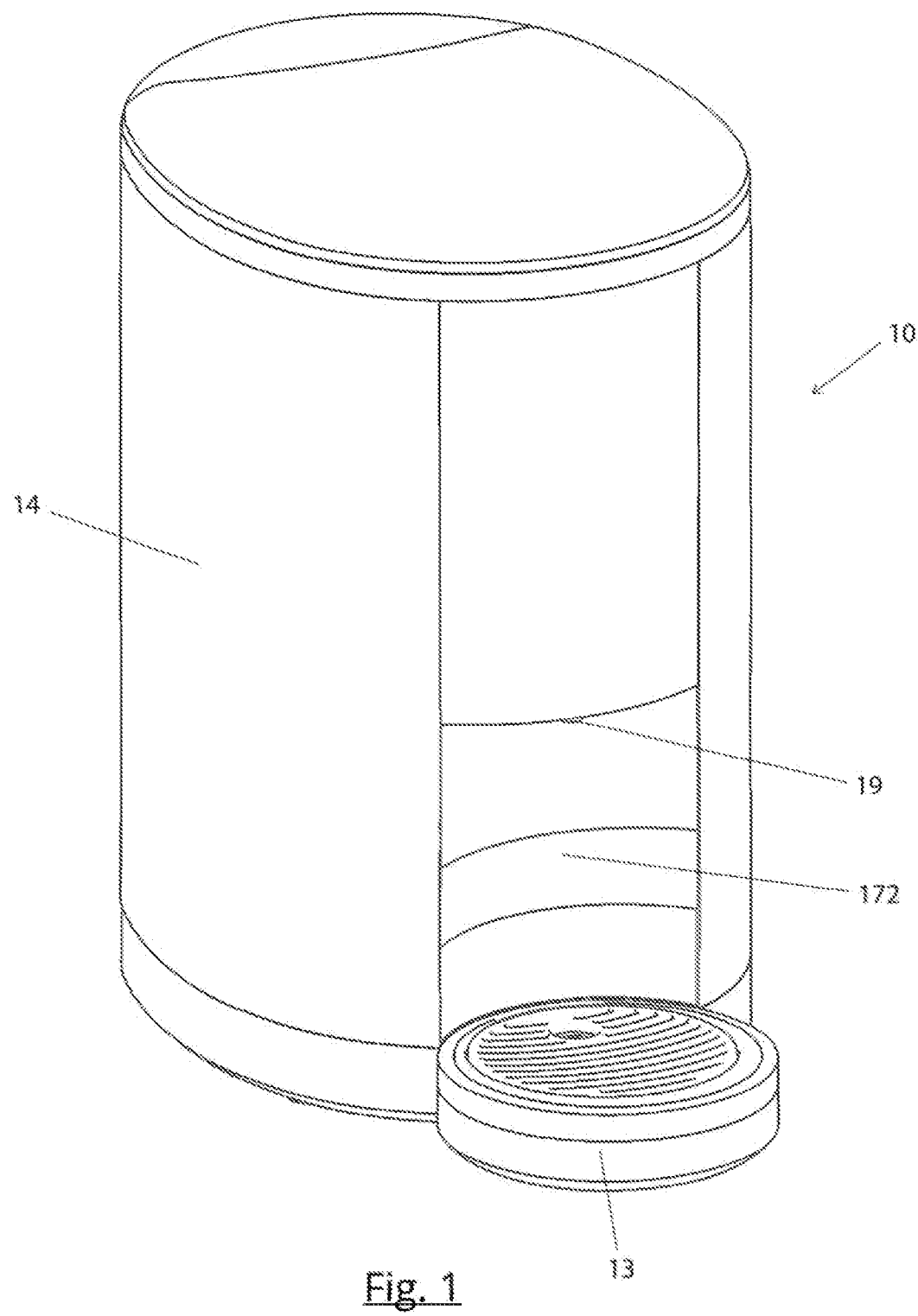
FIG. 1 shows an isometric view of the centrifugal coffee brewing device according to the invention.
Figure 2:
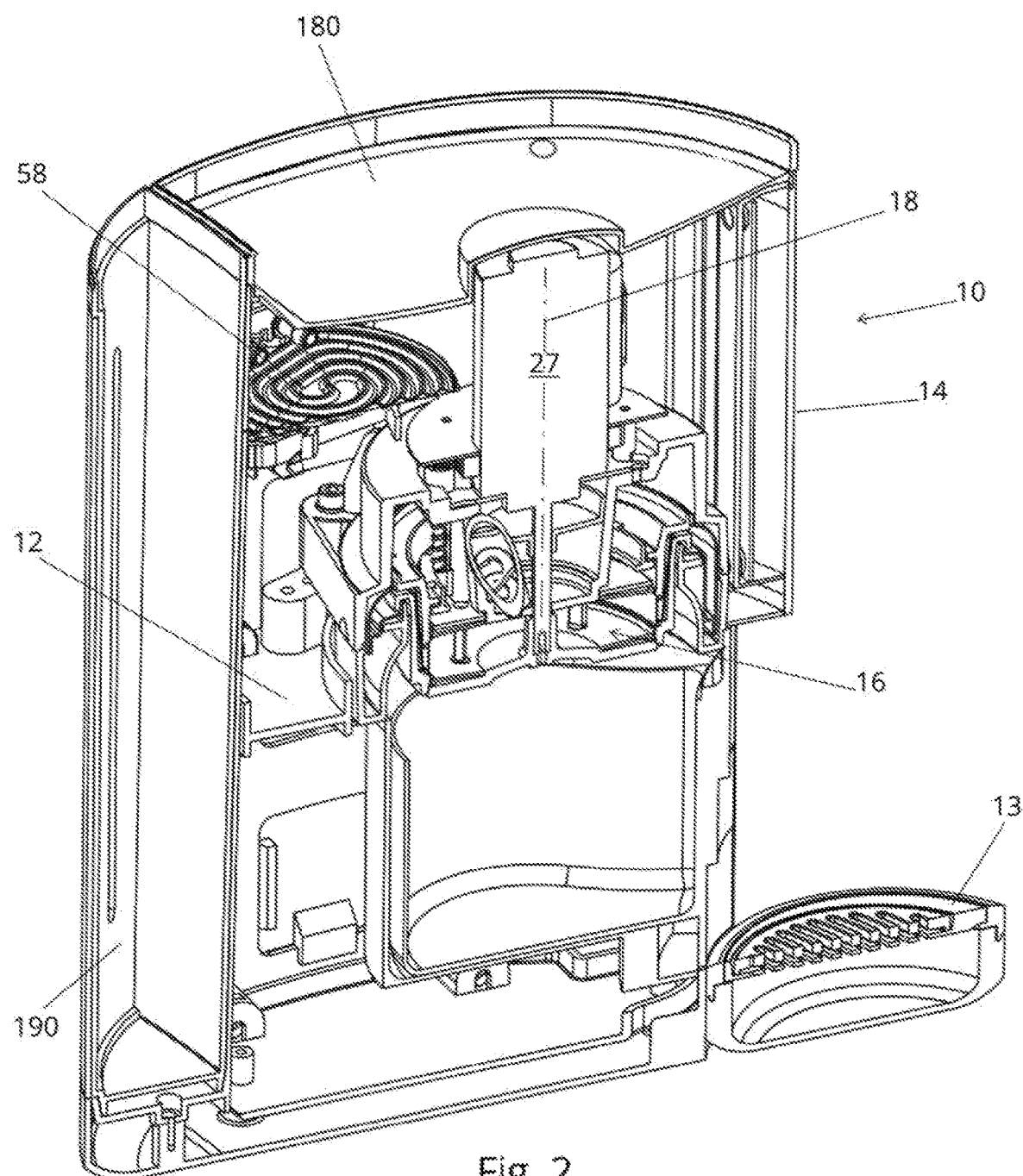
FIG. 2 shows an isometric sectional view of the centrifugal coffee brewing device according to the invention.

Turning to FIGS. 1-9, a centrifugal coffee brewing device 10 (also simply referred to as the device 10) is shown. The device 10 will generally comprise a frame 12 for supporting various parts of the device 10. The device comprises a housing 14 which covers the various parts. A drip tray 13 for supporting a coffee cup is provided at the front side. A coffee outlet 19 is provided above the tray.

The device 10 comprises a brewing component 15. The brewing component 15 comprises a spinning assembly 16 which is rotatable about a main axis 18. The main axis 18 may be vertical but it is conceivable that the main is slightly inclined. The spinning assembly comprise a chamber element 20 which comprises a bottom wall 21 and a roof portion 22. The bottom wall and roof portion are interconnected via columns 23. The spinning assembly further comprises a cylinder element 24 which comprising a filter 25. The chamber element and the cylinder element form a brewing chamber 26.

The device 10 comprises a main drive 27 for rotating the spinning assembly about the main axis for centrifuging the coffee. The cylinder element 24 is driven by the main drive 27 via friction contact with the chamber element 20. The main drive 27 can be an electromotor. The main drive 27 may have a fixed position and for this reason may be used as a reference point for the movement of the cylinder element.

The cylinder element 24 including the filter 25 is movable relative to the chamber element and movable relative to the main drive 12 (the fixed reference point) between a first, lower position 28 (see FIGS. 2, 3, 5, 6 and 9) in which the filter forms the circumference of the brewing chamber and the spinning assembly has a brewing configuration, and a second, upper position 29 (see FIG. 8) in which the circumference of the brewing chamber is open. In the second position 29 coffee residue can be ejected by spinning the chamber element. It was found that this construction is relatively simple, robust and reliable and reduces the chance of leakage. It will be understood that the moving of the cylinder element between the upper and lower position could be linked to another fixed reference point of the device 10.

The chamber element 20 may be stationary in the vertical direction and may be configured to only rotate about the main axis. The cylinder element 24 is movable in a vertical direction and makes a stroke between the first and second position. The cylinder element 24 may in particular be translatable in the vertical direction.

With reference to FIGS. 5-8, the device comprises a cylinder drive assembly 30 for moving the cylinder element 24 from the first position 28 to the second position 29 and vice versa. The cylinder drive assembly 30 is separate from the main drive. The cylinder drive assembly 30 comprises a cylinder actuator 32. This may in particular be an electromotor configured for rotation, but a linear actuator is also possible.

The cylinder drive assembly 30 may comprise:
- a ring gear 31 which is driven by the cylinder actuator, wherein the ring gear is rotatable about the main axis 18,
- one or more cylinder spindles 32 which are engaged by the ring gear and which are rotatable about respective cylinder spindle axes 33.

Typically, there will be three spindles. However, a different number is also possible. It is also possible that there is a single, hollow spindle which extends around the main axis and engages the ring gear around the full circumference of the hollow spindle.

The cylinder element may comprises a cylinder cam 34. The cylinder drive assembly 30 may comprise a cylinder drive cam 35 which is configured to move up and down and is configured to engage the cylinder cam in order to move the cylinder element 24 up and down via the cylinder cam 34.

The cylinder drive cam 35 may comprise a top portion 36 positioned above the cylinder cam 34 and configured to move the cylinder element 24 downwards by pushing the cylinder cam downward and a lower portion 37 positioned below the cylinder cam 34 and configured to move the cylinder element 24 upward by pushing the cylinder cam upward.

The cylinder cam 34 may extend inwardly and the top portion 36 and bottom portion 37 may extend outwardly.

The cylinder element 24 may comprise one or more cylinder alignment cams 38, in particular located at an upper region of the cylinder element. The cylinder alignment cams 38 are configured to abut the chamber element 20 for alignment of the cylinder element 24 with the chamber element 20 in the first position 28 of the cylinder element. The alignment cams may be integrated with the lower stops 38.

The cylinder drive cam 35 may be part of a ring shaped member 39 connected to the at least one cylinder spindle 32, wherein the ring shaped member is configured to move up and down along the at least one cylinder spindle 32 upon rotation of the at least one cylinder spindle.

Other variants of the cylinder drive assembly 30 are possible. The ring shaped member 39 may comprise two parts which are rotatable relative to one another. This would allow the cylinder drive cam 35 to rotate during the upward or downward movement, allowing the spinning assembly to spin during the upward or downward movement. Alternatively, the top portion and lower portion 36,37 may comprise wheels which engage the cylinder cam 34, resulting in the same effect.

The cylinder actuator 32 and the main drive 27 may be positioned above the spinning assembly. The cylinder actuator 32 may in particular be positioned adjacent the main drive 27.

The cylinder drive assembly 30 may be configured to disengage the cylinder drive cam 35 from the cylinder cam 34 after the moving of the cylinder element from the second position 29 to the first position 28 and to create a gap between the cylinder cam and the cylinder drive cam, in order to allow the spinning assembly 16 including the cylinder element 24 to spin about the main axis without contacting the cylinder drive cam 35.

In the second position 29 (FIG. 8), the cylinder element 24 may be held stationary. The chamber element 20 is then rotated without the cylinder element 24 in order to eject coffee residue.

Figure 5:
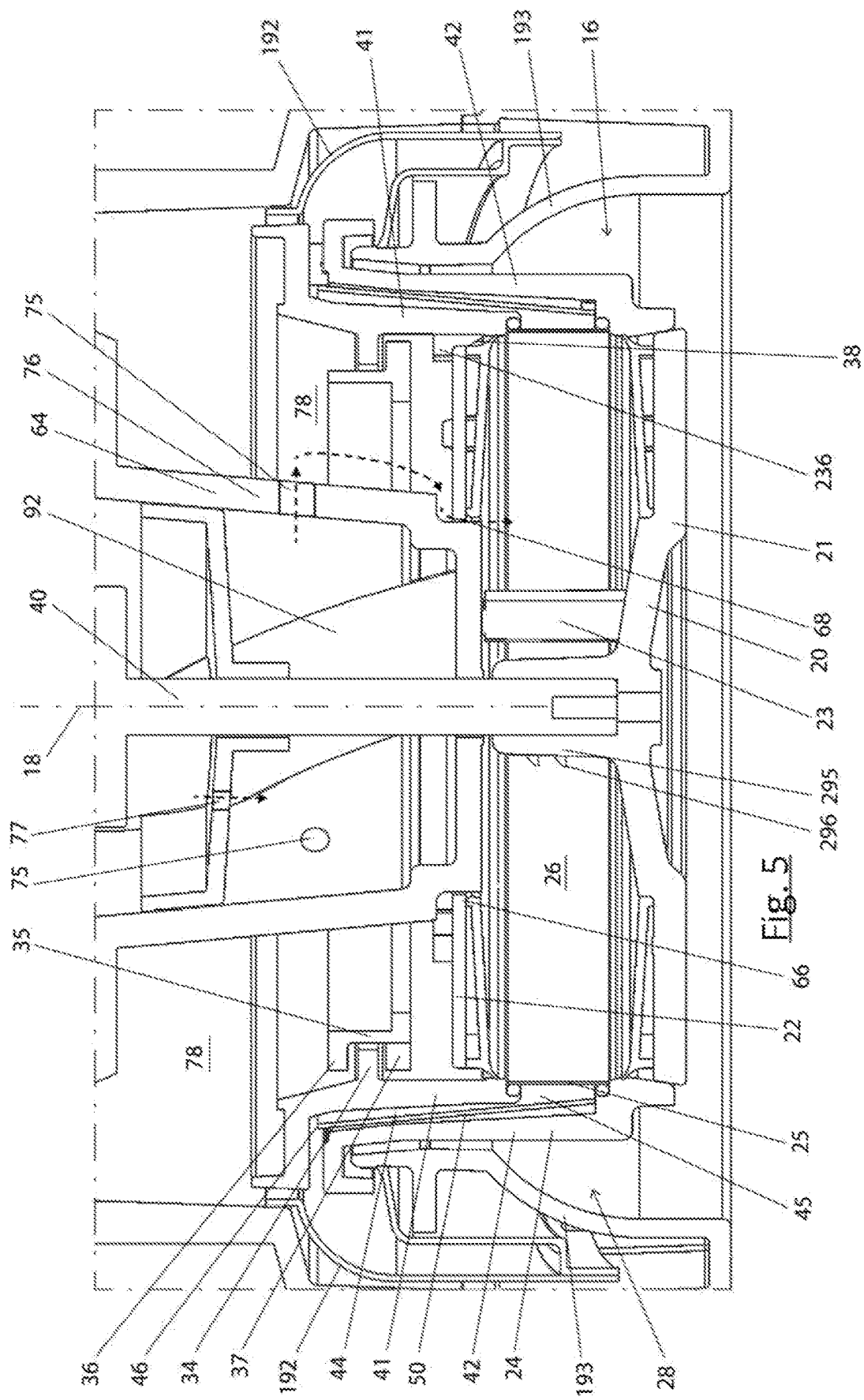
FIG. 5 shows a sectional view of the spinning assembly in the brewing configuration.

With reference to FIG. 5, the device may comprises one or more lower stops 236 with which the cylinder element abuts the chamber element 20 when reaching the lower position 28. The lower stops may be inwardly protruding cams. The chamber element 20 may rotate relative to the cylinder element when ejecting coffee residue, and therefore the abutting may take place in any relative orientation of the cylinder element and the chamber element.

Figure 3:
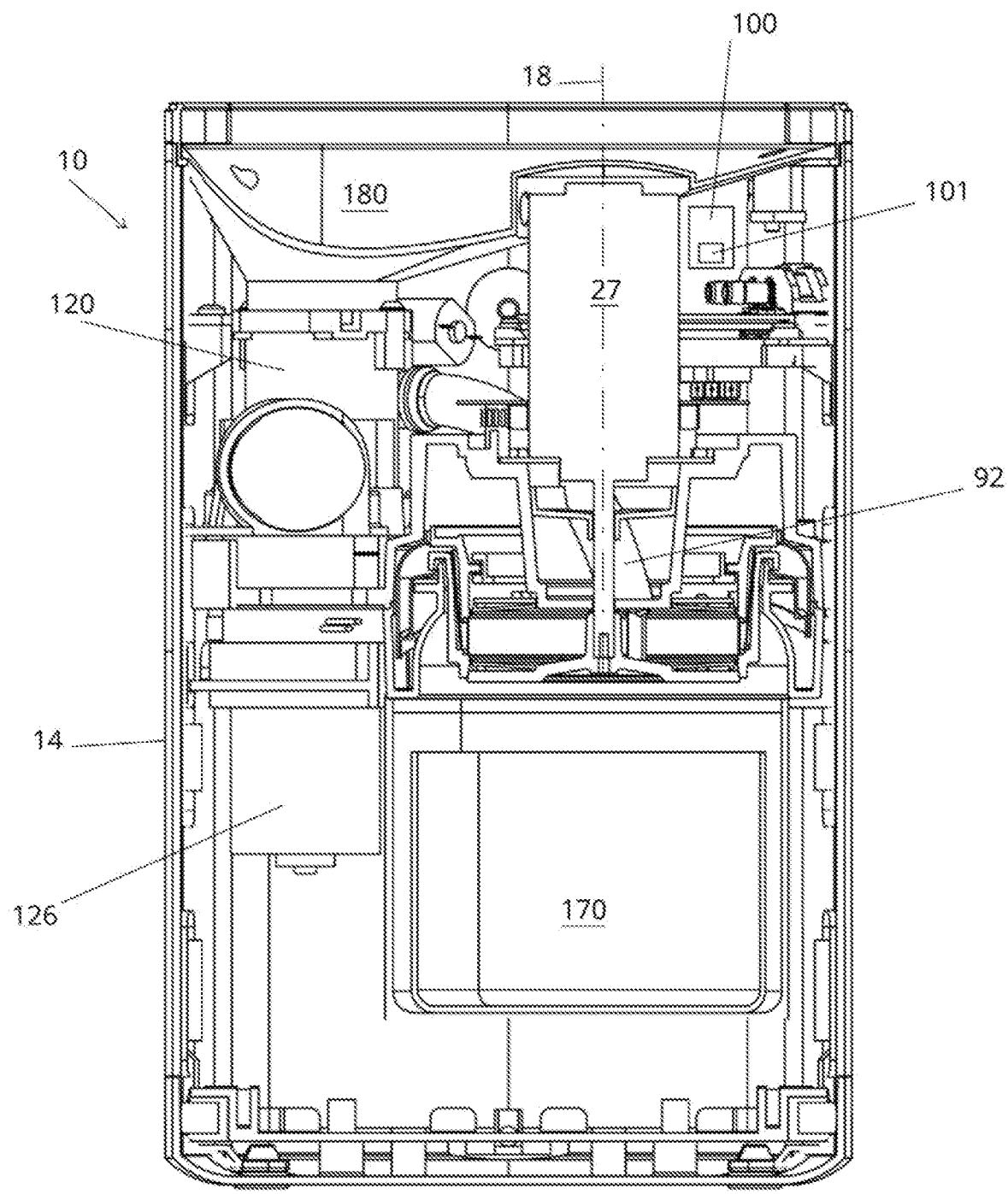
FIG. 3 shows a sectional view of the centrifugal coffee brewing device according to the invention.
Figure 4:
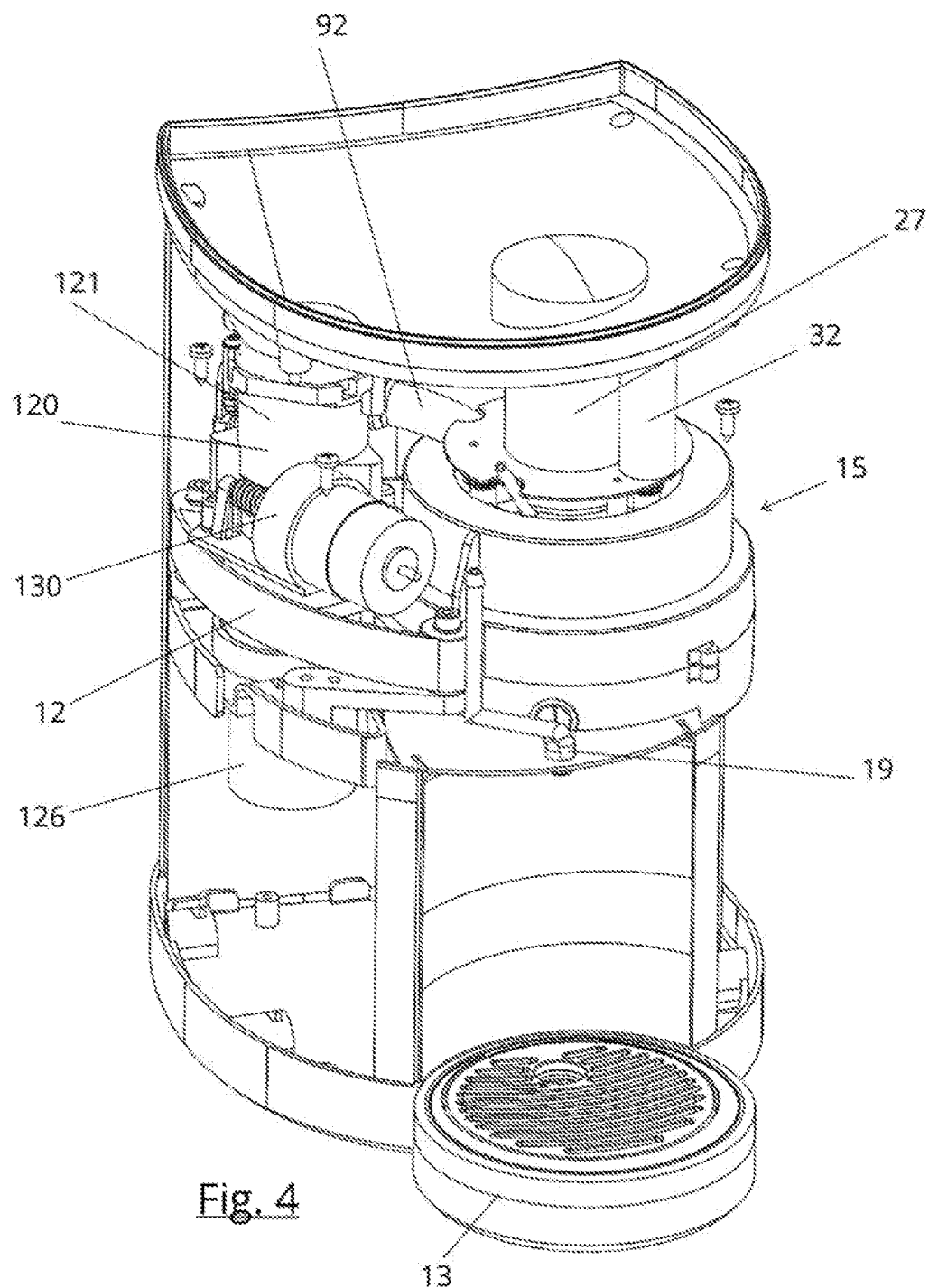
FIG. 4 shows an isometric view of inner parts of the device according to the invention.

The device may comprises a control unit 100 (schematically indicated in FIG. 3). The control unit is configured to measure a current flowing through the cylinder actuator 32. The control unit 100 compares the current with a current threshold value, and wherein when the current exceeds the current threshold value, the control unit assumes that the cylinder element 24 has reached the first position 28 and abuts the lower stop, after which the cylinder actuator reverses direction and moves the cylinder drive cam in the opposite direction over a limited distance in order to disengage the cylinder drive cam 35 from the cylinder cam 34, wherein during said opposite movement the cylinder element is not moved and remains in the lower position.

The device 10 may be configured to stop the spinning of the spinning assembly prior to moving the cylinder element from the first position to the second position or vice versa. This reduces wear and tear of the seals.

The device may be configured to limit an acceleration and a deceleration of the spinning assembly to less than 20 m/s2 in order to prevent slip between the cylinder element and the chamber element during acceleration or deceleration. This also may reduce wear and tear of the seals (see further below).

The main drive 27 may comprise an axle 40 which extends downward from the main drive and is directly connected to the chamber element 24, without a disengageable coupling or a helical cam track between the main drive and the cylinder element as is known from the prior art. The axle 40 may be connected to the bottom wall 21. The main drive may be a DC motor. The main drive 27 and the cylinder actuator 32 may each rotate about a respective vertical axis.

The cylinder element 24 may comprises an upper cylindrical support member 41 and a lower cylindrical support member 42, wherein a channel 44 extends between these two. The cylinder element 24 may comprise flexible O-rings which support the filter 25. The O-rings allow the filter to expand or contract slightly relative to the upper cylindrical support member 41 and the lower cylindrical support member 42.

The present invention further relates to a method of brewing coffee, the method comprising:
- providing the device 10 according to the invention,
- supplying ground coffee and hot water into the brewing chamber,
- spinning the spinning assembly in order to brew coffee, moving the cylinder element relative to the frame and relative to the chamber element from the first position to the second position, spinning the chamber element in order to eject coffee residue, moving the cylinder element from the second position to the first position.

The chamber element may be stationary in the vertical direction during the movement of the cylinder element between the first and second position.

2. Upwardly Extending Channel

Figure 9:
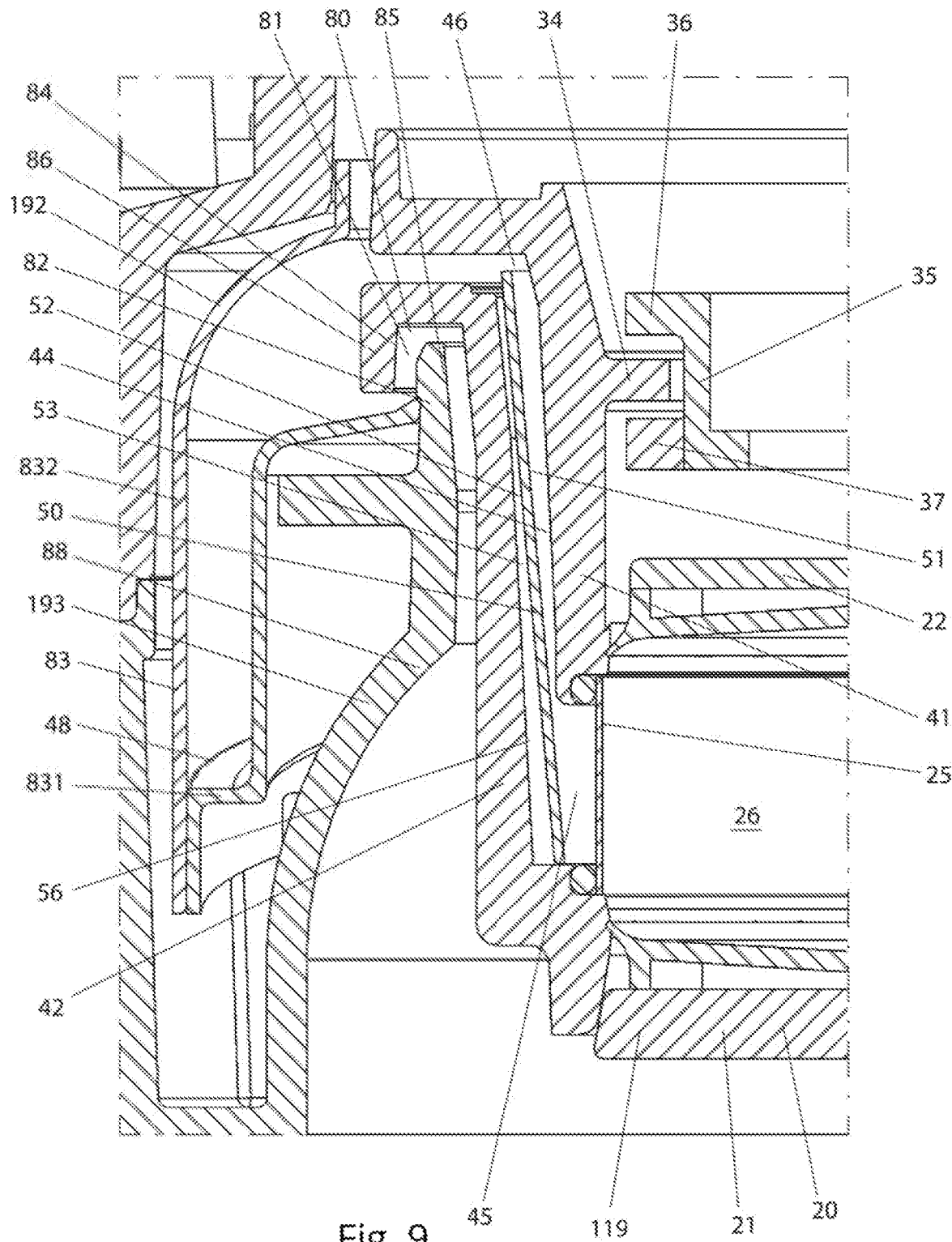
FIG. 9 shows a sectional view of details of the cylinder element.

With reference to FIG. 9, the cylinder element may comprise at least one channel 44 for guiding coffee which has passed the filter through the cylinder element to the outside thereof, wherein the channel comprises an entrance 45 located downstream of the filter and a channel exit 46 located downstream of the entrance. The channel extends in an upward direction at an angle of at least 80 degrees to the horizontal, and in particular at least 75 degrees, between the entrance and the channel exit.

This provides an advantage in that water may be supplied to the brew chamber without a risk that the water leaves the brew chamber prematurely. This improves the steeping of the coffee for instance for a French press coffee. It also reduces mist formation.

This configuration further reduces the overall height of the device. This is considered advantageous because one disadvantage of centrifugal coffee brewers is that they are quite high.

The channel exit 46 may be located above a roof portion 22 of the chamber element 20 when the cylinder element is in the first, lower position 28.

The channel 44 may extend at an angle of 80-89 degrees to the horizontal.

The channel may extend over at least 30 percent of the circumference of the cylinder element, more in particular at least 50 percent, even more in particular at least 80 percent. It was found that this results in less mist forming during centrifuging, because in comparison with the constricted outlets of the prior art, the flow regime of the ejected coffee is less turbulent.

The channel 44 may in particular be annular (aside from relatively thin ribs in the channel 44 which may strengthen the cylinder element) and may extend around the full circumference of the cylinder element. In such a configuration, the channel 44 is conical.

The chamber element 20 may be stationary in the vertical direction. The device 10 comprises a gutter 48 via which the brewed coffee which is expelled from the spinning assembly 16 travels to a coffee outlet 19. A lowest point 47 of the gutter 48 may be located above the bottom wall 21 of the chamber element. At least a part of the gutter may be located above a roof portion 22 of the spinning assembly, in particular of the chamber element.

The at least one channel 44 may have a cross-sectional area of at least 500 mm2. This reduces turbulence and reduces mist forming.

In operation a method of brewing coffee comprise:
providing ground coffee in the brewing chamber of the device 10,
supplying hot water in the brewing chamber,
spinning the spinning assembly in order to urge the hot water through the filter, wherein the brewed coffee flows upward and outward through the channel over an angle of at least 75 degrees to the horizontal, and in particular at least 80 degrees, and is expelled from the channel exit of the channel.

3. Channel with Thin Plate

In another aspect and with reference to FIG. 9, the cylinder element 24 comprises the at least one channel 44 for the coffee. The channel comprises the entrance 45 located downstream of the filter 25 and a channel exit 46 located downstream of the entrance. The channel 44 comprises a plate 50. The plate has a thickness of less than 0.4 mm, in particular less than 0.3 mm. An inner side 51 of the plate is constructed as a flow surface along which the coffee flows through the channel. At an outer, opposite side 52 of the plate an air pocket 53 or insulation material is provided.

The plate may be made of aluminium or stainless steel, or alternatively, the plate may be made of a synthetic material.

The cylinder element 24 may comprise a lower cylindrical support member 42. The lower cylindrical support member 42 may comprise plate support ribs 55 which protrude inwardly from an inner wall 56 of the lower cylindrical support member and which support the plate, in particular at a lower end thereof. The air pocket or insulation material may be provided between the plate support ribs. The ribs may define multiple air pockets or multiple sections of insulation material. In case of insulation material, the insulation material can be different from a material of which the cylinder element is made. It is also possible that the lower cylindrical support member itself is made of insulation material for instance expanded EPP.

4. Pre-Heating with Steam

In another aspect, the device 10 may comprise a hot fluid supply 58 configured for supplying hot water to the brewing chamber. The hot fluid supply comprises a heating element 59.

The control unit 100 is configured for controlling at least the main drive 27 and the hot fluid supply 58. The control unit 100 is configured to cause the hot fluid supply to eject a quantity of steam for heating at least the brewing chamber prior to the brewing of coffee. This reduces heat loss in the coffee, which may result in a too low temperature of the coffee.

The control unit 100 may be configured to cause the hot fluid supply to eject the quantity of steam prior to supplying hot water to the brewing chamber.

The hot fluid supply 58 comprises a hot water supply tube 60 which extends from the heating element and which opens into the brewing chamber, wherein the device is configured to eject the steam via the hot water supply tube 60 into the brewing chamber 26.

The hot water supply tube may be directed at the central column 295 in the brewing chamber. Optionally, the central column may comprise splash vanes 296 on its outer side against which the incoming hot water splashes. The splash vanes 296 may improve the distribution of the water over the coffee bed which is formed against the filter.

the quantity of steam—when condensed to water—may be less than 10 ml, more in particular less than 5 ml, even more in particular less than 2 ml and preferably is at least 1 ml. The steam may be injected in a time period of 1-3 seconds.

The cylinder element comprises a channel 44 via which the coffee leaves the spinning assembly, wherein the device comprises a gutter 48 via which the brewed coffee travels to the coffee outlet 19. The control unit may be configured to let the hot fluid supply eject a quantity of steam for heating the brewing chamber, the filter, the channel and the gutter.

The different parts which are heated prior to the brewing of the coffee are heated primarily by condensation of the steam onto the parts. During condensation, a quantity of heat is released to heat the part on which the steam condenses.

Therefore, the steam does not need to be very hot and may have a temperature of 100-107 degrees Celsius.

The device 10 may be configured to spin the spinning assembly 16 during the injection of at least a part of the quantity of steam.

Turning to FIG. 10, the device may comprise at least one roof airflow device 62 configured to cause an airflow through the device when the spinning assembly is spinning, in particular from the outside into the brewing chamber, through the brewing chamber, through the filter 25 and through the channel 44 in the cylinder element 24 and into the gutter 48, wherein said airflow causes at least a part of the quantity of steam to be conveyed through the channel and into the gutter for heating the channel and the gutter prior to the brewing of coffee.

The device may be configured to spin the spinning assembly 16 at a first, relatively high rotational speed to heat the channel and the gutter and to spin the spinning assembly at a second, relatively low rotational speed for heating the brewing chamber 26, wherein the spinning at the second relatively low rotational speed preferably takes place after the spinning at the first, relatively high rotational speed.

The device may be configured to inject at least a part of the quantity of steam after the ground coffee is supplied into the brewing chamber and/or during the supply of the ground coffee into the brewing chamber and prior to the brewing of the coffee for heating the ground coffee prior to the brewing of the coffee. This further reduces undesired heat loss.

In operation, the method of brewing coffee comprises:
- providing ground coffee in the brewing chamber 26 of the device 10,
- supplying hot water in the brewing chamber,
- spinning the spinning assembly with the main drive in order to brew coffee, wherein prior to the brewing of coffee, a quantity of steam is supplied to the brewing chamber for heating at least the brewing chamber of the device.

In the method, the quantity of steam—when condensed to water—may be less than 10 ml, more in particular less than 5 ml, even more in particular less than 2 ml and preferably is at least 1 ml.

In the method the spinning of the spinning assembly may cause an airflow through the device, in particular from the outside via the roof gap into the brewing chamber, from the brewing chamber through the channel in the cylinder element and into the gutter, wherein said airflow conveys at least a part of the quantity of steam through the channel and into the gutter for heating the channel and the gutter prior to the brewing of coffee.

In an embodiment, steam is injected at a rotational speed of 300-2000, subsequently ground coffee is supplied to the brewing chamber, for instance at a rotation speed of 200-700 rpm, preferably at 500 rpm, and then hot water is supplied into the brewing chamber. When the ground coffee is supplied the rpm may be higher for fine particles (espresso) than for coarse particles (filter coffee).

5. Air Flow

Figure 10A:
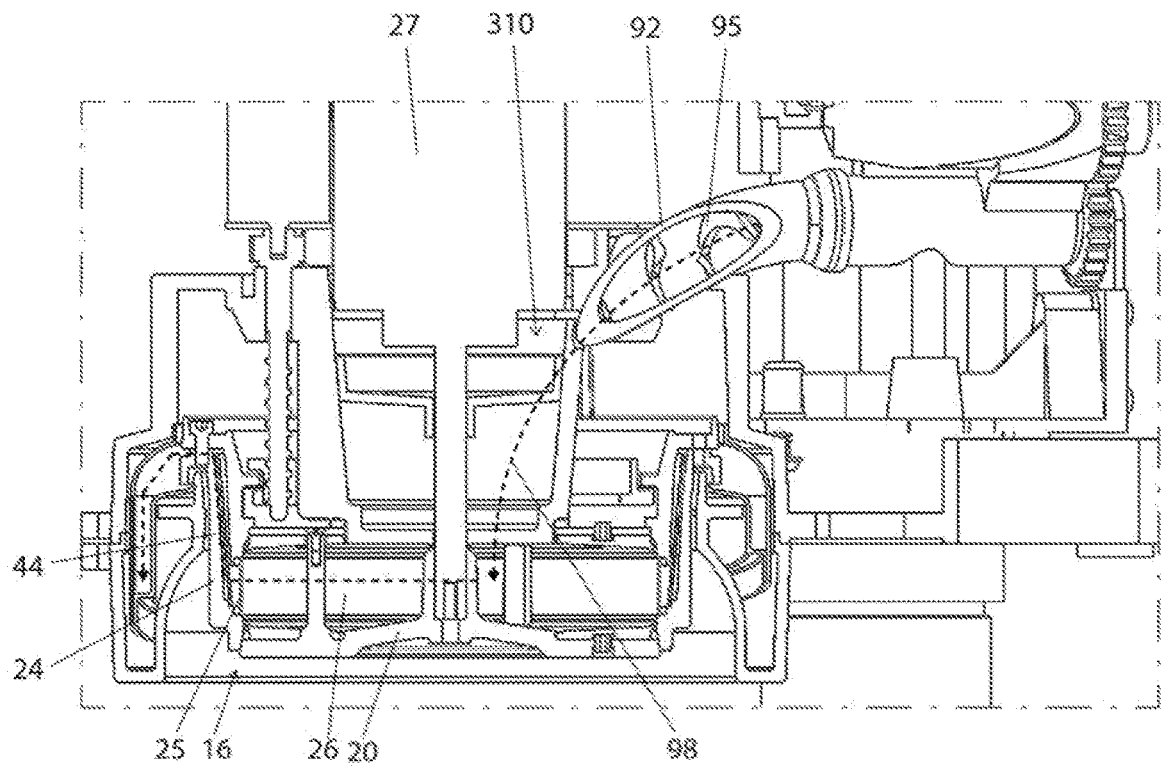
FIG. 10A shows a diagrammatic view of the ground coffee channel airflow.

Turning to FIG. 10A, the device may comprise a ground coffee channel airflow device 310 in the form of a conveyor 90. The conveyor 90 comprises:
- a supply tube 92 extending from a coffee bean grinder 120 to the brewing chamber,
- a transport screw 95 extending through the supply tube and mounted for rotation,
- a screw drive 96 configured for rotating the transport screw, wherein the transport screw is configured to pump air into the brewing chamber together with the ground coffee. This forms a ground coffee channel airflow 98 which creates a ground coffee channel air flow (indicated in dashed lines), which flows from the outside into the brewing chamber. This ground coffee channel air flow carries aroma from the ground coffee. The ground coffee channel air flow also reduces the risk that mist rises upward through the supply tube. The ground coffee channel air flow may pass through the brewing chamber, the channel 44, the gutter 48 and exit through the coffee outlet, where it enhances the aroma sensation for the user.

Figure 10B:
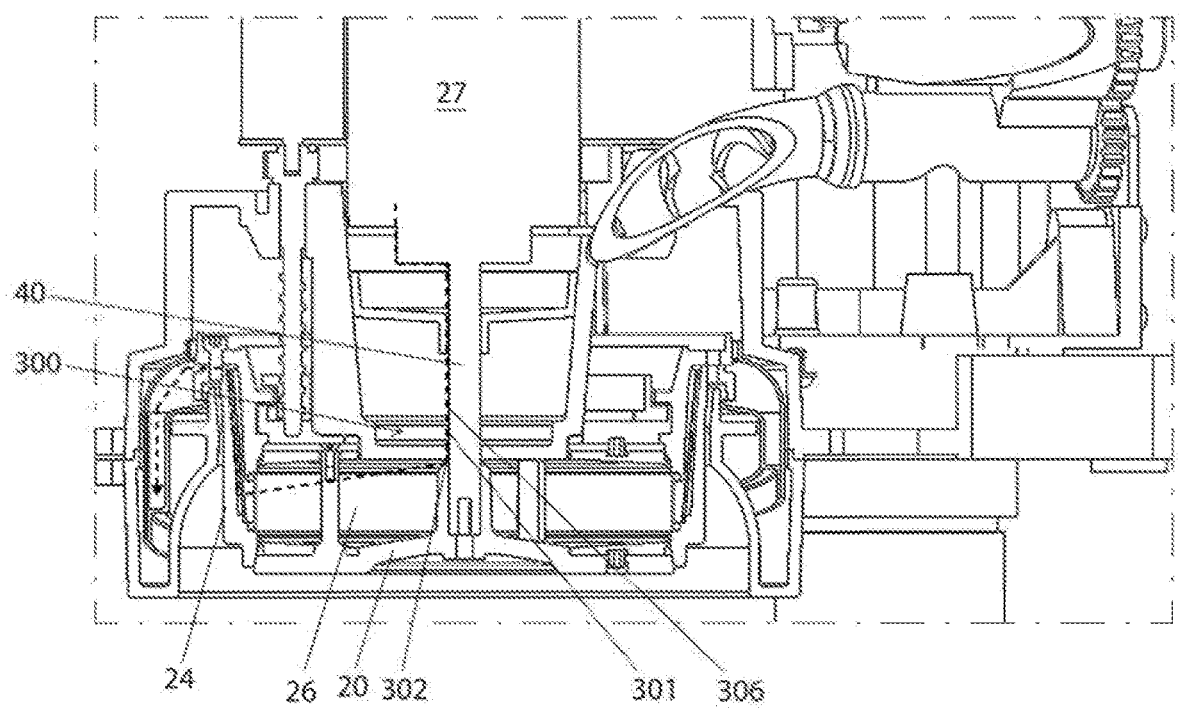
FIG. 10B shows a diagrammatic view of the axle airflow.

Turning to FIGS. 10B and 11C, the device 10 may comprise an axle airflow device 300. An axle 40 extends downward from the main drive 27 and is connected to the bottom wall 21 of the chamber element 20. An axle gap 301 is provided between the axle 40 and a core bottom wall 65 of a core part 64. The core part 64 forms part of the brewing component 15. The axle gap is defined by an inwardly facing core surface 302 and the axle. The inwardly facing core surface 302 tapers outwardly in a downward direction. The angle is quite small, only 1 or a few degrees. During spinning of the axle, the outward tapering causes a downward axle gap airflow 306 (indicated in dashed lines) through the axle gap from an inner volume of the core element into the brewing chamber by virtue of the centrifugal force. The axle gap airflow 306 may pass the filter 25, flow into the channel 44 and into the gutter.

Figure 10C:
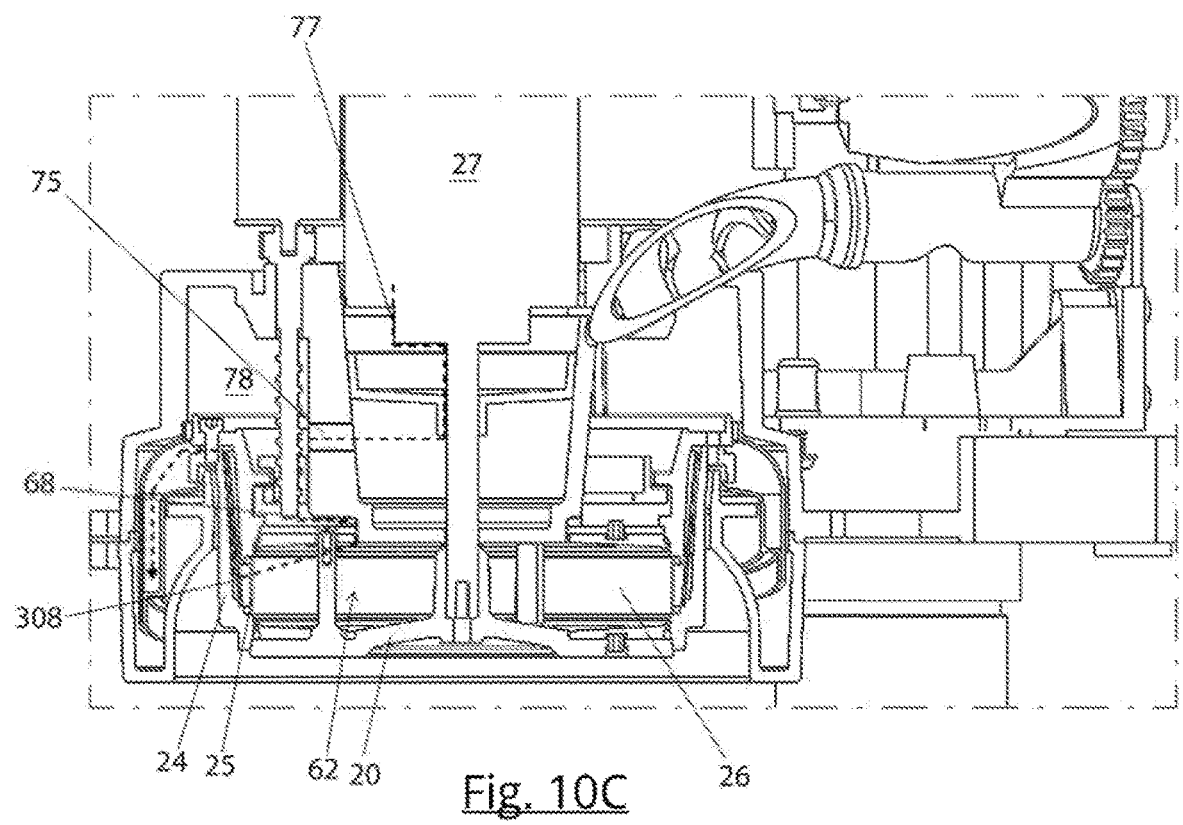
FIG. 10C shows a diagrammatic view of the roof airflow.
Figure 11A:
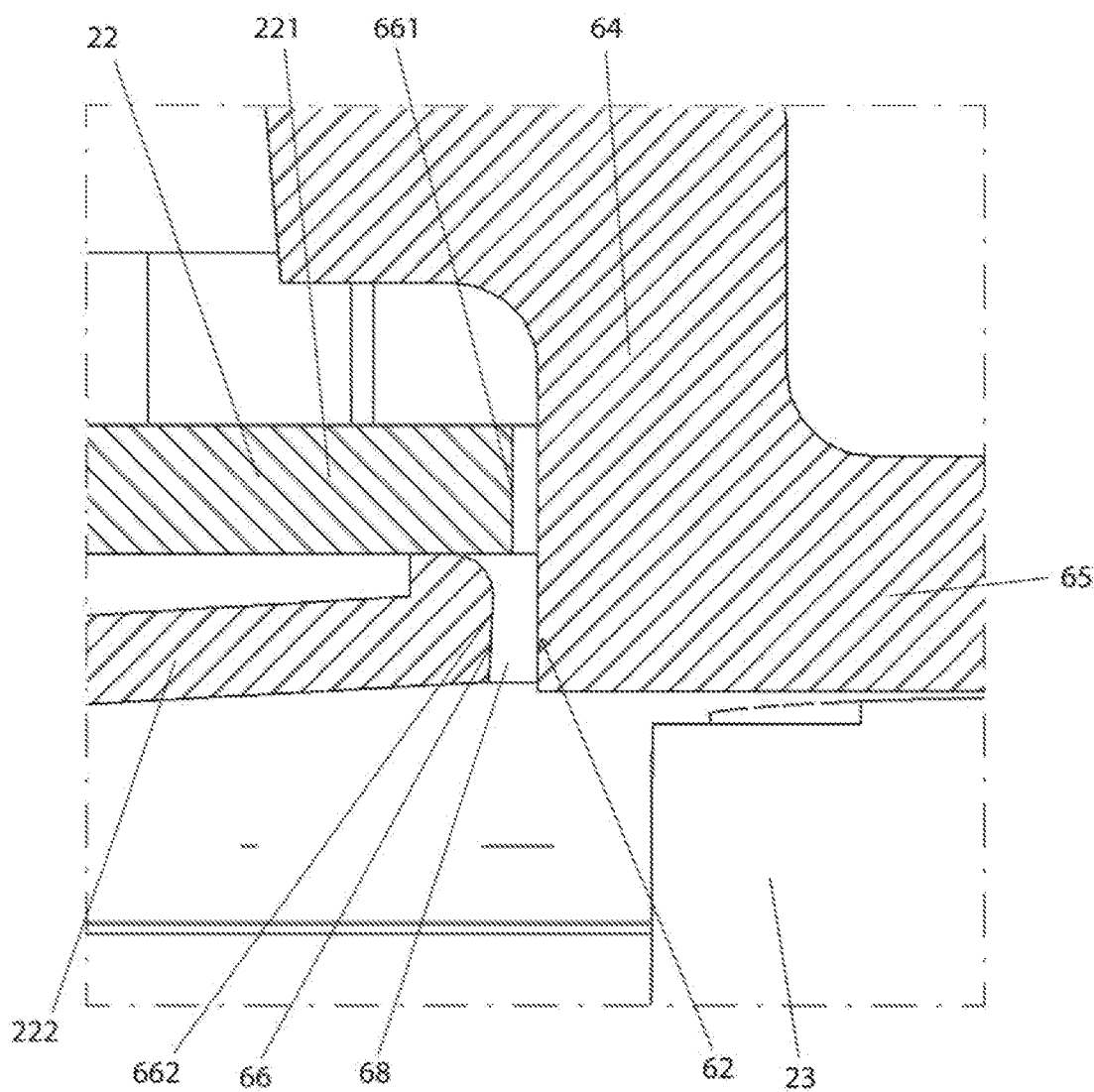
FIG. 11A shows a sectional view of details of the roof airflow device.

Turning to FIG. 10C and FIG. 11A, the device 10 may additionally or alternatively comprise a roof airflow device 62 configured for creating a roof airflow 308 from the outside into the brewing chamber 26, through the brewing chamber, through the filter 25, through the channel 44 in the cylinder element and into the gutter 48.

The roof airflow device 62 works as follows. The device 10 comprises a core part 64, in particular a stationary core part. The chamber element comprises a roof portion 22 having a central opening defined by an inner rim 66. The roof portion 22 may comprise an upper roof wall 221 and a lower roof wall 222. The lower roof wall 222 may be a base section of the upper seal.

The inner rim 66 extends around the core part. The roof airflow device 62 comprises a roof gap 68 which is defined between the inner rim and the core part. The roof airflow 308 generated by the roof airflow device flows downward through the roof gap when the spinning element spins. The inner rim 66 may taper outwardly in a downward direction, wherein the roof airflow in the roof gap is helical as a result of the tapering inner rim.

The inner rim 66 may be formed by the inner rim 661 of the upper roof wall and the inner rim 662 of the lower roof wall 222. The inner rim 66 extends around the core part, wherein a roof gap 68 is defined between the inner rim and the core part, and wherein the inner rim tapers outwardly in a downward direction.

In FIG. 11A, only the inner rim 662 of the lower roof wall 222 tapers, but additionally or alternatively the inner rim 661 of the upper roof wall may taper outwardly in a downward direction. The tapering shape causes a downward force on the air when the spinning assembly rotates, thereby inducing the roof airflow into the brewing chamber 26. The angle of the tapering inner wall 66 may be only 1-5 degrees, but this is sufficient to create a downward force on the air during spinning.

In effect, there may be three separate airflows flowing into the brewing chamber, i.e. the ground coffee channel airflow, the roof airflow and the axle airflow.

The functioning of the airflows flowing into the brewing chamber may be further improved by the feature that the channel 44 is free of any constricted outlets which may form an obstruction for the airflow leaving the brewing chamber.

Figure 10D:
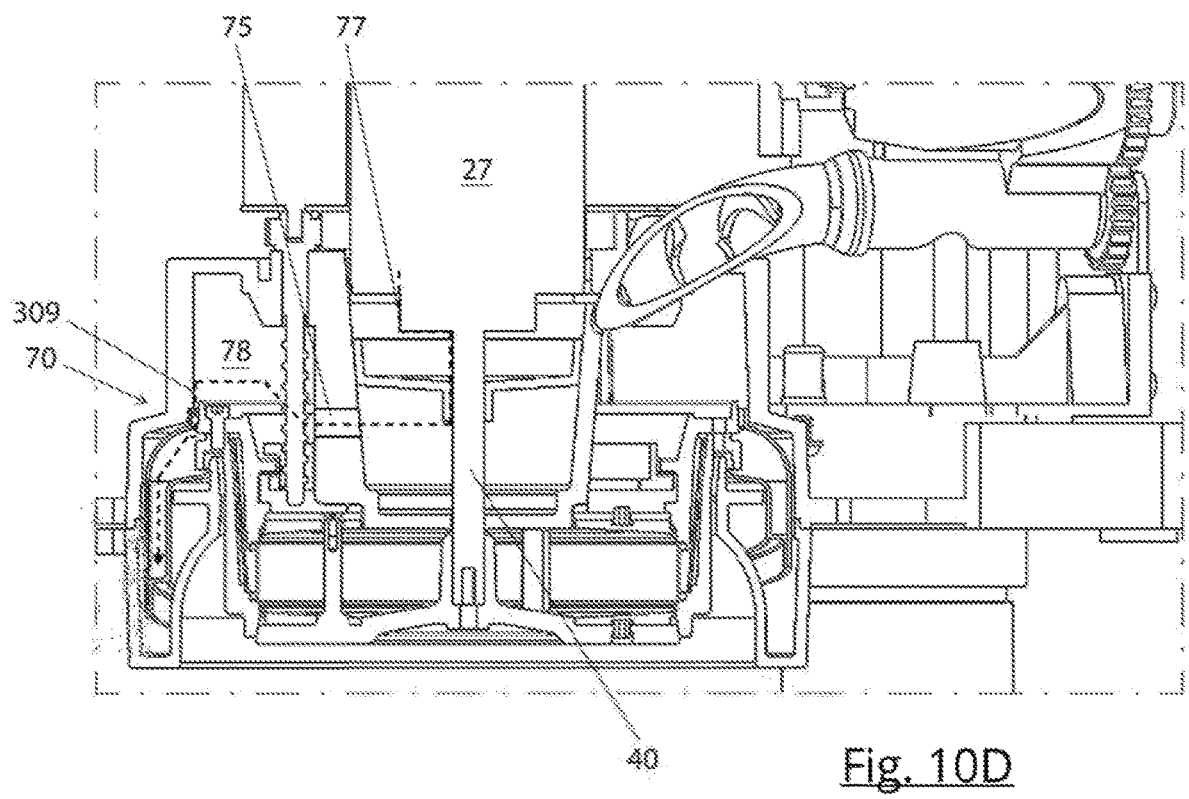
FIG. 10D shows a diagrammatic view of the circumferential airflow.
Figure 10E:
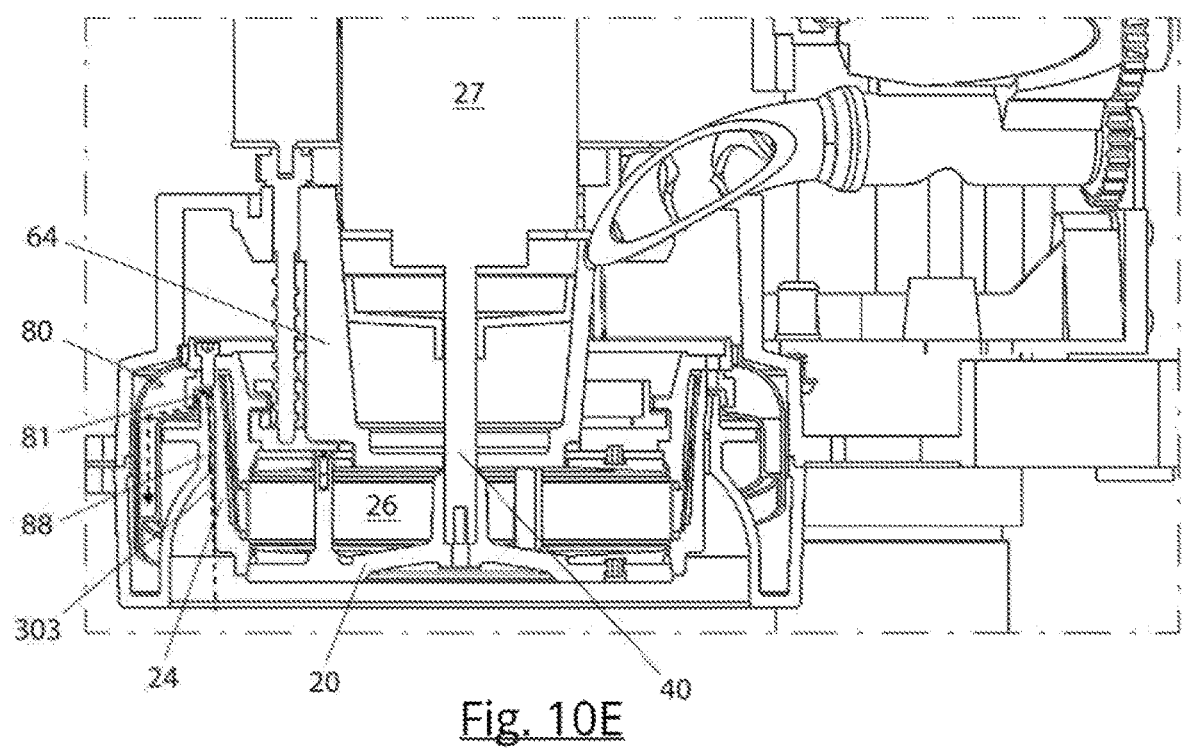
FIG. 10E shows a diagrammatic view of the lower airflow.
Figure 11B:
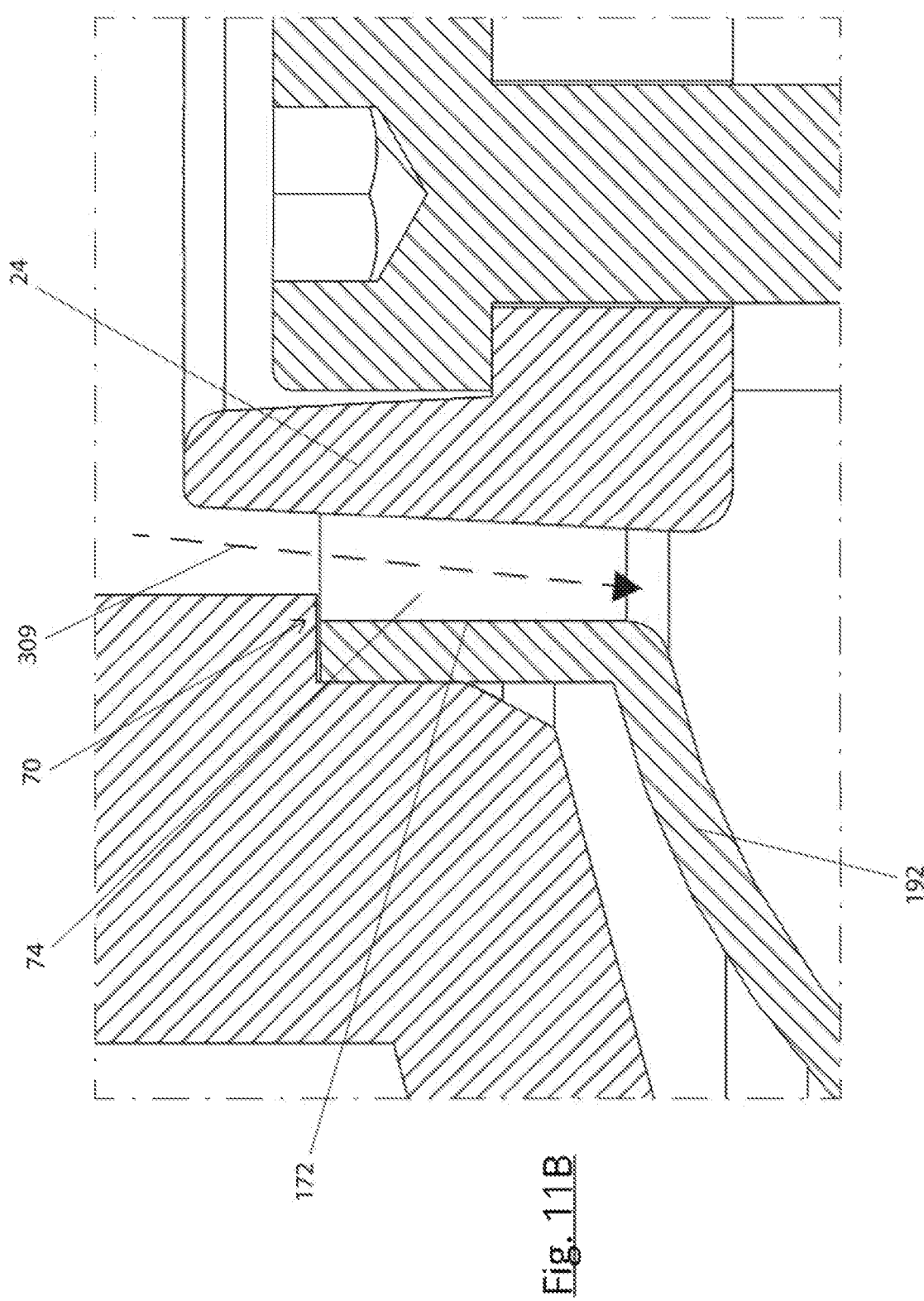
FIG. 11B shows a sectional view of details of the circumferential airflow device.

Turning to FIGS. 10D and 11B, in addition or alternatively, the device may comprise a circumferential airflow device 70 configured for creating a circumferential airflow 309 from the outside into the gutter 48, wherein the circumferential airflow does not flow through the brewing chamber.

In this way, the risk that mist reaches mechanical and electronic parts of the device 10 is reduced. A further advantage is a better sensation of aroma for the user, because more coffee aroma exits the coffee outlet 19.

The circumferential airflow device 70 is explained with reference to FIG. 11B. The device 10 may comprise an inwardly facing wall 72 which extends around the cylinder element 24 when the cylinder element is in the first, lower position 28. The inwardly facing wall 72 may be an upper portion of a deflection member 192. The circumferential airflow device 70 may comprises a circumferential gap 74 which is defined between the inwardly facing wall 72 and the outer circumference of the cylinder element. The circumferential air flow which is generated by the circumferential airflow device flows downward through the circumferential gap when the spinning element spins. The inwardly facing wall 72 may taper outward in a downward direction at the circumferential gap 74. The circumferential airflow in the circumferential gap is helical as a result of the tapering inner rim. The tapering angle of the inwardly facing wall may be small, i.e. 1-5 degrees.

Turning to FIGS. 10C and 10D, the core part 64 may comprise at least one air duct 75, in particular provided in a side wall 76 of the core part. The core part may comprise an opening 77 at an upper side which is in communication with the outside. The roof air flow flows from the outside into the core part 64 via the opening 77, through the at least one air duct 75 to a space 78 within said housing and extending around the core part 64 and from said space through the roof gap 68 into the brewing chamber 26.

Turning to FIG. 9, the device 10 may comprise a lower airflow device 80 comprising a lower gap 81, the lower gap being located between the cylinder element 24 and an upstanding part 82 of a wall 88 inside the device 10. The device 10 may further comprise residue deflection member 193 which faces downward and inward and may be curved. The residue deflection member 193 is configured for guiding the coffee residue which is ejected from the spinning assembly downward into the residue tray. The residue deflection member 193 may be a lower wall portion of the wall 88 but may also be embodied as a separate wall. The residue deflection member 193 extends downward toward the residue tray 170.

Alternatively the upstanding part 82 may be part of a gutter element 83 which defines the gutter 48. The lower airflow device is configured for creating a lower airflow 303 through the lower gap into the gutter 48.

The cylinder element may form an inverted U-shape over the upstanding part 82, the lower gap also having an inverted U-shape. At least one inwardly facing wall 84,85 of the lower gap 81 tapers in order to create the lower airflow during spinning of the spinning assembly.

The lower airflow device 80 may comprise a skirt 86 extending downward from a lower cylindrical support member of the cylinder element and extending around the upstanding part. The skirt may form the tapering inwardly facing wall 84. Alternatively or additionally the inwardly facing wall 85 of the upstanding part 82 may taper outwardly in an upward direction, in order to create the lower airflow.

In addition or alternative to the tapering surfaces, the axle airflow device, roof airflow device, circumferential air flow device and/or lower airflow device may comprise an air pump, in particular a ventilator. The ventilator may be formed by blades connected to the spinning assembly. Alternatively one or more separate air pumps may be provided which is separate from the spinning assembly, and the air pump(s) may in particular have a separate air pump drive.

The roof airflow flows through the brewing chamber 26, through the filter 25 and via the channel 44 into the gutter 48 where the roof airflow merges with the circumferential airflow and/or the lower airflow, and wherein the first and circumferential airflow flow to the outside via the coffee outlet 19.

In operation the method of brewing coffee may comprise:
supplying ground coffee into the brewing chamber of the device 10,
supplying hot water in the brewing chamber,
spinning the spinning assembly with the main drive in order to brew coffee,
wherein during the spinning of the spinning assembly a ground coffee channel airflow, an axle air flow, a roof airflow, a circumferential air flow and/or a lower airflow is created.

In the method the spinning of the spinning assembly may generate the different airflows.

6. Seals

Figure 12:
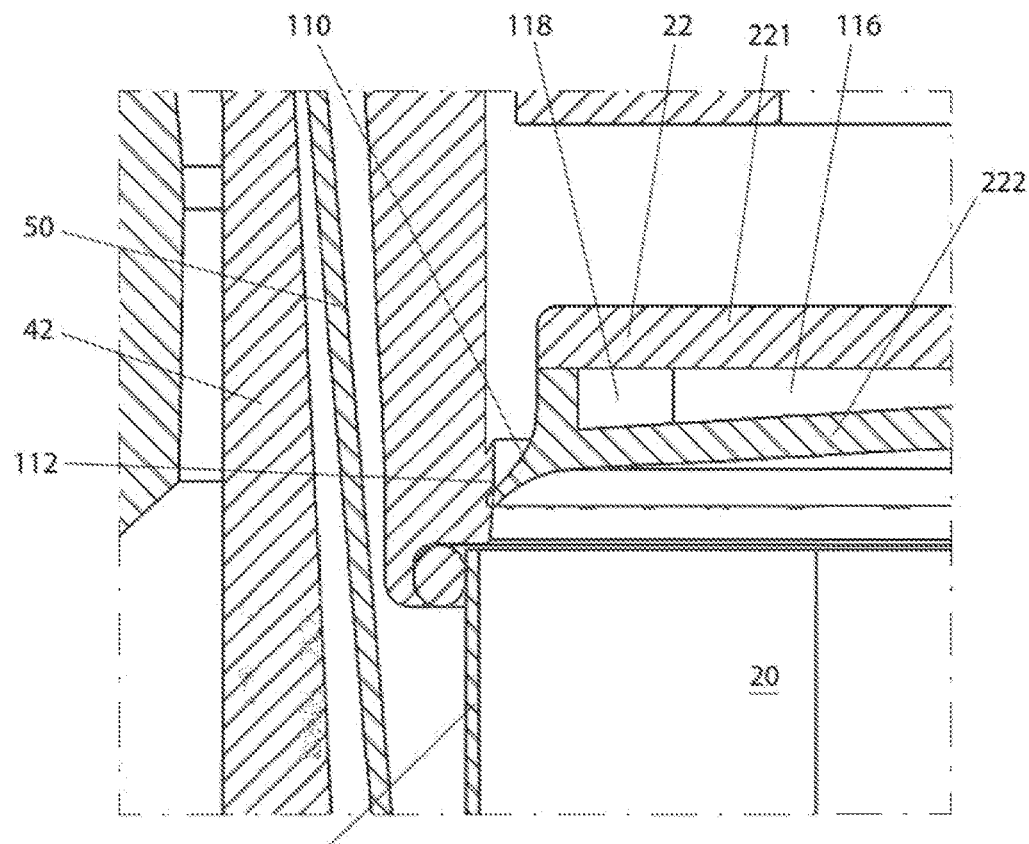
FIGS. 12 and 13 show sectional views of details of the seals.
Figure 13:
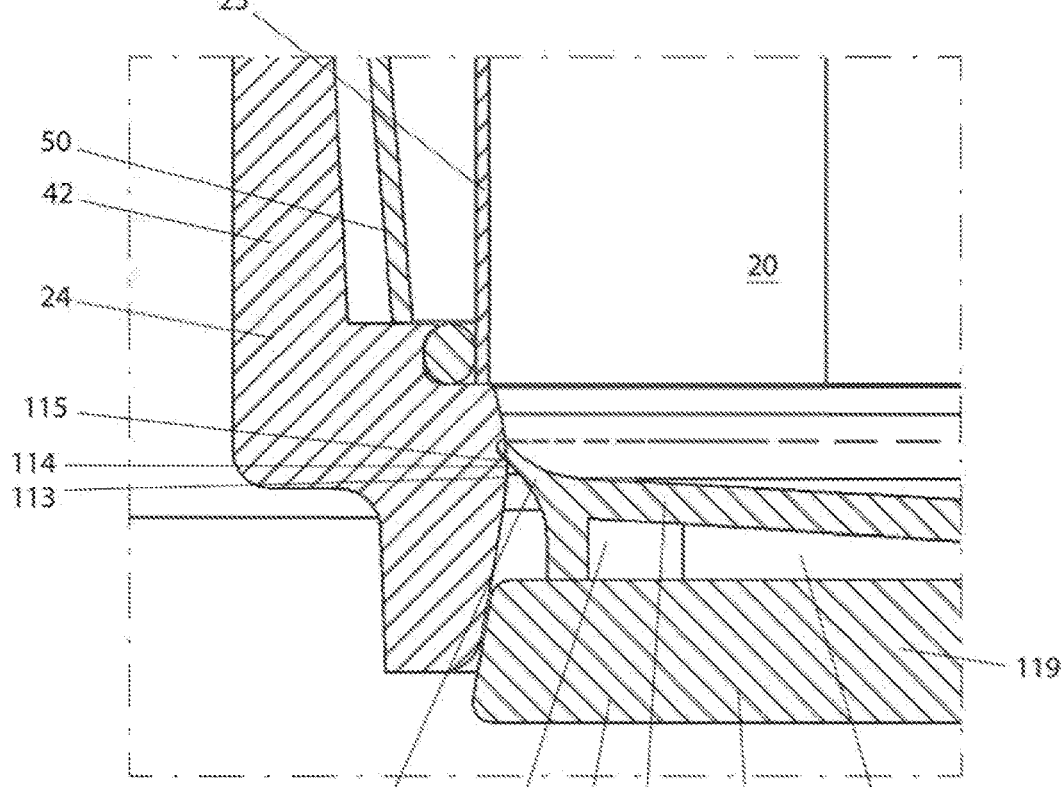

Turning to FIGS. 12 and 13, the chamber element 20 comprises a lower seal 111 which in the first, lower position engages the cylinder element 24. In addition the chamber element 20 may comprise an upper seal 111 which in the lower position engages the cylinder element. The upper seal and the lower seal are radial seals. The upper seal engages an upper inwardly facing surface 112 of the cylinder element and the lower seal engages a lower inwardly facing surface 113 of the cylinder element. It is noted that the two radial seals are disclosed for the present configuration with a movable cylinder element, but may also be used in a centrifugal coffee brewer having a movable chamber element.

The upper inwardly facing surface 112 may be conical and may taper outwardly in a downward direction. The lower inwardly facing surface 113 may comprise an inwardly protruding bulge 114 having a top 115. The lower seal 111 may engages the lower inwardly facing surface 113 above the top 115 of the bulge.

The upper seal 110 may extends in an outward and downward direction away from a roof portion 22 of the chamber element, and may extend in particular at an angle of 25-45 degrees to the horizontal. The lower seal 111 may extend in an outward and upward direction away from a bottom wall of the chamber element, and may extends in particular at an angle of 25-45 degrees to the horizontal. This configuration creates a pressure on the seals during spinning as a result of the centrifugal force, ensuring that the seals are pressed against the cylinder element and remain closed during spinning.

The lower seal 111 and the lower inwardly facing surface 113 have a smaller diameter than the upper seal 110 respectively the upper inwardly facing surface 112. This creates a net upward force during spinning, holding the spinning assembly in place and reducing vibrations. The upper inwardly facing surface 112 is located above the filter 25 and the lower inwardly facing surface 113 is located below the filter 25

The lower seal may comprises a base part 115 which forms part of a bottom wall 21 of the chamber element 20. The bottom wall 21 further comprises a bottom support element 119 which is connected to the axle 40. The base part of the lower seal may have a height of less than 5, preferably less than 3 mm, and a chamber 117 filled with air or thermal insulation may be located below the base part 115 of the lower seal.

Likewise a chamber 118 filler with air or thermal insulation may be provided above a base part 222 of the upper seal 110.

The base part 115 may be supported by protrusions 116 which extend between between the bottom support element 119 and the lower side of the base part 115. The protrusions may have the form of ribs which create several chambers below the base part. The chambers may be spaced about the main axis. However, the protrusions may also extend through the chamber, and for instance have the form of columns. The base part 222 of the upper seal may be supported by similar protrusions 116.

7. Grinder with Cleaning Function

Turning to FIGS. 14-17, the device 10 may comprise the coffee bean grinder 120 comprising:
 a housing 121,
 an outer burr 122,
 an inner burr 123 positioned within the outer burr,
wherein the inner and outer burr are rotatable relative to one another about a main grinder axis 124.

The coffee bean grinder 120 further comprises a grinder drive 126 (see FIGS. 3 and 4) configured for rotating the inner and outer burr relative to one another and configured for rotating the impeller. The inner bur may be rotatable and coupled to the grinder drive and the outer burr may be non-rotatable.

The position of the inner bur may be adjustable in the direction of the main grinder axis and the position of the outer burr may be non-adjustable in the direction of the main grinder axis.

The coffee bean grinder 120 further comprises an impeller 125 comprising impeller blades 225 for expelling the ground coffee from the coffee bean grinder, the impeller being positioned below the inner and outer burr. The impeller is coupled to the inner or outer burr, in particular to the inner burr.

The grinder drive 126 may be configured for rotating the inner and outer burr relative to one another and configured for rotating the impeller:
 in a first rotational direction for grinding coffee beans with the inner and outer burr and expelling the ground coffee from the coffee bean grinder with the impeller, and
 in a second, opposite rotational direction for expelling the ground coffee from the coffee bean grinder with the impeller, wherein in the second rotational direction the coffee bean grinder does not grind.

This allows the coffee bean grinder 120 to clean itself during grinding in the second direction. This prevents coffee particles from a first cup to remain behind in the grinder and to end up in a next cup. This is advantageous, because the particle size may be changed from cup to cup. If some coffee particles would be left behind, fine particles could be used for the brewing of a cup for which coarse particles are desired, or vice versa.

A second advantage is that the ground coffee will be fresher, because less or no coffee particles remain behind in the grinder. In particular in a home situation in which the device 10 may stand still for a while, there are (virtually) no coffee particles which become old in the coffee bean grinder during a period of non-use.

The impeller blades may be symmetric in the rotational direction, and expel ground coffee in both the first rotational direction and the second rotational direction. This advantageously allows the cleaning function in the second rotational direction.

The impeller 125 may be located in an impeller cavity 127 in the grinder housing 121. The grinder housing 121 defines a bottom cavity wall 128 above which the impeller 127 is located. The grinder housing comprises a grinder exit opening 129 via which the ground coffee exits the coffee bean grinder. The grinder exit opening has a rotation symmetric shape and rotation symmetric position relative to the main grinder axis, allowing coffee to be expelled by the impeller through the grinder exit opening in both the first rotational direction and the second rotational direction.

The grinder exit opening may have an elongate shape which defines a main opening axis, wherein said main opening axis is oriented substantially orthogonal to the main grinder axis and intersects the main grinder axis.

The coffee bean grinder may comprise:
 an adjustment drive 130 for adjusting a relative position of the inner and outer burr by displacing the inner or outer burr relative to one another in an axial direction,
 an adjustment transmission 131 arranged between the adjustment drive and the inner or outer burr.

The impeller may be connected to the adjustment transmission 131 and may be displaced in the axial direction when adjusting the relative position of the inner and outer burr. The impeller blades 225 may have sharp lower edges 132 for cutting through coffee particles located below the impeller blades when moving downward in an adjusting step.

Each impeller blade may have a cut out, in particular for avoiding collision with the transport screw 95 of the conveyor 90 positioned directly downstream of the grinder exit opening. The cut-outs of the impeller blades may be located at an outer lower side of the impeller blades.

The adjustment transmission 131 may comprise a rotatable adjustment gear 134 which is coaxially arranged with the main grinder axis and connected to the inner bur or outer burr, wherein the rotatable adjustment gear 134 comprises thread 135 and gear section 468. The gear section 468 is located below the thread 135. The grinder housing comprises mating thread 136, and wherein the grinder drive comprises a worm wheel 137 (also forming part of the adjustment transmission 131) which engages the gear section 468 of the rotatable adjustment gear. A rotation of worm wheel 137 causes a rotation of the rotatable adjustment gear and due to the threads 135,136 causes an axial displacement of the rotatable adjustment gear and the inner or outer burr.

Preferably, the inner burr is rotatable and adjustable in the direction of the grinder axis. The coffee bean grinder may comprise:
 a grinder axle 230 which connects the grinder drive to the inner burr,
 a grinder bearing 231 which provides radial and axial support for the grinder axle 230,
 wherein the grinder bearing and the grinder axle are connected or abut to the rotatable adjustment gear and move up and down with the rotatable adjustment gear during adjustment of the inner burr in the axial direction.

More in particular, in an upward adjustment, the rotatable adjustment gear rotates and moves upward, pushing the grinder bearing upward, which in turn pushes the impeller upward, which in turn pushes the inner burr upward. In a downward adjustment, the rotatable adjustment gear is rotated in the opposite direction and moves downward. The grinder bearing 231, the impeller, the inner burr and the grinder axle 230 move downward under the influence of gravity.

The grinder axle 230 may comprise a first axle part 232 connected to the grinder drive and a second axle part 233 connected to the inner burr, wherein the first axle part and second axle part are interconnected by an axle coupling 234 and are configured for making a telescoping movement relative to one another during adjustment of the inner burr in the axial direction, wherein the second axle part moves in the axial direction and the first axle part remains stationary in the axial direction during the adjustment.

The grinder axle may extend through a bore 235 in the rotatable adjustment gear 134.

The impeller 125 may be located below the inner bur 123, wherein the grinder bearing 231 is located below the impeller 125 and wherein the rotatable adjustment gear 134 is located below the grinder bearing 231.

The coffee bean grinder may be configured to move the inner or outer burr to an extreme upper position or extreme lower position after each grinding operation.

In top view the grinding may take place in a clockwise direction, and the cleaning may take place in a counter clockwise direction.

Figure 27:
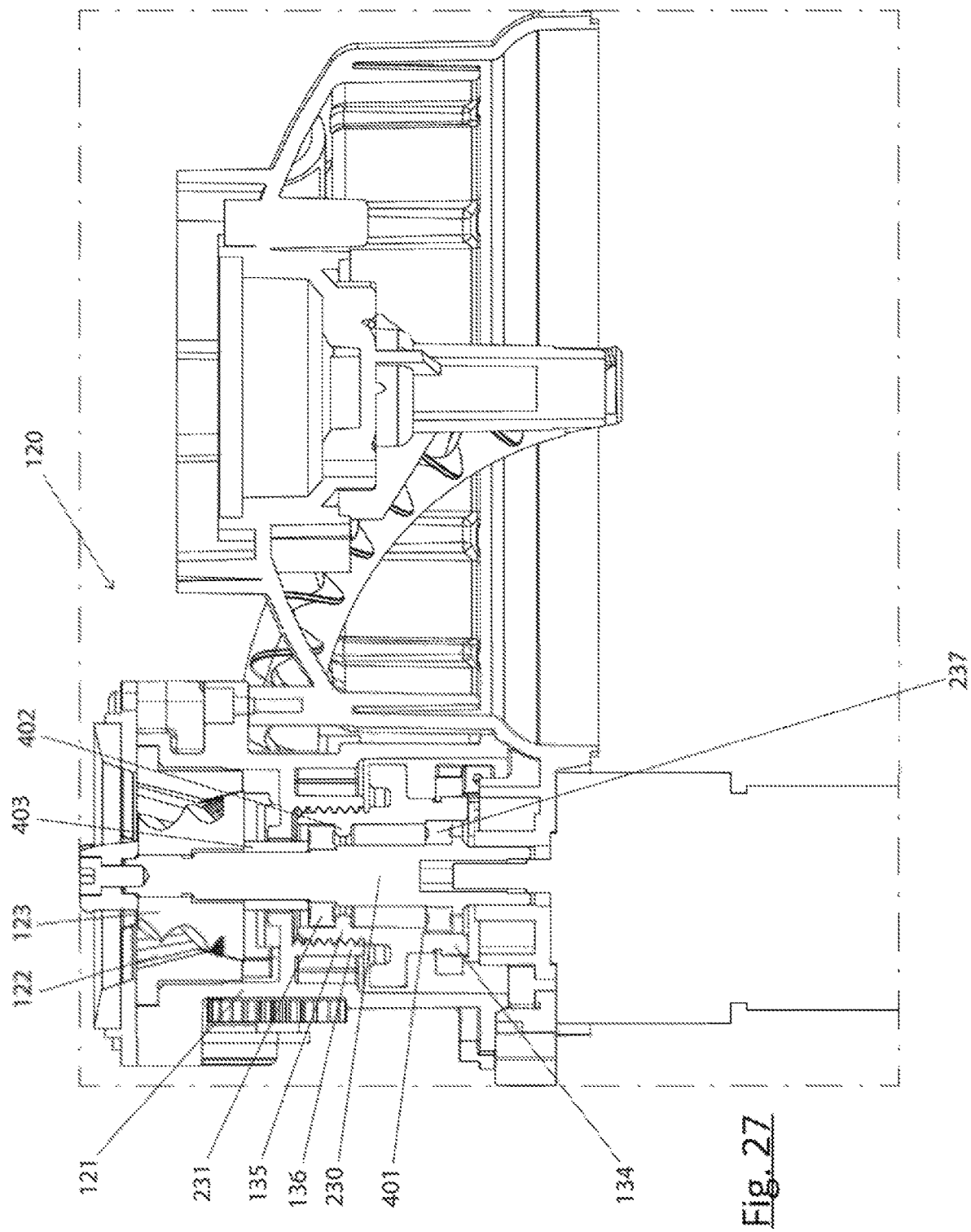
FIG. 27 shows a sectional view of another embodiment of the coffee bean grinder.

Turning to FIG. 27, in another embodiment of the coffee bean grinder 120, the rotatable adjustment gear 134 extends around the grinder axle 230. The coffee been grinder comprises a first grinder bearing 231 and a second grinder bearing 237 positioned between the rotatable adjustment gear 134 and the grinder axle 230 and located at a distance from one another.

The rotatable adjustment gear 134 comprises a first cam 402 for moving the grinder axle 230 upward and a second cam 401 for moving the grinder axle 230 downward during the adjustment of the inner burr 123. The first and second bearing 231, 237 move up and down together with the rotatable adjustment gear 134 and the grinder axle 230 during the adjustment of the inner burr 123. In particular the first cam 402 engages and acts on the first grinder bearing 231 and the second cam 401 engages and acts on the second grinder bearing 237. In this way the up and down movement of the inner burr is completely controlled.

The coffee bean grinder 120 may comprise one or more sliding bushings 403 extending around the grinder axle 230 and being positioned between the grinder axle and the grinder housing 121. The sliding bushing 403 allows the vertical movement of the grinder axle relative to the grinder housing. The sliding bushing may in particular be located above the first grinder bearing 231.

Figure 28A:
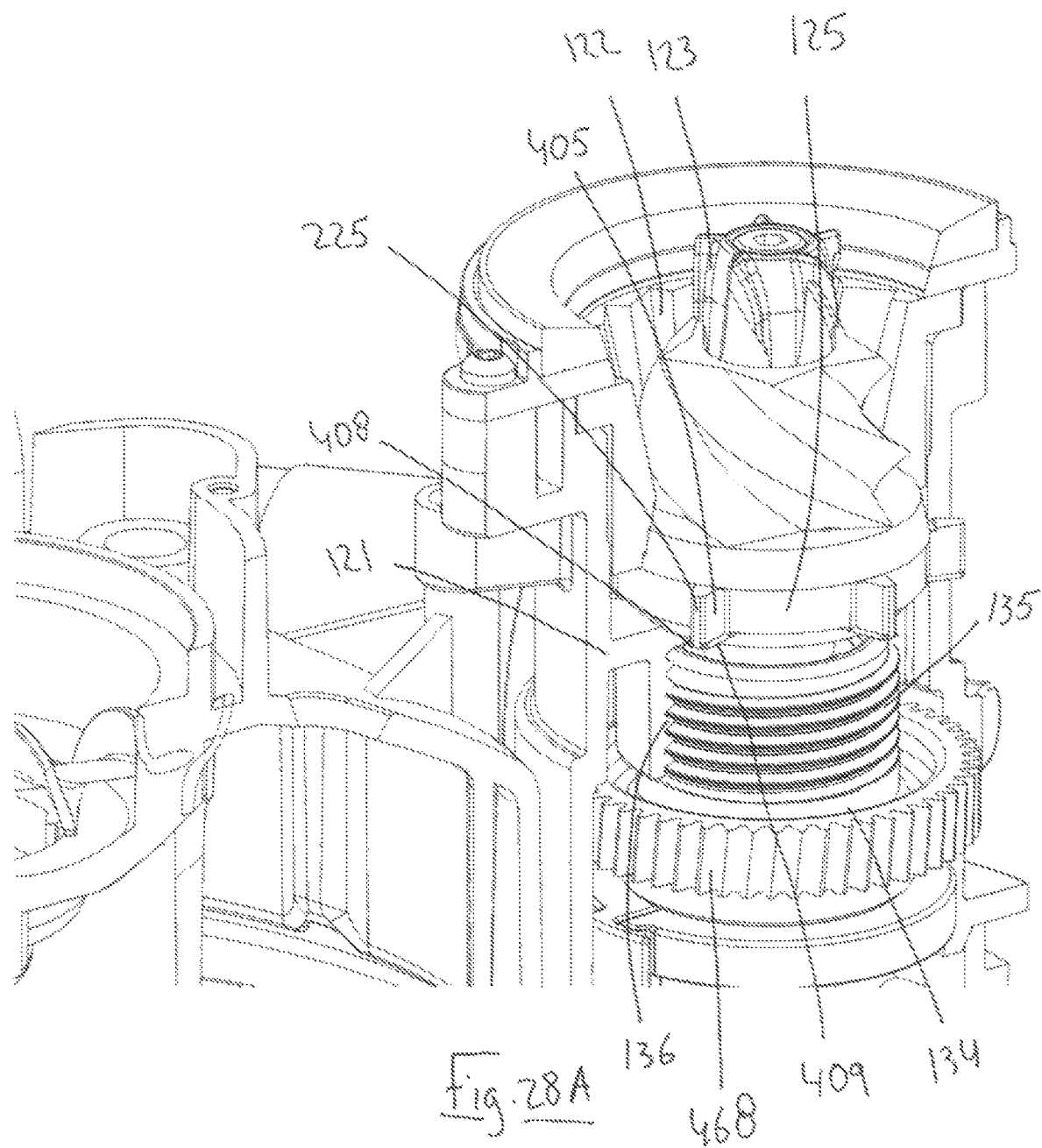
FIG. 28A shows an isometric/sectional view of the embodiment of FIG. 27.
Figure 28B:
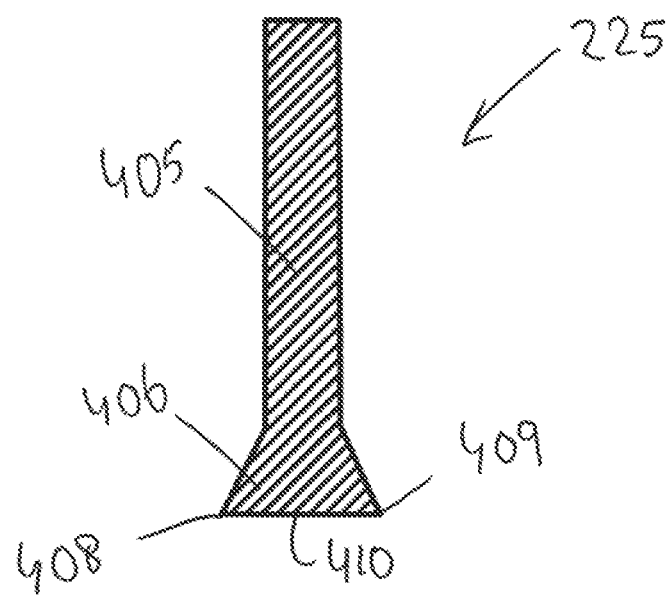
FIG. 28B shows a schematic sectional view of an impeller blade.

Turning to FIG. 28A, 28B, the impeller blades 225 may have a main section 405 and a bottom end 406, wherein the bottom end is wider than the main section. The bottom end may taper outwardly and define a front bottom edge 408 and a rear bottom edge 409 and a flat bottom surface 410. The front bottom edge and the rear bottom edge are configured to wipe the bottom cavity wall 128 clean during rotation of the impeller.

In operation, the method of grinding coffee beans may comprise:
providing coffee beans to the coffee bean grinder 120,
rotating the inner and outer burr relative to one another in a first rotational direction, thereby grinding the coffee beans and expelling the ground coffee with the impeller via the grinder exit opening,
after the grinding, reversing the rotational direction and rotating the inner and outer burr relative to one another in the second, opposite rotational direction and cleaning the coffee grinder by expelling remaining ground coffee particles from the coffee bean grinder by the impeller without grinding coffee.

After the cleaning action, the axial position of the inner relative to the outer burr may be adjusted for a next cup of coffee.

In the adjustment step the inner and outer burr may be moved relative to one another in the direction of the main grinder axis from a first grinder position to a second grinder position or vice versa for adjusting the coffee bean grinder, wherein the adjustment takes place without moving the inner or outer burr to a separate home position. This is possible due to the cleaning action of the coffee bean grinder 120.

8. Ground Coffee Conveyor

Figure 14:
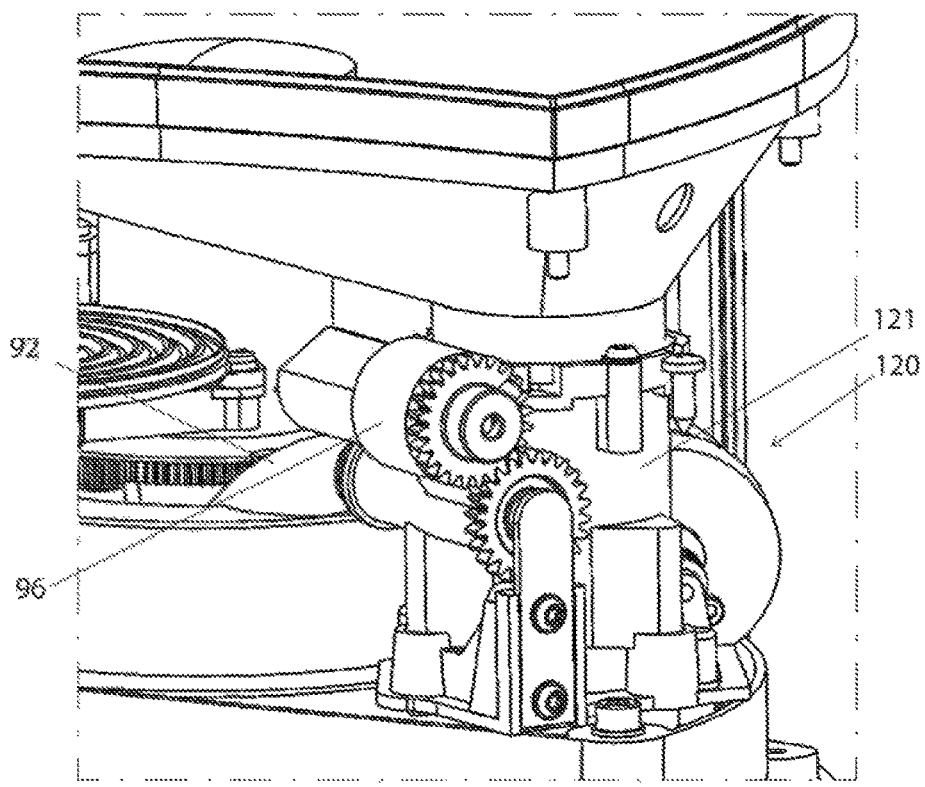
FIG. 14 shows an isometric view of the coffee bean grinder.
Figure 15:
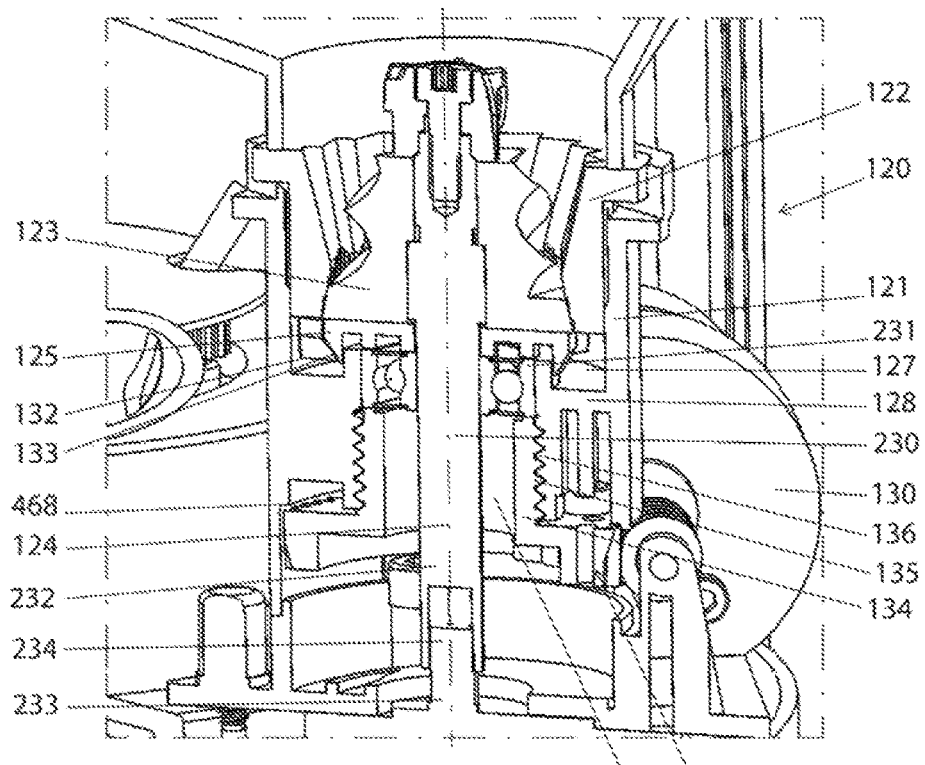
FIG. 15 shows a sectional side view of the coffee bean grinder.
Figure 16:
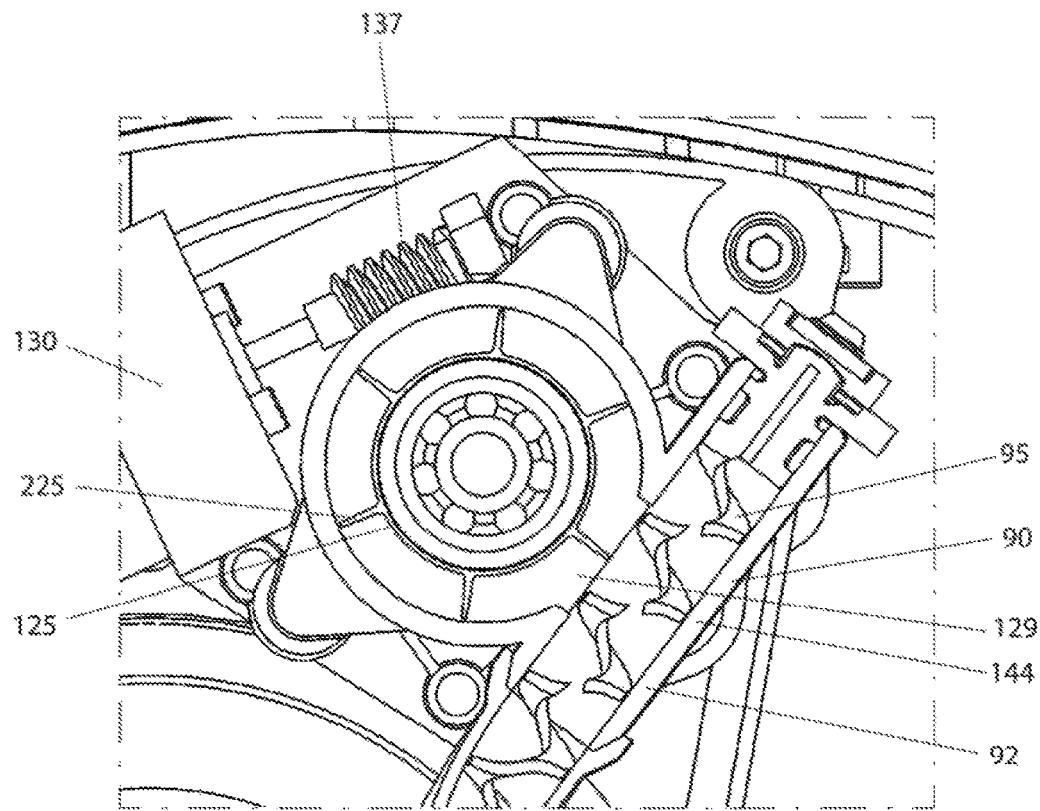
FIG. 16 shows a sectional top view of the coffee bean grinder.
Figure 17:
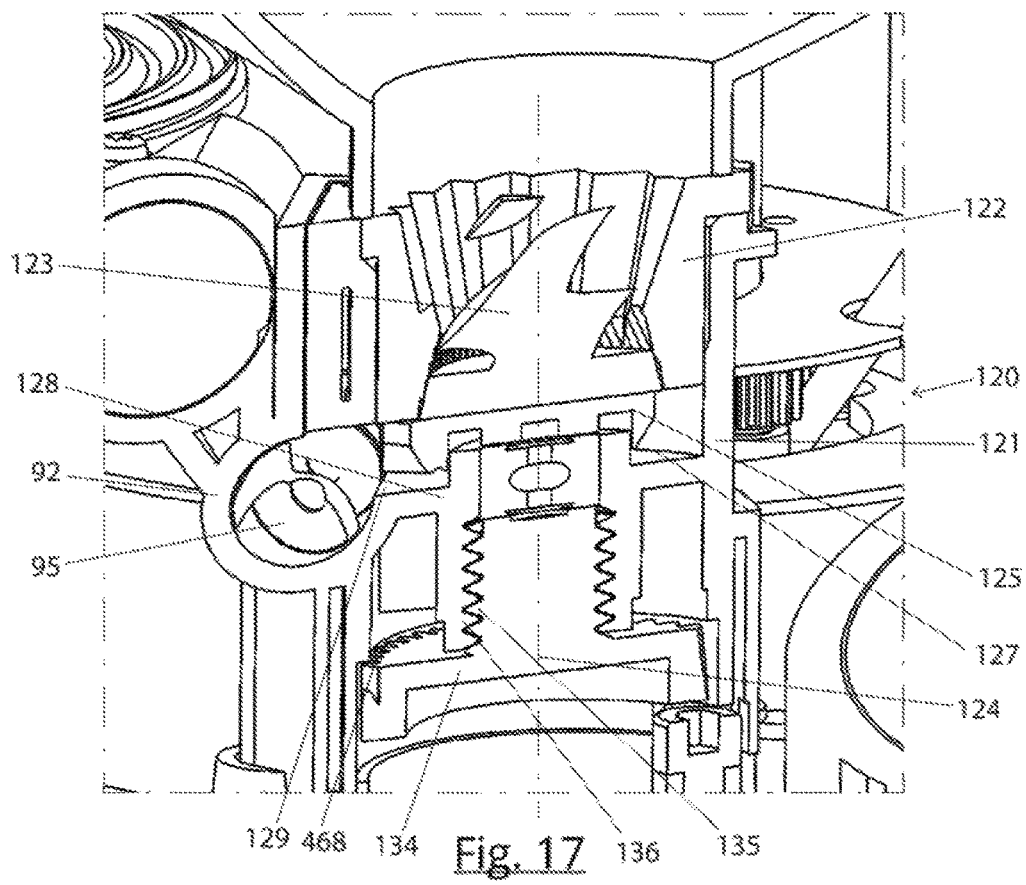
FIG. 17 shows another sectional view of the coffee bean grinder.
Figure 18:
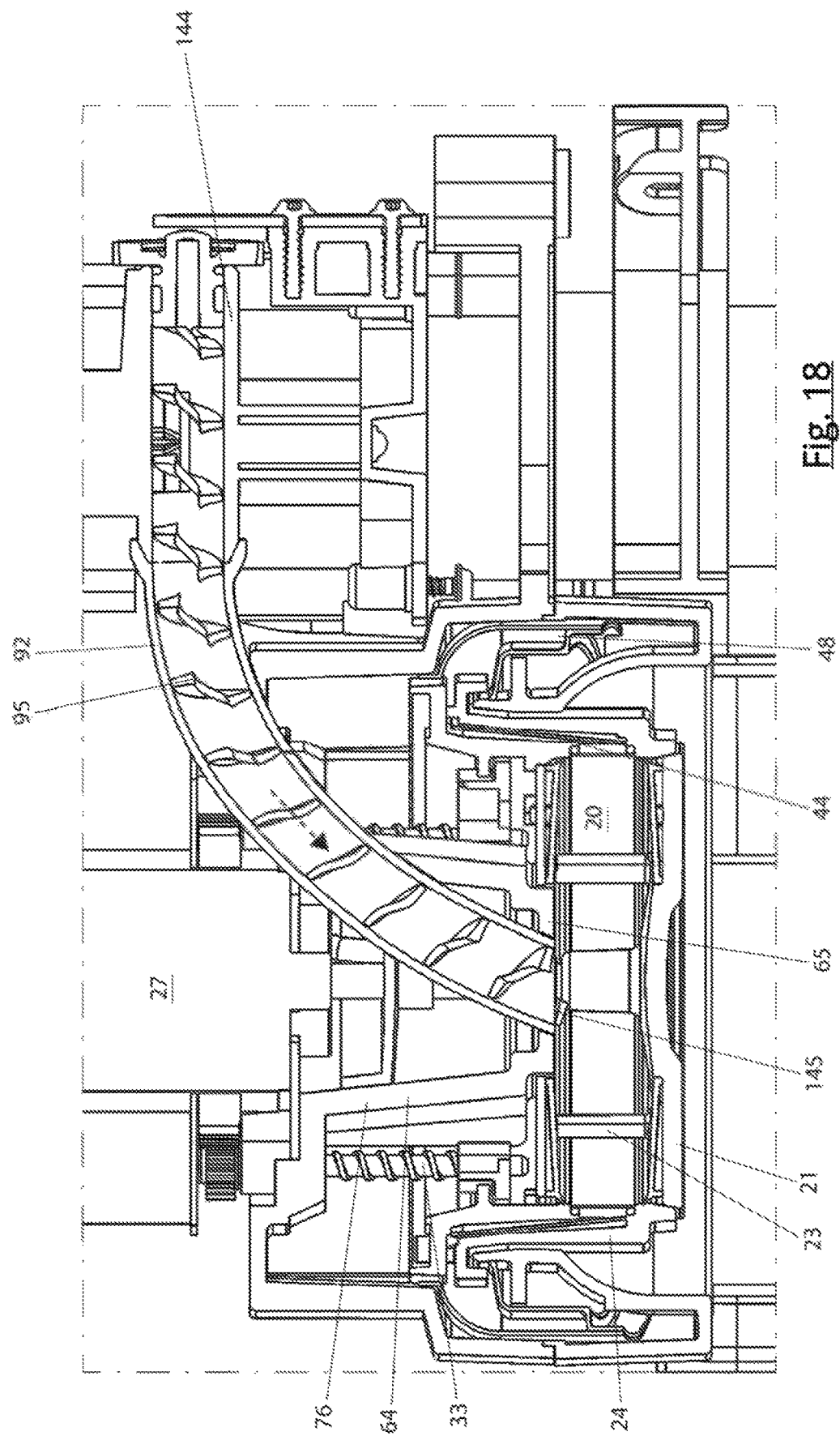
FIG. 18 shows a sectional side view showing the supply tube.

Turning to FIGS. 14, 17 and 18, in an independent aspect, a conveyor 90 for a beverage preparation device is disclosed. The conveyor is configured for conveying powder or granulate from a first location to a beverage preparation location for the preparation of the beverage. For the present centrifugal coffee brewer, the conveyor will convey ground coffee, but it is conceivable that the conveyor is used for conveying soup powder for making soup, milk powder for making milk or adding milk to coffee, chocolate powder for making hot chocolate milk, or other kinds of powder or granulate for making a beverage. The conveyor may also convey additives such as vanilla powder as an additive for coffee. It will be understood that the beverage preparation device can be the centrifugal coffee brewer as disclosed herein, but also another type of coffee brewer, or a soup preparation device, or a beverage preparation device configured for making a variety of different beverages.

The conveyor comprises:
  a supply tube (92) extending from the first location to the beverage preparation location, the supply tube comprising an entry opening and an exit opening,
  a transport screw (95) extending through the supply tube and mounted for rotation,
  a screw drive (96) configured for rotating the transport screw,
wherein the supply tube is curved and wherein the transport screw is flexible.

The beverage preparation device may be a centrifugal coffee brewing device 10, comprising:
  a spinning assembly 16 comprising a chamber element 20 and a cylinder element 24 which form a brewing chamber 26 and are configured to rotate about a main axis 18,
  a coffee bean grinder 120 for grinding coffee beans into ground coffee, wherein the supply tube extends from the coffee bean grinder to the brewing chamber, wherein the conveyor is configured for transporting ground coffee from the coffee bean grinder to the brewing chamber.

The conveyor may achieve several advantages. A risk of clogging of the supply tube is reduced. This is connected with the deformation of the transport screw during rotation.

Further, a risk that some ground coffee does not enter the brewing chamber but stays behind in the supply tube is also reduced. Further, a risk that mist will rise into the supply tube is reduced. The transport screw may continue to rotate during the brewing of coffee.

Further, the ground coffee conveyor also creates a (fourth) airflow by conveying air into the brewing chamber 20, which flows through the brewing chamber, through the channel 44 and into the gutter 48, and exits the device 10 via the coffee outlet 19. This airflow carries aroma which improves the aroma sensation for the user.

The supply tube 92 may be curved. The transport screw 95 may be flexible and in particular manufactured from a flexible synthetic material. The supply tube 92 may comprise a horizontal tube part 144 at a coffee exit opening of the coffee bean grinder, wherein the horizontal tube part extends at an angle of less than 5 degrees to the horizontal.

The transport screw may have a varying pitch.

The transport screw 95 may have a variable diameter.

The transport screw may be segmented.

Turning to FIG. 37, the transport screw may be core-less, i.e. have a helical shape without a core. Turning to FIG. 36, alternatively, the transport screw 95 may comprise a screw core 466.

The supply tube 92 may be curved in two independent planes of curvature, having a first curvature when seen in side view and a second curvature when seen in top view. The curved supply tube 92 may have a varying curvature along the length of the tube.

At least a part of the supply tube 92 may extend downwards.

The supply tube may extend through a roof opening 145 in a core bottom wall 65 of the core part 64. The core bottom wall 65 is stationary and forms part of the roof of the brewing chamber 26. The roof opening 145 is in particular positioned eccentrically from the main axis 18.

Turning to FIGS. 24, 25 and 26 the device 10 may comprise at least one separate merge tube 320 extending from a separate hopper 321 or from a separate inlet opening toward the supply tube 92 where it merges with the supply tube at a merge location 322. This allows pre-ground coffee to be used which bypasses the grinder. Also, additives such as milk powder, chocolate powder or vanilla powder can be added separately from the hopper or from the separate inlet opening. Also in a beverage preparation device which is not a centrifugal coffee brewer, this allows various configurations of the conveyor which makes it possible to mix various powders or granulates.

The screw drive 96 may be configured to rotate the transport screw 95 at a relatively high rotational speed for ground coffee with relatively small particles and at a relatively low speed for ground coffee having relatively large particles.

The conveyor may convey the ground coffee at a velocity which is at least twice as high as the velocity with which the ground coffee exits the coffee bean grinder, measured in meter per second, and in particular three times as high, even more in particular four times as high. This further reduces the chance of clogging of the supply tube and provides the advantage that the supply of ground coffee into the brewing chamber and the distribution of the ground coffee over the filter is improved. The conveyor may also have a discharge capacity, measured in gram per minute which is at least twice as high and in particular three times as high, even more in particular four times as high, as the discharge capacity of the grinder 120.

The conveyor 90 may be configured to pump both powder or granulate, in particular ground coffee, and air into the brewing chamber.

Figure 6:
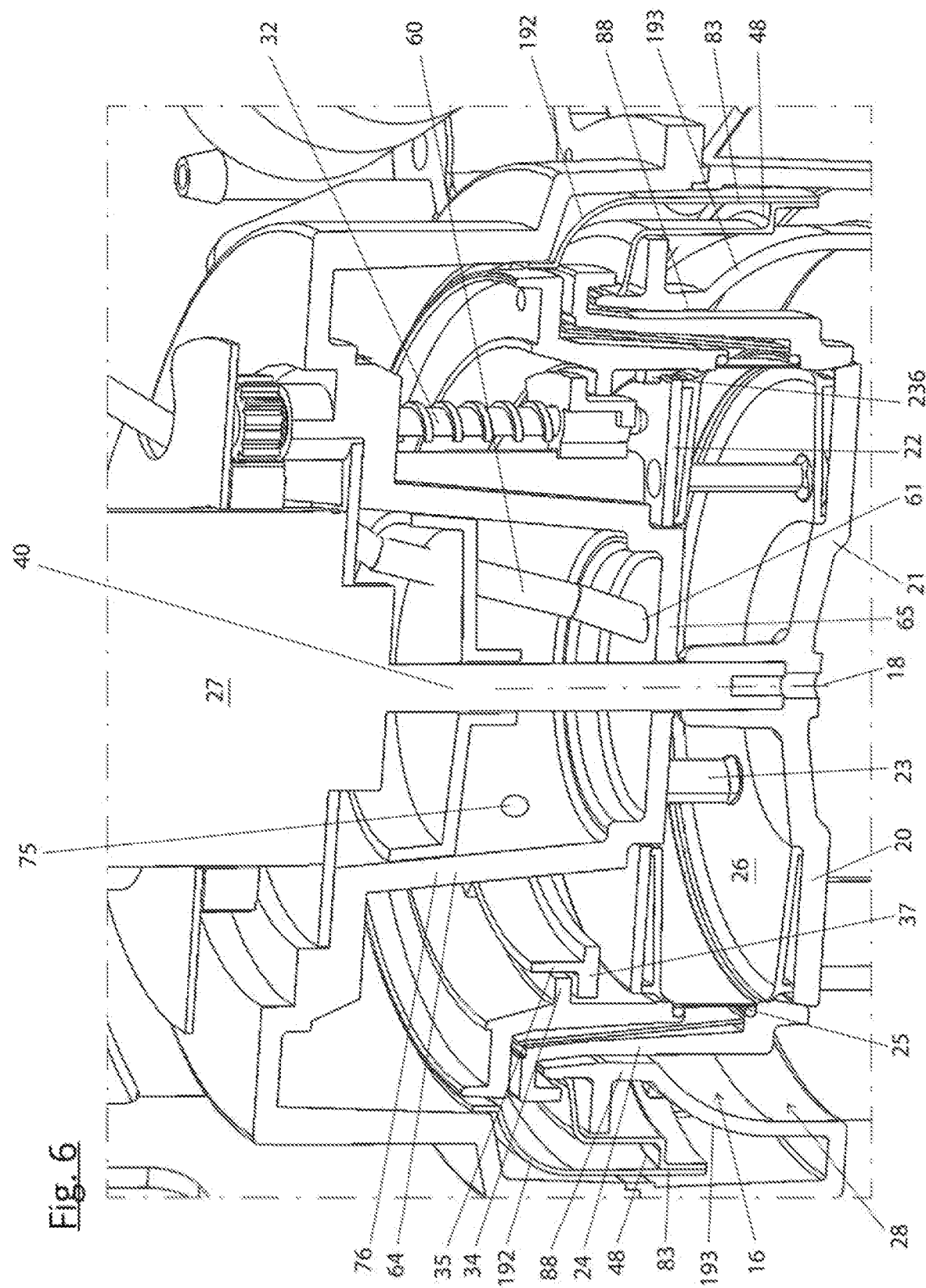
FIG. 6 shows an isometric sectional view of the spinning assembly.
Figure 7:
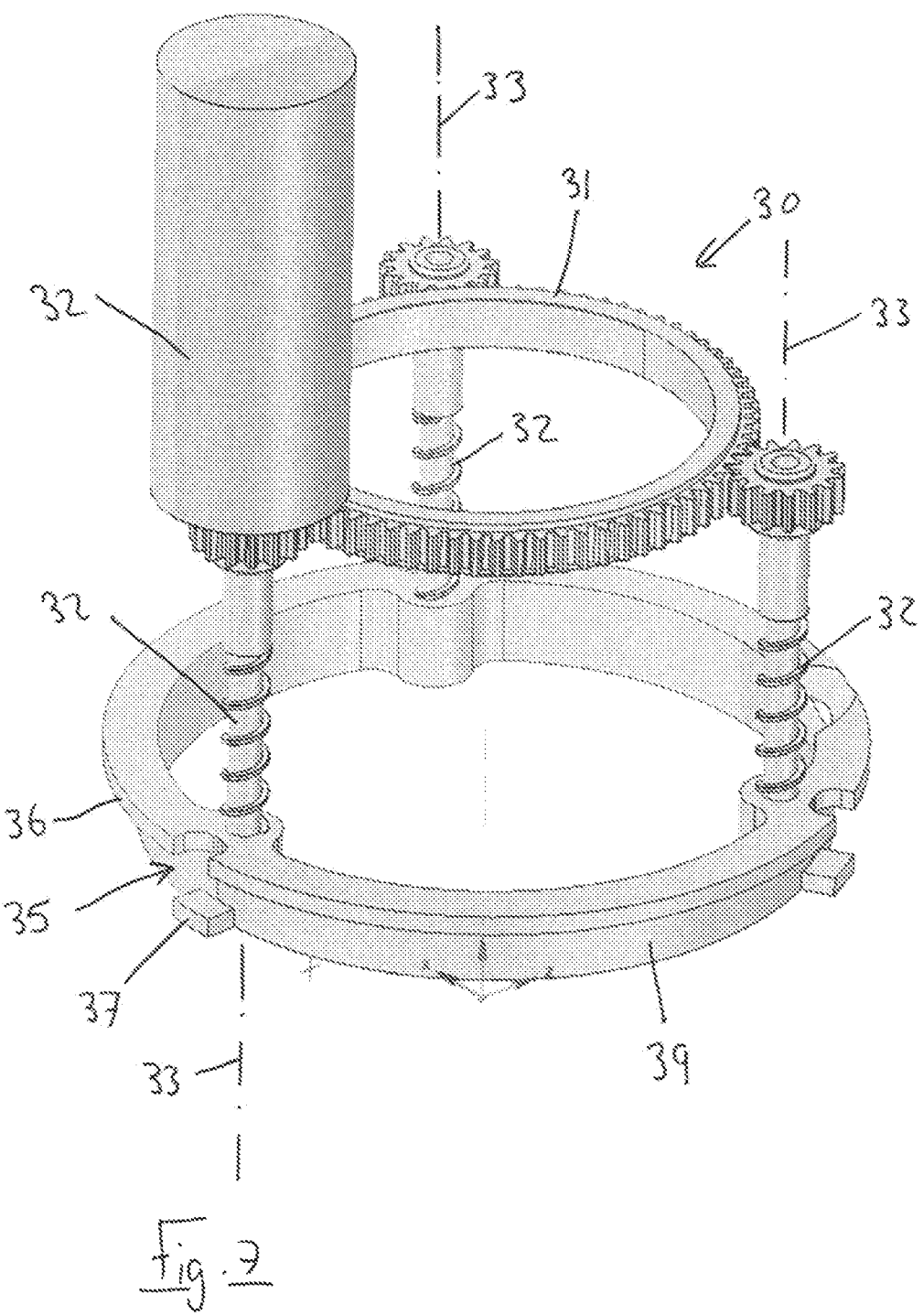
FIG. 7 shows an isometric view of the cylinder drive assembly.
Figure 8:
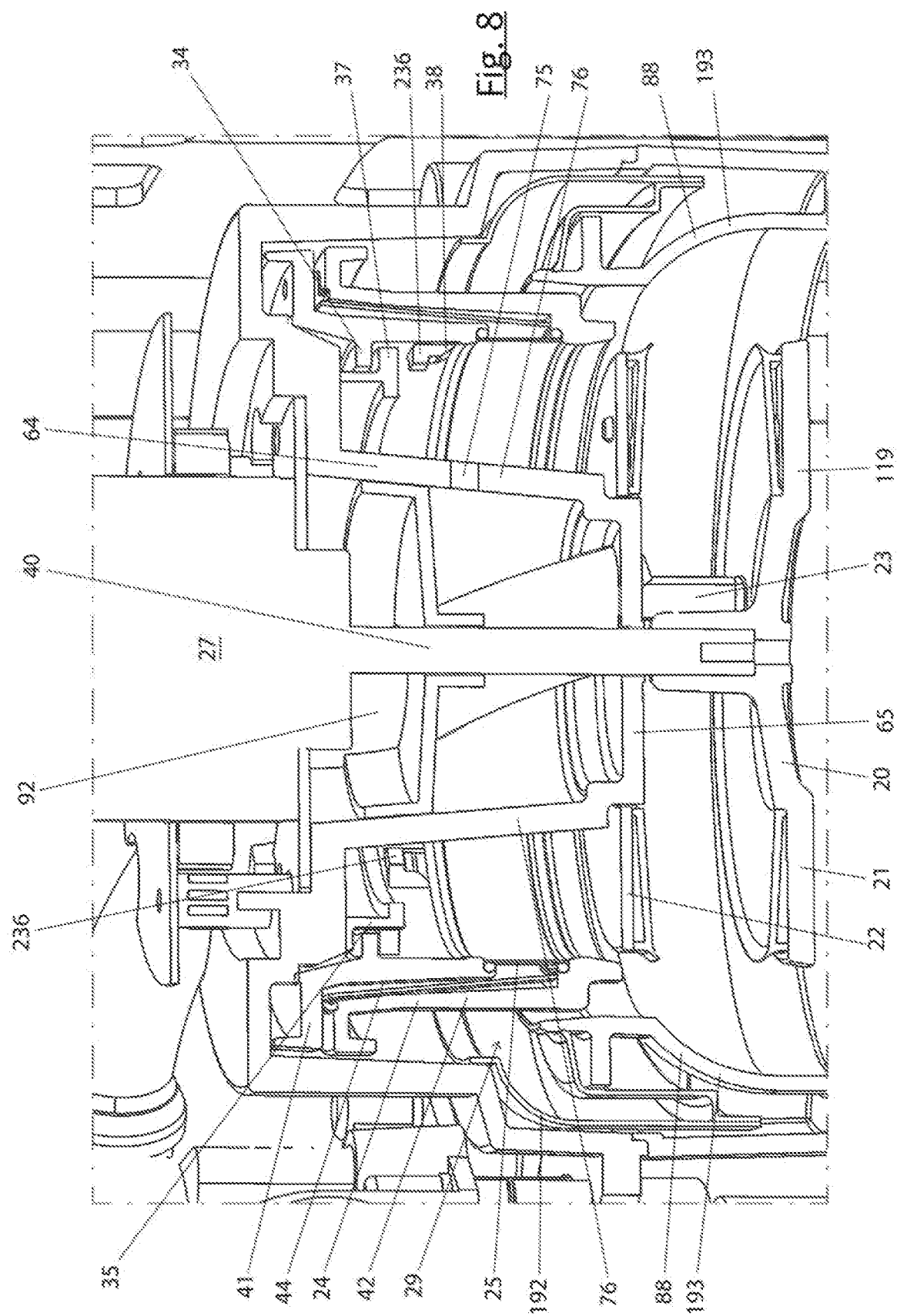
FIG. 8 shows an isometric sectional view of the spinning assembly in an ejecting configuration.

As shown in FIG. 6, the device 10 may comprise a separate hot water supply tube 60 for supplying hot water into the brewing chamber, wherein the hot water supply tube enters the brew chamber via a separate water opening 61, in particular a separate water opening in the core bottom wall 65 of the core element 64, which may be stationary. The water opening 61 is located eccentrically with respect to the main axis 18.

Returning to FIGS. 14, 17 and 18, the supply tube 92 may be oriented at an angle of 50-90 degrees to the horizontal at the roof portion of the chamber element.

The supply tube 92 may have an opening at the upstream side via which the transport screw may be removed for cleaning, repair or replacement.

In operation, the method for conveying ground coffee to the brewing chamber may comprise providing the device 10 and conveying ground coffee by rotating the transport screw. The transport screw rotates and deforms during rotation. The transport screw may be rotated at a speed of 100-400 rpm.

During rotation, the transport screw deforms. The pitch is smaller in the inside of the curve than in the outside of the curve as a result of the deformation. When the transport screw starts to rotate, it also decreases in length as a result of the torsion in the transport screw, which results in a "coiling" of the transport screw. Also when the transport screw starts to rotate it decreases slightly in diameter because of the same torsion and coiling effect.

The deformation assists in preventing powder or granulate, in particular ground coffee, from clogging onto the transport screw.

9. Off-Centre Position of the Spinning Assembly

Figure 19:
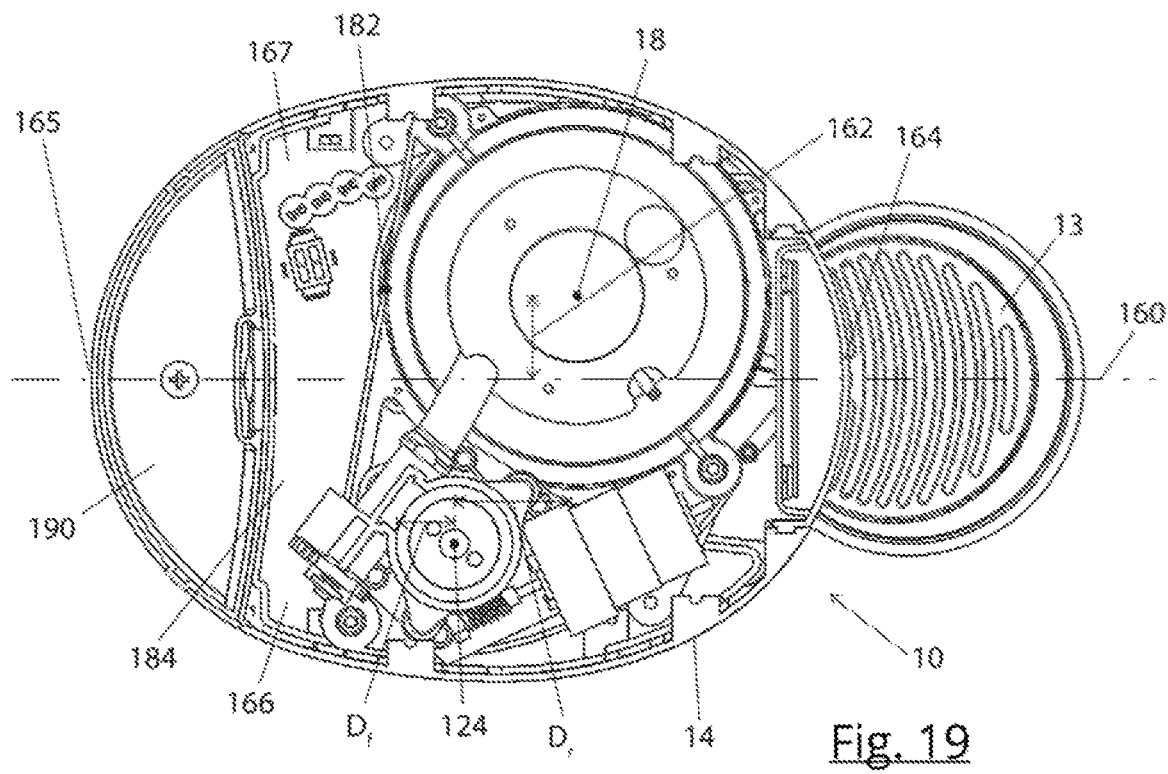
FIG. 19 shows a sectional top view of the device.
Figure 20:
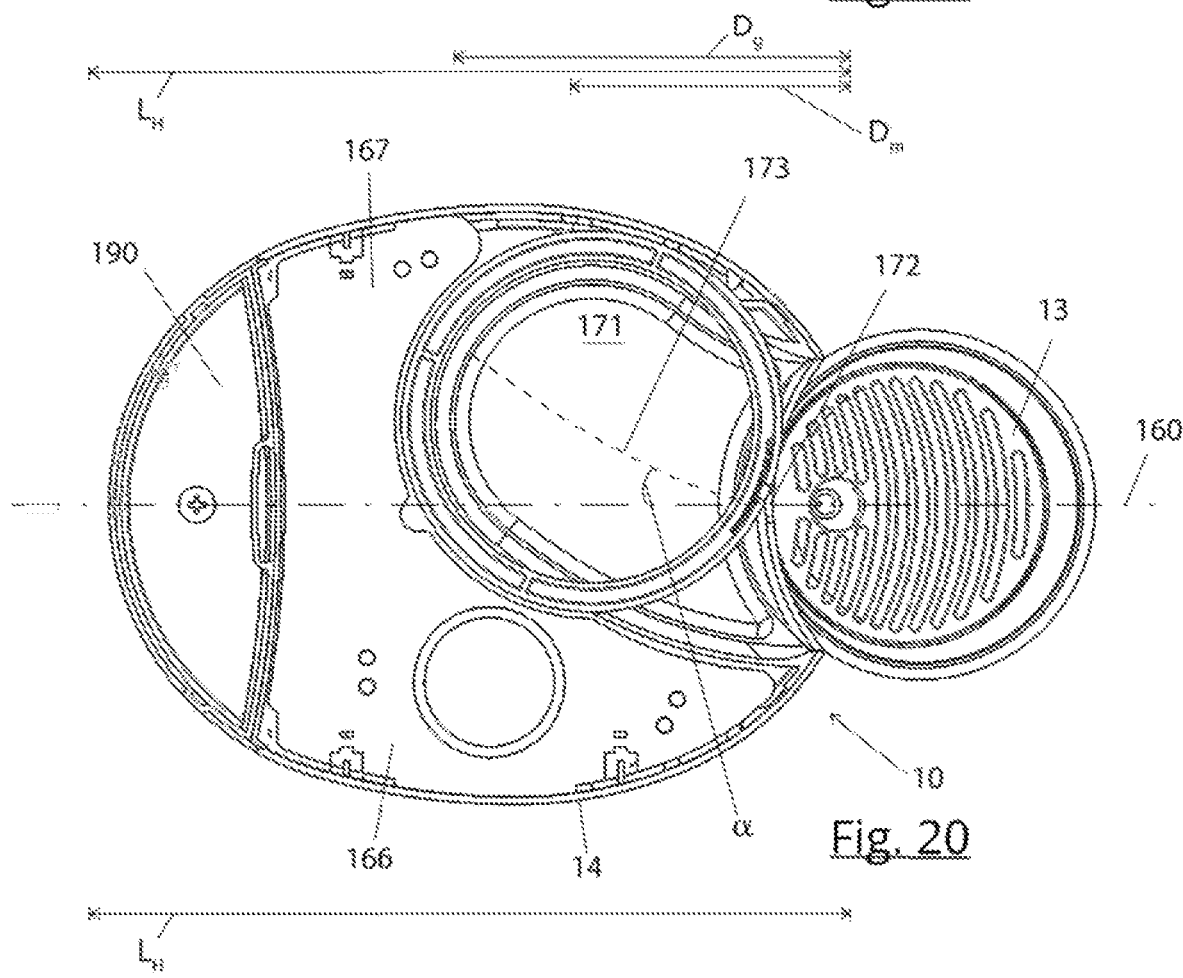
FIG. 20 shows another sectional top view of the device.

Turning to FIGS. 19 and 20, in one aspect, in top view the main axis 18 is positioned at a distance 162 from a vertical midplane 160 extending from a front side 164 of the housing 14 to a rear side 165 of the device, the midplane dividing the housing in a left part 166 and a right part 167 which are equal in size, wherein the main axis 18 is positioned on one side of the midplane and the coffee bean grinder is positioned on the opposite side of the midplane, at a distance from said midplane.

This configuration allows the device 10 to be more compact.

In top view the main grinder axis 124 may be positioned at a distance Dr to the rear of the main axis 18.

The device 10 may comprise:
- a residue tray 170 for holding coffee residue, the residue tray being positioned below the spinning assembly,
- a tray support position 171 in which the residue tray is positioned below the spinning assembly, the tray position being positioned eccentrically from the vertical midplane 160,
- a front opening 172 positioned centrally in the front side 164 of the housing,
- a tray trajectory 173 extending from the front opening to the residue tray position, and along which the residue tray can be inserted into the device and positioned in the tray support position and can be taken out of the device when it is filled with coffee residue, wherein in top view the tray trajectory extends at a sharp angle to the midplane.

In top view the tray trajectory 173 may be curved.

In front view the spinning assembly 16 may be positioned on a right side of the midplane and the coffee bean grinder may be positioned on a left side of the midplane.

10. Modular Configuration

With reference to FIGS. 19-22, in another independent aspect, a method is provided for producing centrifugal coffee brewing devices 10 in a first, small configuration and a second, large configuration. The method comprises assembling the devices 10 with a front part 185 which is the same for the small and large configuration and with at least two versions of a rear part 184.

The front part 185 comprises:
- a spinning assembly 16 which is rotatable about a main axis 19, the spinning assembly comprising:
  - a chamber element 20 comprising a bottom wall 21 and a roof portion 22,
  - a cylinder element 24 comprising a filter 25,
  - wherein the chamber element and the cylinder element form a brewing chamber 26,
  - a main drive 27 for rotating the spinning assembly about the main axis for centrifuging the coffee,
- a coffee bean grinder 120 for grinding coffee beans into ground coffee, the coffee bean grinder having an inner and outer burr which are rotatable relative to one another about a main grinder axis 124

It will be understood that the front part is the same in particular with regard to the mentioned features, but that minor features of the front part may vary between a small and a large configuration.

A first, small version of the rear part 184 (see FIG. 21) comprises a water tank 190 for holding water but no coffee bean hopper 180 for storing coffee beans. In the small version, the coffee bean hopper 180 is positioned above the spinning assembly 16.

A second, large version of the rear part 184 (see FIG. 22) comprises:
- a water tank 190 for holding water, and
- at least one coffee bean hopper 180 for storing coffee beans.

The method comprises producing:
- a number of devices having the small configuration, and
- a number of devices having the large configuration.

The device may comprise a frame 12, wherein the frame comprises at least a front frame part 12A and a rear frame part 12B. The front frame part and the rear frame part are separate parts which are interconnected via connectors 280 or via adhesive.

The front frame part 185 supports the spinning assembly and the coffee bean grinder, and wherein the rear frame part supports at least the water tank, and wherein the method comprises providing both a small rear frame part 12B1 for the small configuration and a large rear frame part 12B2 for the large configuration and connecting to each front frame part a small rear frame part or a large rear frame part.

The at least one coffee bean hopper 180A,180B may be positioned to the rear of the spinning assembly and to the rear of the coffee bean grinder and is supported by the large rear frame part 12B2.

The large rear part 184 comprises a first coffee bean hopper 180A and a second coffee bean hopper 180B which are positioned to the rear of the spinning assembly and to the rear of the coffee bean grinder.

In top view the main axis 18 may be positioned eccentrically from a vertical midplane 160 extending from a front side 164 of the housing 14 to a rear side 165 of the housing. The midplane divides the housing in a left part 166 and a right part 167 which are equal in size, wherein the main axis is positioned on one side of the midplane and the coffee bean grinder is positioned on an opposite side of the midplane.

The grinder axis may be positioned to the rear of the main axis, wherein the housing has a housing length Lh. The grinder axis may be positioned at a distance Dg of 40-60 percent of the housing length Lh from a front side 164 of the housing.

The rear frame part 12B1, 12B2 supports at least the water tank 190, but may support other parts as well, for instance side panels 186,187 of the housing 14.

When seen in top view the spinning assembly has a rearmost part 182. The main grinder axis 124 is positioned at a distance Df forward of the rearmost part 182.

This configuration provides an advantage in that a rear part 184 of the device 10 can easily be converted between a small size for household use, see FIG. 27, and a large size for more professional use, see FIG. 28. The buildup of the front part 185 of the device which comprises the spinning assembly 16 and the coffee bean grinder 120 can stay the same for both sizes. This is shown in FIGS. 21 and 22 and in FIGS. 27, 28. FIG. 21 shows a small version. FIG. 22 shows a larger version, in which the right side wall 186 and left side wall 187 have been extended, to create a larger housing 14.

This also allows the water tank to be enlarged for the larger size of the device without modifying the front part of the device. Also, the hopper may be enlarged or two hoppers 180A, 180B may be provided for storing different kinds of beans. The hoppers may be placed lower than in the variant shown in the previous figures. A lower opening of the hopper from the beans exit be positioned as low as the residue tray. In such a variant, the hoppers may be provided with a bean lift 188 for transporting beans from a hopper opening at the lower end of the hopper to the coffee bean grinder 120 which is located in an upper region.

A single coffee bean hopper with a lift is also possible.

The device 10 may comprise a water tank 190, wherein the at least one coffee bean hopper may be positioned forward of the water tank, and when seen in top view in particular between the water tank and the coffee bean grinder.

The main axis 18 may be positioned at a distance Dm of 30-40 percent of the housing length (Lh) from a front side of the housing.

These features improve the production of the device 10 in a modular fashion.

11. Configuration of Outflow Passage

In one aspect, the centrifugal coffee brewing device 10, comprises:
- the frame 12 for supporting various parts of the device 10,
- the spinning assembly 16 which is rotatable about the main axis 18, the spinning assembly comprising:
  - the chamber element 20 comprising the bottom wall 21 and the roof portion 22,
  - the cylinder element 24 comprising the filter 25,
  - wherein the chamber element and the cylinder element form the brewing chamber 26,
- the main drive 27 for rotating the spinning assembly about the main axis for centrifuging the coffee,
- the gutter 48 for collecting coffee expelled from the spinning assembly, wherein the gutter extends around the spinning assembly,
- a deflection member 192 positioned above the gutter and configured to deflect coffee which is expelled from the cylinder element in a downward direction into the gutter,
- wherein the cylinder element comprises the channel 44 via which the coffee travels from the filter and leaves the cylinder element, wherein the channel comprises the entrance 45 downstream of the filter and the channel exit 46,
- wherein the channel extends at an angle of at least 75, more in particular at least 80 degrees to the horizontal,
- wherein the cylinder element comprises an outflow passage 194 positioned downstream of the channel, the outflow passage being oriented horizontally and being defined between a passage floor 195 and a passage ceiling 196 of the outflow passage, wherein the cylinder element comprises a turn 198 at the channel exit where the coffee which flows from the exit turns from travelling upward to travelling in a substantially horizontal direction, and wherein at least an outer part 200 of the outflow passage has a height Hop between the passage floor and the passage ceiling of at least 3 mm.

This allows the coffee to travel through said outer part of the outflow passage without contacting the passage floor 195 or the passage ceiling 196 of said outer part or with minimal contact with the passage floor 195 or the passage ceiling 196. This reduces heat loss in the coffee.

The gutter 48 may be defined by the gutter element 83. The gutter element may comprise an inner gutter member 831 and an outer gutter member 832. The deflection member 192 may be connected to the gutter element 83.

The turn may comprise a threshold 201 over which the coffee travels and which defines the exit of the channel, wherein the threshold is located at a height (Ht) above the passage floor 195 of 20-80 percent, in particular 30-70 percent, more in particular 40-60 percent of the height (Hop) of said outer part of the outflow passage.

The outflow passage may comprises an inner part having smaller height (Hip) than the outer part.

The outflow passage may be directed at the deflection member 192, wherein the deflection member is oriented inwardly and downwardly.

The passage floor and the passage ceiling may extend about the main axis over a circumferential angle of at least 300 degrees and may in particular extend over the full circumference of the cylinder element 24.

The passage floor and the channel may be horizontal or may taper outwardly.

The outflow passage may comprise a transition 205 between the inner part and the outer part, at which the height of the outflow passage increases. The transition may be sharp, i.e. the height of the outflow channel exit increases from a first height (H1) to the second height (H2) over a distance (Di1) which is smaller than the first height (H1).

In operation, a method of brewing coffee may comprise:
providing the device 10,
brewing coffee by supplying ground coffee and hot water and spinning the spinning assembly,
wherein the coffee flows upward and outward through the channel, makes a turn at the turn and flows horizontally through the outflow passage 194, wherein the coffee does not contact the passage floor and passage ceiling in the outer part of the outflow passage or only minimally contacts the passage floor or passage ceiling.

12. Parts in Foam Material

In one aspect, the centrifugal coffee brewing device 10 comprises:
the gutter element 83 which defines the gutter 48 for collecting coffee expelled from the spinning assembly, wherein the gutter extends around the spinning assembly,
the deflection member 192 positioned above the gutter and configured to deflect coffee which is expelled from the cylinder element in a downward direction into the gutter,
wherein at least the gutter element is manufactured from a foam material.

This reduces the heat loss of the coffee when travelling through the gutter.

The foam material may be expanded polypropylene (EPP). The deflection member 192 may be made from a foam material, in particular EPP. This further reduces the heat loss.

The foam material may comprise a smooth skin.

13. Bypass

Turning to FIGS. 29, 30, 31A, 31B, 31C, 31D, in another aspect, the centrifugal coffee brewing device 10 comprises:
a spinning assembly 16 which is rotatable about a main axis 18, the spinning assembly comprising:
a chamber element 20 comprising a bottom wall 21 and a roof portion 22,
a cylinder element 24 comprising a filter 25,
wherein the chamber element and the cylinder element form a brewing chamber 26,
a main drive 27 for rotating the spinning assembly about the main axis for centrifuging the coffee,
a coffee outlet 19 out of which the brewed coffee flows,
a removable residue tray 170 positioned below the spinning assembly,
a removable drip tray 13 positioned at a lower side of the centrifugal coffee brewing device and forming a support for a coffee cup below the coffee outlet,
wherein the residue tray 170 comprises:
a first compartment 420 for holding the coffee residue,
a second compartment 421 for catching water or coffee, The centrifugal coffee brewing device further comprises:
a bypass switch 422 positioned just upstream of the coffee outlet 19,
a controllable bypass actuator 424 configured to switch the bypass switch from regular flow mode to bypass flow mode,
a bypass channel 426 extending from the bypass switch to the second compartment.

The bypass switch 422 is located in the outlet channel 427 which is formed by a tube 429. The controllable bypass actuator 424 can move the bypass switch 422 up and down as shown with arrow 425.

Figure 29:
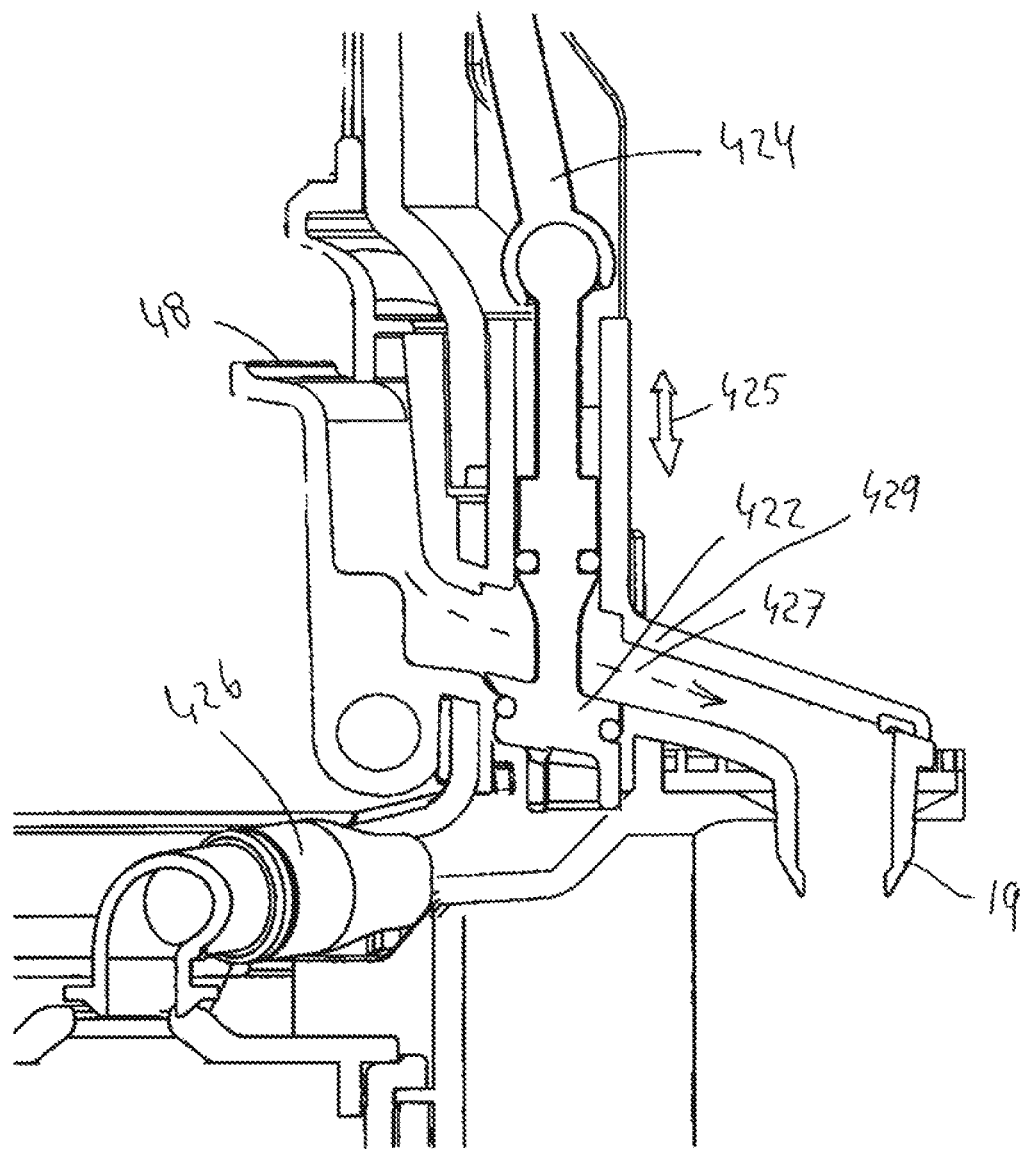
FIG. 29 shows a detailed section view of an embodiment of the outlet configuration in regular flow mode.
Figure 30:
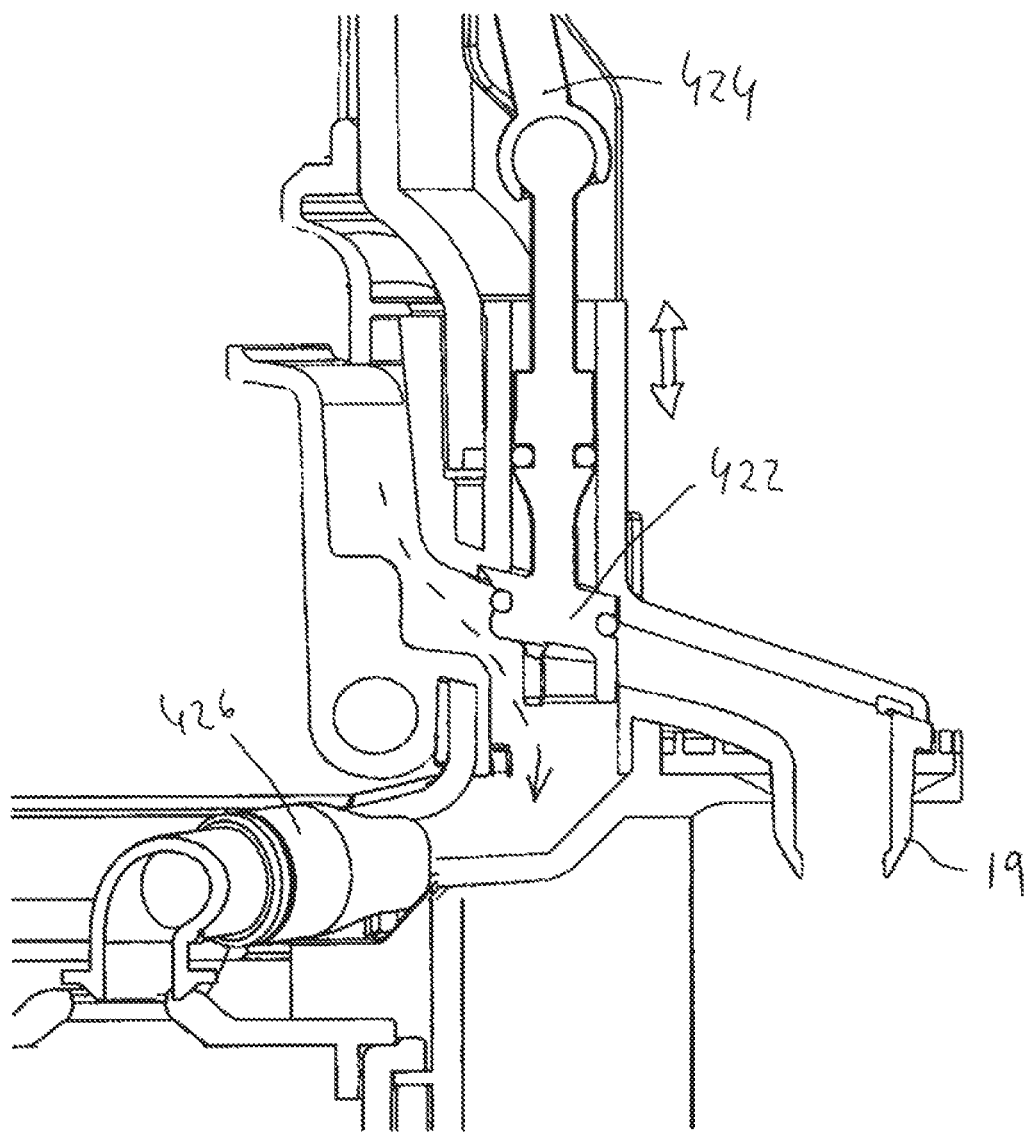
FIG. 30 shows a detailed section view of an embodiment of the outlet configuration in bypass flow mode.
Figure 31A:
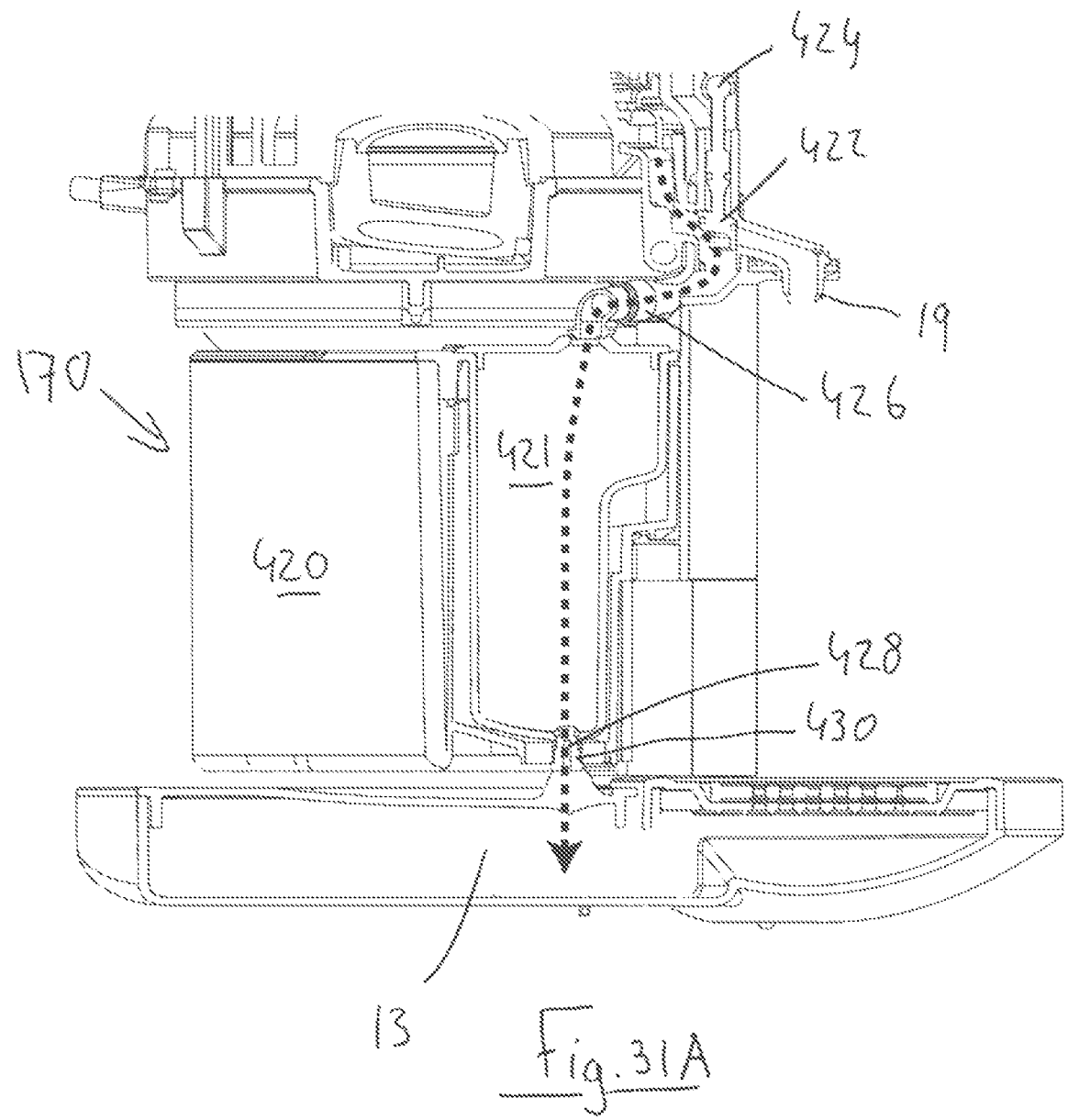
FIG. 31A shows a sectional view of another embodiment the bypass channel and residue tray.
Figure 31C:
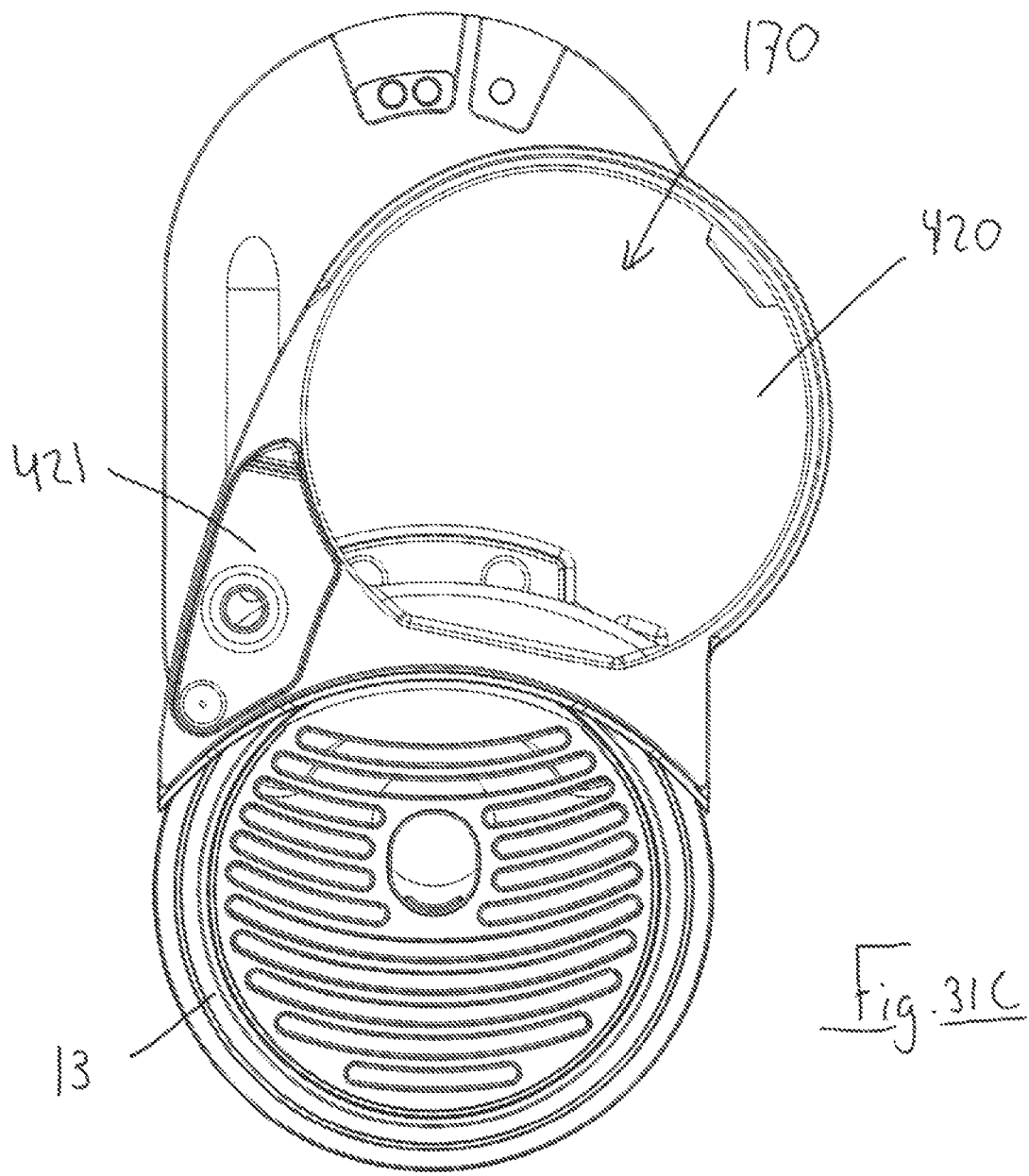
FIG. 31C shows a top view of the residue tray and drip residue tray of FIG. 31A.
Figure 310:
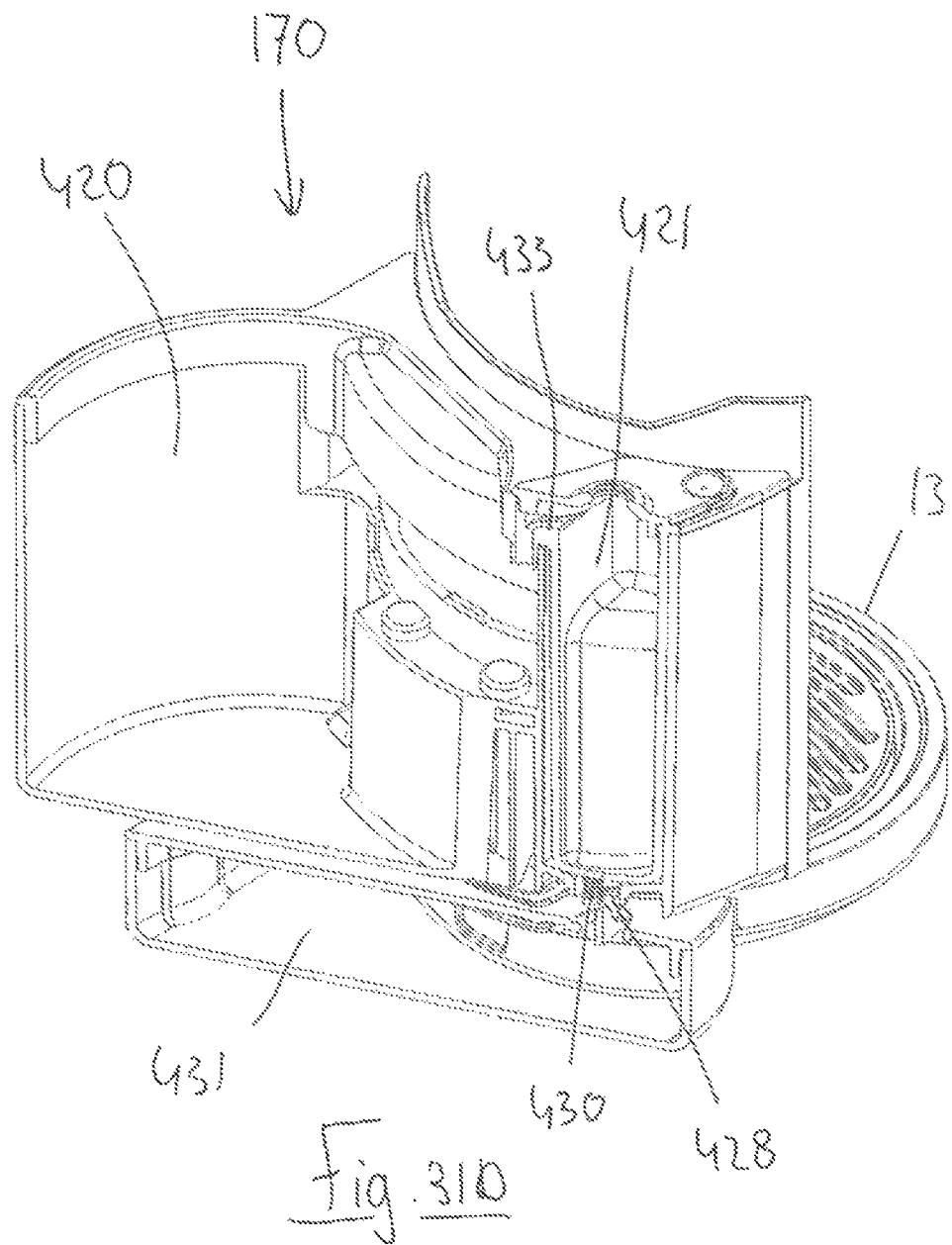

In regular flow mode which corresponds to the lower position of the bypass switch 422 as shown in FIG. 29, the coffee flows through the coffee outlet 19. In bypass flow mode which corresponds to the upper position of the bypass switch 422 as shown in FIG. 30, the hot water or coffee does not flow through the coffee outlet 19 but instead is diverted and flows through the bypass channel 426 into the second compartment 421 of the residue tray 170.

The second compartment 421 is located at a front side of the residue tray 170, in particular on the left side, when seen in front view.

The second compartment 421 may comprise a lower outlet 428 which opens into the drip tray 13, the lower outlet comprising a valve 430 configured to be closed when the drip tray is not present and configured to open when the drip tray is present. The drip tray comprises a compartment 431 defined by the walls of the drip tray. The bypass flow enters the compartment 431 where it is stored.

The second compartment 421 may further comprise an overflow edge 433 which allows overflow into the first compartment 420 in case the second compartment is full and the drip tray 13 is not present.

The centrifugal coffee brewing device 10 may be configured to heat the brewing chamber and the gutter with steam prior to the brewing of coffee and configured to switch the bypass switch 422 to the bypass flow mode in order to divert the condensed steam through the bypass channel 426 into the second compartment 421. This prevents the condensed steam from ending up in the coffee cup below the coffee outlet and improves the taste of the coffee. If the drip tray 13 is present the condensed steam will enter the drip tray compartment 431 via the second compartment 421.

The centrifugal coffee brewing device 10 may also be configured to perform a cleaning cycle for cleaning the brewing chamber and other parts. The bypass switch 422 may also be configured to divert water which is used in the cleaning cycle into the second compartment, and if present, into the drip tray.

The drip tray 13 and the residue tray 170 are individually removable.

14. Constricted Coffee Residue Flow

Turning to FIG. 32, in a further aspect, the centrifugal coffee brewing device 10 comprises:
- the spinning assembly 16 which is rotatable about a main axis 18, the spinning assembly comprising:
  - the chamber element 20 comprising a bottom wall 21 and a roof portion 22,
  - the cylinder element 24 comprising a filter 25,
- wherein the chamber element and the cylinder element form a brewing chamber 26,
- the main drive 27 for rotating the spinning assembly about the main axis for centrifuging the coffee,
- the removable residue tray 170 positioned below the spinning assembly,
- the residue deflection member 193 for guiding the coffee residue which is ejected from the spinning assembly downward into the residue tray 170.

The centrifugal coffee brewing device 10 further comprises a ring-shaped residue constricting skirt 293 positioned below the residue deflection member 193 and above the removable residue tray 170.

The ring-shaped residue constricting skirt 293 has an inner diameter 441 which defines a through opening 442. The inner diameter 441 is smaller than a maximum inner diameter 444 of the residue deflection member 193. The ring-shaped residue constricting skirt 293 is configured for deflecting the coffee residue which travels downward from the residue deflection member 193 inward, thereby constricting the flow of coffee residue. This allows a smaller overall size of the residue tray 170 and in some embodiments, a smaller size of the entire centrifugal coffee brewing device 10. This is advantageous, because a smaller size of the centrifugal coffee brewing device 10 makes the device more practical in households.

In an embodiment, the inner diameter 441 of the residue constricting skirt 293 may be smaller than the diameter of the spinning assembly 16.

The residue constricting skirt 293 may be flexible in order to allow a slight deformation thereof. This makes the removal and placing of the residue tray 170 easier and allows a close fit of the residue constricting skirt 293 and the residue tray 170.

15. Air Vent in Residue Tray

Figure 33:
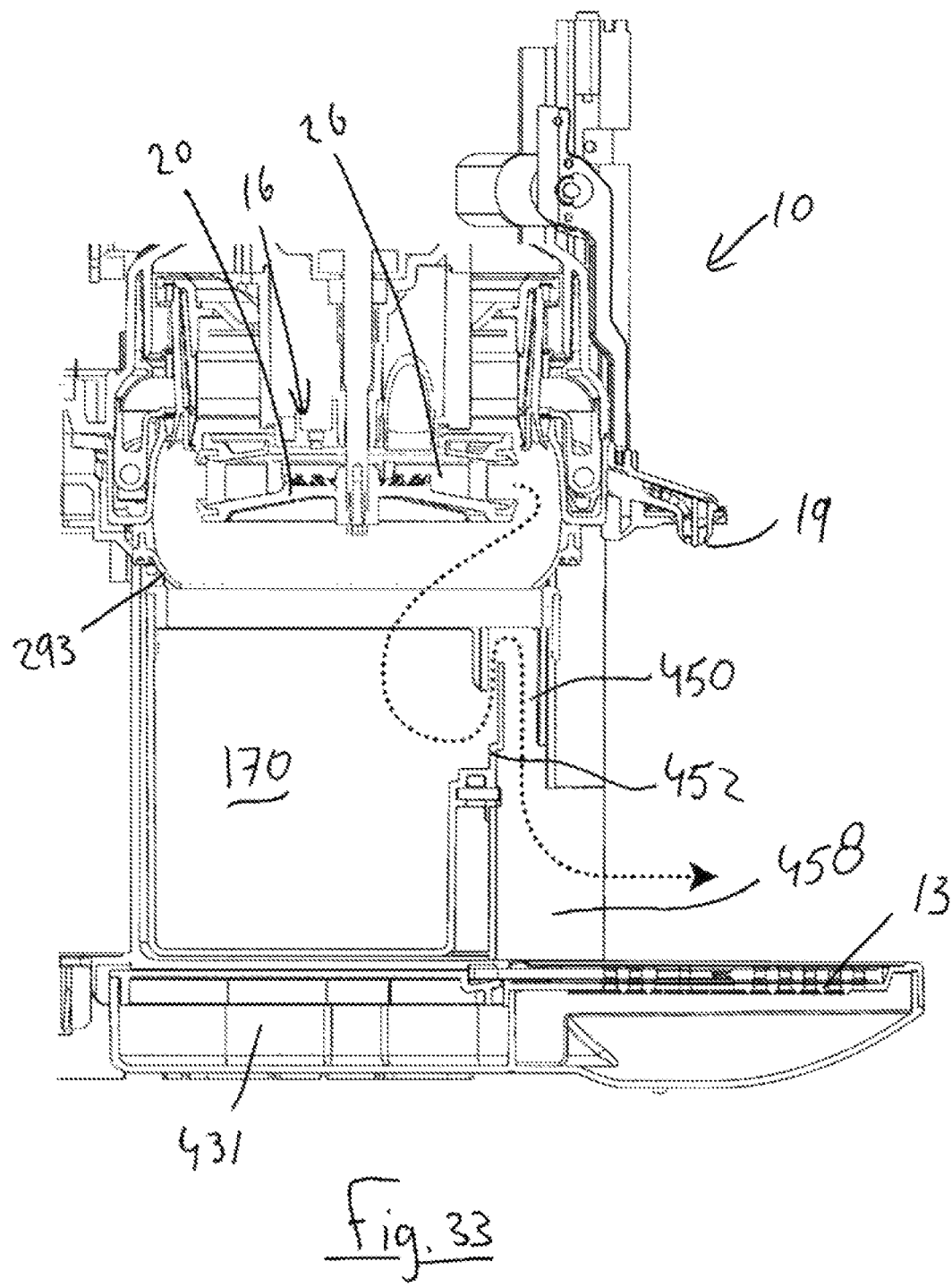
FIG. 33 shows another sectional view of a lower portion of the centrifugal coffee brewing device.

Turning to FIGS. 32 and 33, in a further aspect, the centrifugal coffee brewing device 10 comprises:
- a spinning assembly 16 which is rotatable about a main axis 18, the spinning assembly comprising:
  - a chamber element 20 comprising a bottom wall 21 and a roof portion 22,
  - a cylinder element 24 comprising a filter 25,
- wherein the chamber element and the cylinder element form a brewing chamber 26,
- a main drive 27 for rotating the spinning assembly about the main axis for centrifuging the coffee,
- a removable residue tray 170 positioned below the spinning assembly, wherein the removable residue tray 170 comprises a vent channel 450 configured to allow drying of the coffee residue inside the residue tray.

The air flow through the vent channel 450 is generated by the spinning chamber element 20 when the coffee residue is ejected from the brewing chamber as a result of the centrifugal force which is created by the spinning action. The air flow is indicated with dashed lines in FIGS. 32 and 33. Even if the chamber element is not spinning, air venting occurs through the vent channel 450 to some degree.

The vent channel 450 may be formed in a front wall 452 of the residue tray and opens into a front cavity 458 of the centrifugal coffee brewing device.

An upper front wall section 455 forms a skirt which obscures the vent channel 450 from the outside view.

The vent channel 450 may have an inverted U-shape defined by walls of the residue tray.

16. Distribution Table

Figure 34:
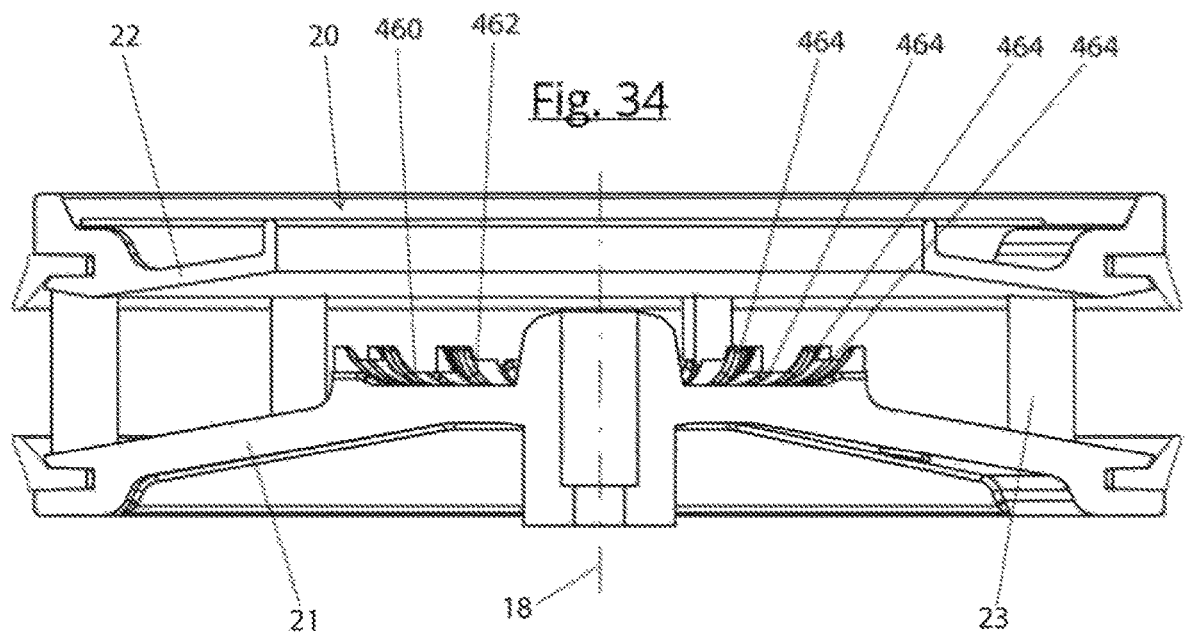
FIGS. 34 and 35 show sectional views of further embodiments of the brewing chamber having a distributor element.
Figure 35:
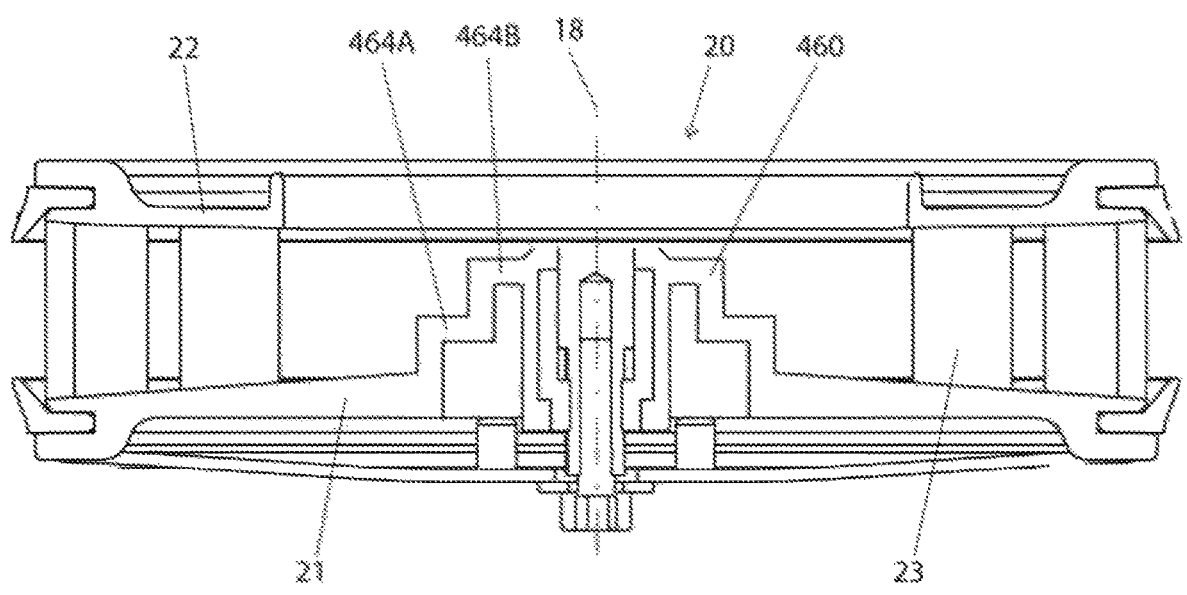

Turning to FIGS. 34 and 35, in a further aspect, the centrifugal coffee brewing device 10 comprises a spinning assembly 16 which is rotatable about a main axis 18, the spinning assembly comprising:
- a chamber element 20 comprising a bottom wall 21 and a roof portion 22, and
- a cylinder element 24 comprising a filter 25, The cylinder element 24 is not shown in FIGS. 34 and 35 but the skilled person will understand from FIG. 5 where it is located.

The centrifugal coffee brewing device 10 comprises a distributor element 460 which is positioned on the bottom wall 21, the distributor element extending around main axis 18 of the spinning assembly, wherein the distributor element comprises one or more distributor parts 464 having a first height above the bottom wall 21 and one or more distributor parts (464) having a second, different height above the bottom wall.

Turning in particular to FIG. 34, the distributor element 460 may comprise a receiving area 462 configured for receiving water and/or ground coffee particles, and wherein the distributor parts 464 form projections which are arranged at least at the circumference of the receiving area 462. The projections having different heights above the receiving area in order to distribute the ground coffee particles over the height of the filter to form a coffee bed and to distribute the hot water over the height of the coffee bed.

Turning to FIG. 35, in another embodiment the distributor parts 464 form stepped surfaces which face upwardly, comprising inner surfaces 464A which are located higher than outer surfaces 464B. The inner surfaces 464A and outer surfaces 464B may be horizontal or inclined and are located higher than the bottom wall 21.

The distributor element 460 may be a separate element or may be integral with the bottom wall 21 as is the case in FIGS. 34 and 35.

Heated Gutter

Figure 38:
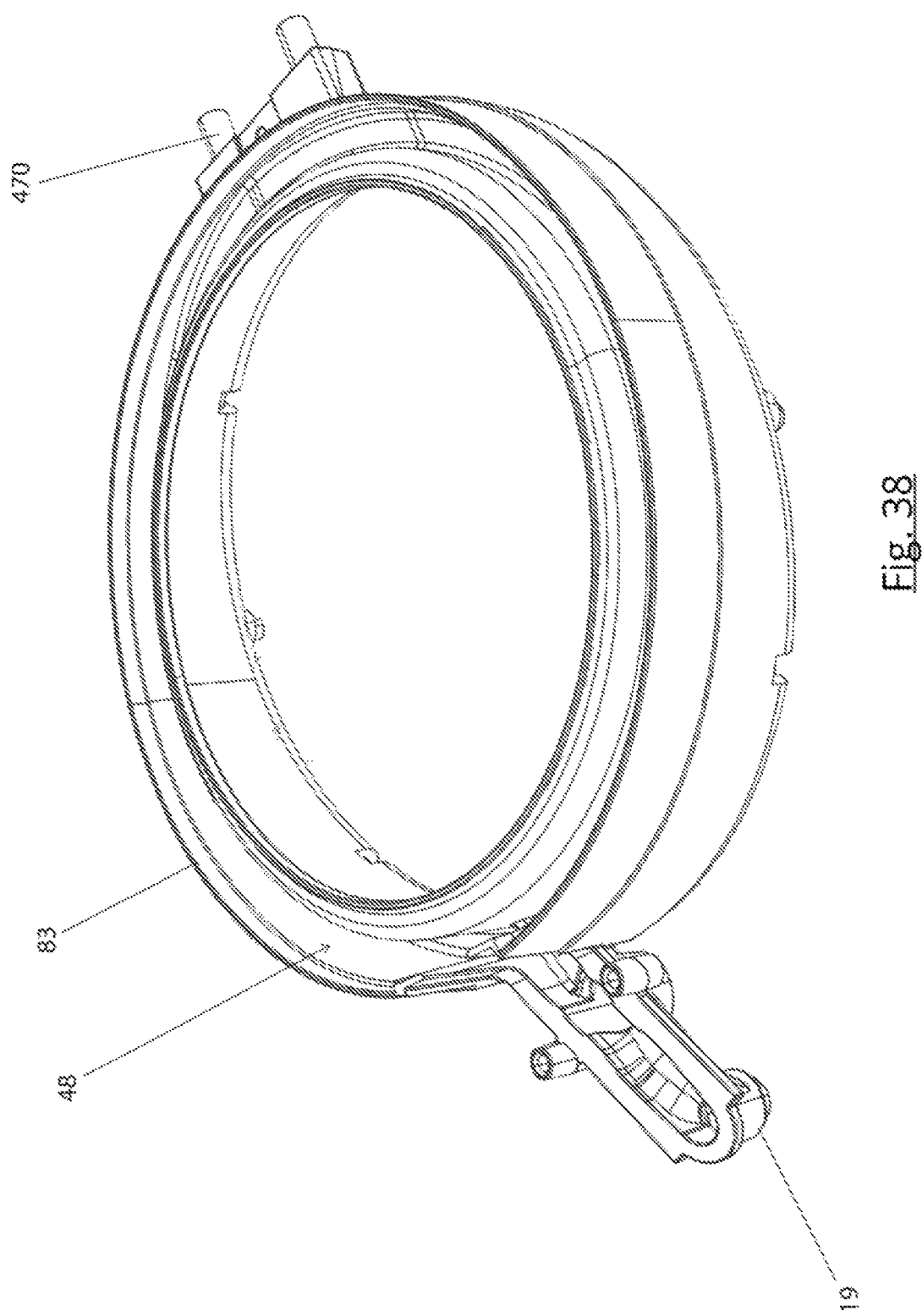

Turning to FIGS. 38 and 39, in an embodiment, the gutter element 83 which defines the gutter 48 for collecting coffee expelled from the spinning assembly may comprise a gutter heating element 470 for heating the gutter. The gutter heating element 470 may be ring shaped and be an electrical heater.

The centrifugal coffee brewing device may be configured for heating the gutter with the gutter heating element before and/or during the supplying of ground coffee into the brewing chamber and the formation of the coffee bed.

The method of brewing coffee may comprise:
supplying ground coffee into the centrifugal coffee brewing device and spinning the spinning assembly 16 to form a coffee bed in the brewing chamber,
heating the gutter 48 with the gutter heating element 470 prior to and/or during the forming of the coffee bed, wherein an airflow is created with the spinning assembly as a result of the rotation thereof, wherein said air flow travels through the gutter and is heated by the heated gutter, wherein the heated airflow travels through the coffee outlet and heats a coffee cup below the coffee outlet. This creates a higher temperature of the coffee in the cup.

The terms "a" or "an", as used herein, are defined as one or more than one. The term plurality, as used herein, is defined as two or more than two. The term another, as used herein, is defined as at least a second or more. The terms including and/or having, as used herein, are defined as comprising i.e., open language, not excluding other elements or steps.

Any reference signs in the claims should not be construed as limiting the scope of the claims or the invention. It will be recognized that a specific embodiment as claimed may not achieve all of the stated objects.

The mere fact that certain measures are recited in mutually different dependent claims does not indicate that a combination of these measures cannot be used to advantage.

White lines between text paragraphs in the text above indicate that the technical features presented in the paragraph may be considered independent from technical features discussed in a preceding paragraph or in a subsequent paragraph.

The invention claimed is:

1. A centrifugal coffee brewing device, comprising:
a spinning assembly, which is rotatable about a main axis, the spinning assembly comprising:
a chamber element comprising a bottom wall, and
a cylinder element comprising a filter,
wherein the chamber element and the cylinder element form a brewing chamber,
a main drive for rotating the spinning assembly about the main axis for centrifuging the coffee,
wherein the cylinder element including the filter is movable between a first, lower position in which the filter forms the circumference of the brewing chamber and in which the spinning assembly has a brewing configuration, and a second, upper position in which the circumference of the brewing chamber is open, and wherein in the second position of the cylinder element, coffee residue can be ejected by spinning the chamber element.

2. The device according to claim 1, wherein the chamber element is stationary in the vertical direction and configured to only rotate about the main axis.

3. The device according to claim 1, wherein the cylinder element is movable in an axial direction.

4. The device according to claim 1, further comprising a cylinder drive assembly for moving the cylinder element from the first position to the second position and vice versa, wherein the cylinder drive assembly is separate from the main drive, and wherein the cylinder drive assembly comprises a cylinder actuator.

5. The device according to claim 1, wherein the cylinder drive assembly comprises:
a ring gear which is driven by a cylinder actuator, wherein the ring gear is rotatable about the main axis, and
one or more cylinder spindles which are engaged by the ring gear and which are rotatable about respective cylinder spindle axes.

6. The device according to claim 5, wherein the cylinder element comprises a cylinder cam and wherein the cylinder drive assembly comprises a cylinder drive cam which is configured to move up and down and is configured to engage the cylinder cam in order to move the cylinder element up and down via the cylinder cam.

7. The device according to any of claim 6, wherein the cylinder drive cam comprises a top portion positioned above the cylinder cam and configured to move the cylinder element downwards by pushing the cylinder cam downward and a lower portion positioned below the cylinder cam and configured to move the cylinder element upward by pushing the cylinder cam upward.

8. The device according to claim 7, wherein the cylinder cam extends inwardly and wherein the top portion and bottom portion extend outwardly.

9. The device according to claim 1, wherein the cylinder element comprises one or more cylinder alignment cams, wherein the cylinder alignment cams are configured to abut the chamber element for alignment of the cylinder element with the chamber element in the first position of the cylinder element.

10. The device according to claim 9, wherein the cylinder drive cam is part of a ring shaped member connected to the at least one cylinder spindle, wherein the ring shaped member is configured to move up and down along the at least one cylinder spindle upon rotation of the at least one cylinder spindle.

11. The device according to claim 10, wherein a cylinder actuator and the main drive are positioned above the spinning assembly.

12. The device according to claim 11, wherein the cylinder drive assembly is configured to disengage the cylinder drive cam from the cylinder cam after the moving of the cylinder element from the second position to the first position and to create a gap between the cylinder cam and the cylinder drive cam, in order to allow the spinning assembly including the cylinder element to spin about the main axis without contacting the cylinder drive cam.

13. The device according to claim 1, wherein in the second position, the cylinder element is disengaged from the chamber element.

14. The device according to claim 13, wherein the device further comprises a lower stop against which the cylinder element abuts when reaching the lower position, and wherein the device further comprises a control unit, wherein the control unit is configured to measure a current flowing through a cylinder actuator, wherein the control unit compares the current with a current threshold value, and wherein when the current exceeds the current threshold value, the control unit assumes that the cylinder element has reached the first position and abuts the lower stop, after which the cylinder actuator reverses direction and moves the cylinder drive cam in the opposite direction over a limited distance in order to disengage the cylinder drive cam from the cylinder cam, wherein during said opposite movement the cylinder element is not substantially moved and remains in the lower position.

15. The device according to claim 1, wherein the device is configured to stop the spinning of the spinning assembly prior to moving the cylinder element from the first position to the second position or vice versa.

16. The device according to claim 1, wherein the device is configured to limit an acceleration and a deceleration of the spinning assembly to less than 400 rad/s2 in order to prevent slip between the cylinder element and the chamber element during acceleration or deceleration.

17. The device according to claim 1, wherein the main drive comprises an axle which extends downward from the main drive and is directly connected to the chamber element, without a disengageable coupling or a helical cam track between the main drive and the chamber element.

18. The device according to claim 17, wherein the main drive and a cylinder actuator each rotate about a respective vertical axis.

19. A method of brewing coffee, the method comprising:
providing the device according to claim 1,
supplying ground coffee and hot water into the brewing chamber when the cylinder element is in the first position,
spinning the spinning assembly in order to brew coffee,
moving the cylinder element from the first, lower position to the second, upper position,
spinning the chamber element in order to eject coffee residue, and
moving the cylinder element from the second position to the first position.

20. The method according claim 19, wherein the chamber element is held stationary in the vertical direction during the movement of the cylinder element between the first and second position.

* * * * *